United States Patent
Thorpe et al.

(10) Patent No.: US 7,594,002 B1
(45) Date of Patent: Sep. 22, 2009

(54) HARDWARE-ACCELERATED HIGH AVAILABILITY INTEGRATED NETWORKED STORAGE SYSTEM

(75) Inventors: Roger Thorpe, Irvine, CA (US); Jeffrey Oliver Thomas, Long Beach, CA (US); Itsik Yomorta, Irvine, CA (US); Ting-Kuo Yu, Beverly Hills, CA (US); Erasmo Javier Brenes, Irvine, CA (US)

(73) Assignee: Istor Networks, Inc., Irvine, CA (US)

( * ) Notice: Subject to any disclaimer, the term of this patent is extended or adjusted under 35 U.S.C. 154(b) by 751 days.

(21) Appl. No.: 10/781,338

(22) Filed: Feb. 17, 2004

Related U.S. Application Data

(60) Provisional application No. 60/448,207, filed on Feb. 14, 2003.

(51) Int. Cl.
  *G06F 15/16* (2006.01)
  *G06F 15/173* (2006.01)
  *G06F 15/177* (2006.01)
(52) U.S. Cl. ............................ 709/219; 370/392; 710/1
(58) Field of Classification Search ......... 709/217–228; 370/390–392; 710/1
   See application file for complete search history.

(56) References Cited

U.S. PATENT DOCUMENTS

| | | | |
|---|---|---|---|
| 4,984,240 A | 1/1991 | Keren-Zvi et al. | |
| 5,146,607 A | 9/1992 | Sood et al. | |
| 5,546,535 A | 8/1996 | Stallmo et al. | |
| 5,761,705 A | 6/1998 | DeKoning et al. | |
| 5,928,367 A | 7/1999 | Nelson et al. | |
| 5,987,496 A | 11/1999 | Shen et al. | |
| 6,226,680 B1 | 5/2001 | Boucher et al. | |
| 6,247,060 B1 | 6/2001 | Boucher et al. | |
| 6,295,585 B1 | 9/2001 | Gillett et al. | |
| 6,389,479 B1 | 5/2002 | Boucher et al. | |
| 6,427,171 B1 | 7/2002 | Craft et al. | |
| 6,427,173 B1 | 7/2002 | Boucher et al. | |
| 6,434,620 B1 | 8/2002 | Boucher et al. | |
| 6,591,302 B2 | 7/2003 | Boucher et al. | |
| 6,658,480 B2 | 12/2003 | Boucher et al. | |
| 6,693,910 B2 | 2/2004 | Chao | |
| 6,697,868 B2 | 2/2004 | Craft et al. | |
| 6,941,396 B1 | 9/2005 | Thorpe et al. | |
| 6,965,941 B2 | 11/2005 | Boucher et al. | |
| 6,996,070 B2 | 2/2006 | Starr et al. | |
| 6,996,105 B1* | 2/2006 | Wilson | 370/392 |
| 7,035,291 B2 | 4/2006 | Grinfeld | |
| 7,099,273 B2 | 8/2006 | Ha et al. | |

(Continued)

OTHER PUBLICATIONS

"Lawrence Berkeley National Laboratory Team Achieves 10.6 Gigabits/Second Data Throughput in 10-Gigabit Ethernet Test", Jul. 3, 2002, pp. 1-5, Jon Bashor.*

(Continued)

*Primary Examiner*—Haresh N Patel
(74) *Attorney, Agent, or Firm*—Knobbe Martens Olson & Bear LLP

(57) ABSTRACT

Disclosed is a system and methods for acceleration of the TCP/IP and the iSCSI protocols. The methods may be adapted to a wide variety of systems and applications that employ communications protocols including TCP, with or without iSCSI. Using a hardware-based acceleration approach, common case network traffic is rapidly processed at near line rate thereby improving overall performance and alleviating processing bottlenecks.

4 Claims, 38 Drawing Sheets

U.S. PATENT DOCUMENTS

| | | | |
|---|---|---|---|
| 7,191,241 B2 | 3/2007 | Boucher et al. | |
| 7,287,092 B2 | 10/2007 | Sharp | |
| 2002/0029281 A1 | 3/2002 | Zeidner et al. | |
| 2003/0084209 A1 | 5/2003 | Chadalapaka | |
| 2003/0093567 A1 | 5/2003 | Lolayekar et al. | |
| 2003/0101228 A1 | 5/2003 | Busser et al. | |
| 2003/0105830 A1 | 6/2003 | Pham et al. | |
| 2003/0110233 A1 | 6/2003 | Prall | |
| 2003/0158906 A1 | 8/2003 | Hayes | |
| 2003/0191932 A1 | 10/2003 | Allen et al. | |
| 2003/0233494 A1* | 12/2003 | Ghosh et al. | 710/1 |
| 2004/0010612 A1* | 1/2004 | Pandya | 709/230 |
| 2004/0048369 A1 | 3/2004 | Lu | |
| 2004/0054776 A1 | 3/2004 | Klotz et al. | |
| 2004/0062245 A1* | 4/2004 | Sharp et al. | 370/392 |
| 2004/0073622 A1 | 4/2004 | McDaniel et al. | |
| 2004/0117580 A1 | 6/2004 | Wu et al. | |
| 2004/0143642 A1* | 7/2004 | Beckmann et al. | 709/213 |
| 2004/0148376 A1* | 7/2004 | Rangan et al. | 709/223 |

OTHER PUBLICATIONS

Hasegawa et al., A mechanism for TCP performance enhancement over asymmetrical environment, Dec. 2003, IEEE Proceedings of the Eight IEEE International Symposium on Computers and Communications, pp. 1-16.

Allman, et al., TCP congestion control, Apr. 1999, Network working Group, RFC archive, sunsite.dlt (retrieved from google.com, 2007), pp. 1 to 14.

* cited by examiner

| segment | | iSCSI PDU |
|---|---|---|
| BHS (basic header segment, bytes 0-47) | B0[6]=I (immed delivery)<br>B0[5:0]=opcode, initiator     target<br>'h01=SCSI command     'h21=SCSI response<br>'h02=SCSI task mgmt req     'h22=SCSI task mgmt rsp<br>'h03=login command     'h23=login response<br>'h05=SCSI data out     'h25=SCSI data in<br>'h06=logout command     'h26=logout response<br>'h10=SNACK (seq# ack) req     'h31=R2T (rdy to xfr)<br>    'h3f=reject<br>B4=total AHS length<br>B8-15=logical unit number (LUN) (64 bits)<br>B16-19=initiator task tag<br>B20-47=opcode specific fields (7 words)<br>SCSI command:B20-23=expected data length, B24-27=statSN (for next status), B28-31=expCmdSN (cmd seq number), B32-47=CDB (16 bytes)<br>R2T: B20-23=targ transfer tag, B24-27=statSN, B28-31=expStatSN (cmd ack to init), B32-35=maxCmdSN<br>    B36-39=R2TSN (R2T PDU number, starts at 0), B40-43=buffer offset, B44-47=desired data length (in bytes)<br>SCSI data out: B20-23=targ transfer tag from R2T (or F's), B28-31=expStatSN (expected status sequence number)<br>    B36-39=dataSN, B40-43=buffer offset (for this payload relative to complete data transfer)<br>SCSI data in: B20-23=residual count, B24-27=statSN, B28-35=maxCmdSN, B36-39=dtaSN, B40-43=buffer offset<br>SCSI response: B24-27=statSN, B28-31=expCmdSN, B36-39=expDataSN,<br>    B40-43=bidirectional read residual count, B44-47=residual count | B1-B3=opcode specific fields<br>SCSI command: B1[7]=F (final), B1[6]=R (read), B1[5]=W (write)<br>    B1[2:0]=task attrib (0=untagged, 1=simple, 2=ord, 3=hoq, 4=aca)<br>    B3=CRN (command reference number)<br>SCSI data out: B1[7]=F<br>SCSI data in: B1[7]=F, B1[2]=o (overflow), B1[1]=U (underflow),<br>    B1[0]=S (status, if set: B3=status, B20-23=residual count,<br>    B24-27=statusSN<br>SCSI response: B1[2]=O, B1[1]=U, B1[4]=O for bidir read, B1[3]=U bi rd<br>    B2=response (0=cmd complete, 1=targ fail)<br>B5-7=data segment length (not including pad) |
| AHS (additional header seg. optional) | B0=B1=AHS length | B2=AHS type<br>B2[7]=drop<br>B2[5:0]=ahs code<br>    1=extended CDB<br>    2=exp bidir read length | B3=AHS specific |
| | extended CDB: B4..n=extended CDB (if necessary pad to full word)<br>bidir read length: B4=expected read data length | | |
| hdr digest (optional) | CRC for header segment(s) | | |
| data seg. (optional) | Data (if necessary pad to full word) | | |
| data digest (optional) | CRC for data segment | | |

FIG. 5A

| word# | TCP Segment Header Fields | | | |
|---|---|---|---|---|
| 0 | source port[15:0] | | destination port[15:0] 'h0015=FTP, 17=TELNET, 19=SMTP, 1D8=HTTP, CBC=iSCSI | |
| 1 | sequence number[31:0] | | | |
| 2 | acknowledgment number [31:0] (seq# of next expected octet, acks all previous octets) | | | |
| 3 | hdr length[3:0] (in words) | reserved[5:0] | flags[5:0] bit5=urgent ptr valid bit4=ack number valid bit3=PSH bit2=RST (reset connection) bit1=SYN (for connect close) bit0=FIN (for close) | window[15:0] (number of octets the receiver is able to receive) |
| 4 | checksum[15:0] (same as IP, but covers header and data) | | | urgent pointer[15:0] |
| optional | options (if any) plus padding (variable length depending on the number and type of options) | | | |
| | data | | | |

IP Packet Header Fields

| word# | | | |
|---|---|---|---|
| 0 | version[3:0] | IHL[3:0] (header len in words, min 5=no options) | TOS[7:0] (type of service, specifies precedence, delay, throughput and reliability parameters) | TLEN[15:0] (total length including header, in octets) |
| 1 | ID[15:0] (with src addr, dst addr, and user protocol uniquely identifies the IP datagram) | | flag[2:0] flag[1]=dont frag flag[0]=more frags | fragment offset[12:0] (in 64-bit units) |
| 2 | TTL[7:0] (time to live, decremented at each hop, if 0 discard the datagram) | Protocol[7:0] 1=ICMP 6=TCP 17=UDP | Header checksum[15:0] (1's complement of the 1's complement sum of data interpreted 16 bits at at time, with end-around carry) | |
| 3 | Source IP address[31:0] (coded to allow a variable number of bits to specify the network and station) |||
| 4 | Destination IP address[31:0] (as for source address, 224-239.x.x.x=multicast) |||
| : | Options (if any) plus padding (variable length depending on the number and type of options) |||
| : | Data (multiple of 8 bits in length) |||

FIG. 5D

| ethernet frame field | pre-amble | SFD (start frame) | DA (dst addr) | SA (src addr) | type (ethernet II) or length of info (IEE 802.3) | information | FCS (frame chk seq) | extension |
|---|---|---|---|---|---|---|---|---|
| #octets | 7 | 1 | 6 | 6 | 2 | 46-1500 | 4 | |
| notes | | | | | 'h0800=IP<br>'h0806=ARP<br>'h86dd=IPv6<br>'h8100=VLAN (insert w/ 2-byte tag before type/length)<br><='h05dc=length (rfc 1042, insert w/ constant 0xaaaa03_000000 before type) | jumbo: max 9000<br>GE: min=512 for half duplex CSMA/CD)<br><min: add pad bytes | | special nondata symbols for half duplex CSMA/CD |

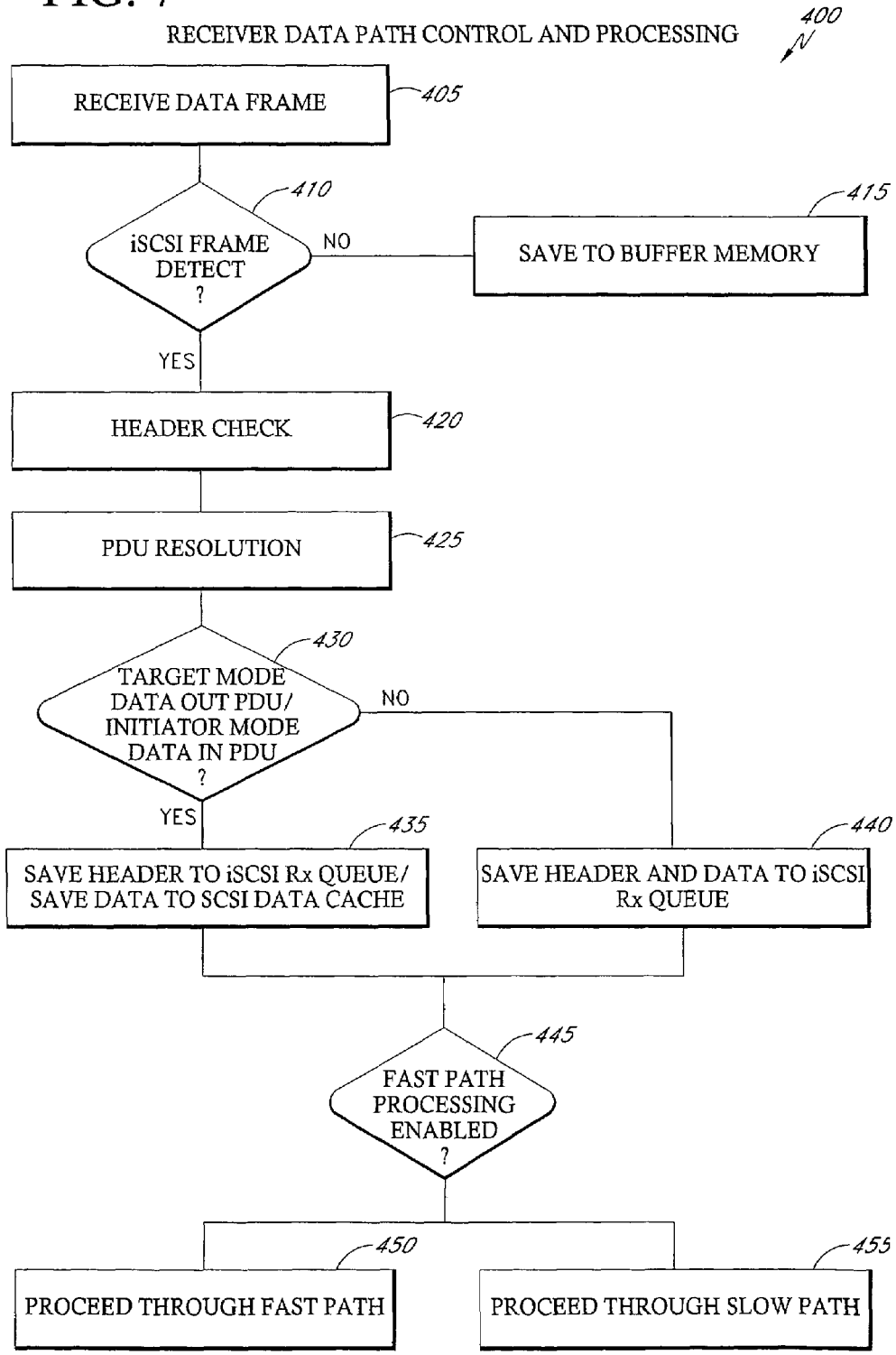

| TGI field | Description |
|---|---|
| tag[3:0] | Indicates the type of information in the dword, as preclassified by the TGI<br>0: invalid (interframe)<br>1: E (ethernet header)<br>2: EV (ethernet header, VLAN present)<br>3: E8 (ethernet header, 802.3 rfc1042 format)<br>4: EV8 (ethernet header, 802.3 rfc1042 format, VLAN present)<br>5: I (IP)<br>6: IO (IP options)<br>7: IF (IP fragmented)<br>8: T (TCP)<br>9: TO (TCP option)<br>10: U (UDP)<br>11: spare<br>12: S (iSCSI, i.e. TCP and DPORT or SPORT matches iSCSI<br>13: o (other, e.g. not IP, not TCP or UDP)<br>14: G (good EOF, dword holds checksum, frame length)<br>15: B (bad EOF, assert early if checksum or other error detected) |
| off[2:0] | Indicates the byte offset to tag boundary within dword, 0=left side |

| #bits | Field | Description |
|---|---|---|
| 4 | State | State machine state |
| 2 | ts_offst | Timestamp offset (0=none, 1=22B from start of TCP header, 2=23B, 3=24B |
| 1 | t_left | TCP header starts in left half of dword |
| 4 | Reason | If nonzero, the reason from slow-path processing |
| 1 | Msw_par | Job FIFO MS word parity |
| 1 | d_left | 1st dword stored (at next dword write qword to ingress fifo) |
| 64 | d_data | Stored dword |
| 2 | d_par | Stored dword parity |
| 80 | | Total bits |

FIG. 13A

Slow-Path Reason codes (*=set by dispatcher):

0 : nop -- fastpath iSCSI
1: ARP frame
2: other non-IP (not ARP) frame
3: IP fragment (if not, fragment zero could be iSCSI)
4: TCP but not iSCSI or runt iSCSI (flen<0x38)
5: UDP frame
6: ICMP frame
7: other IP frame (not IP fragment, TCP, UDP, or ICMP)
8: iSCSI, IP fragment zero
9: iSCSI, no socket ID found in CAM
a: iSCSI, unsupported option
*b: iSCSI, fastpath disabled
*c: iSCSI, out of sequence
*d: iSCSI, bad data boundary

FIG. 13B

CAM_LOAD I, data = Write CAM entry I with specified; Set Valid bit;

CAM_READ I = Read data contained in CAM entry I;

CAM_INV I = Clear the valid bit for CAM entry I;

CAM_REQ P = Initiate CAM search with Key elements written in the CAM-Key register for network port P;

CAM_RESULT P = Fetch result from CAM search for network port P;

FIG. 14

| #bits | Field | Description |
|---|---|---|
| 2 | TS offset | If nonzero, byte offset minus 1 from start to TCP options to timestamp field |
| 4 | TCP option length | Size in wowrds of TCP options |
| 4 | slow-path Reason Code | If nonzero, packet takes slow path.<br><br>Reason codes (*=set by dispatcher):<br>0 : nop -- fastpath iSCSI<br>1: ARP frame<br>2: other non-IP (not ARP) frame<br>3: IP fragment (if not, fragment zero could be iSCSI)<br>4: TCP but not iSCSI or runt iSCSI (flen<0x38)<br>5: UDP frame<br>6: ICMP frame<br>7: other IP frame (not IP fragment, TCP, UDP, or ICMP)<br>8: iSCSI, IP fragment zero<br>9: iSCSI, no socket ID found in CAM<br>a: iSCSI, unsupported option<br>*b: iSCSI, fastpath disabled<br>*c: iSCSI, out of sequence<br>*d: iSCSI, bad data boundary |
| 1 | ID valid | iSCSI socket ID valid |
| 1 | Init | Initiator mode |
| 4 | IP option length | Size in words of IP options |
| 10 | Socket ID | iSCSI socket ID |
| 1 | VLAN | 16th byte contains Vlan tag (IP frame) |
| 1 | 802.3 | 802.3 rfc 1042 coding was removed from ethernet header (IP frame) |
| 14 | frame length | Length of formatted frame in bytes |
| 16 | partial checksum | Checksum for UDP or partial TCP segment (info PIEman) |

FIG. 15

| #bits | field | description | notes |
|---|---|---|---|
| 58 | job | jff output | |
| 13 | roffst | iff read offset | for random access of iff |
| 13 | rckpt | iff read checkpoint (start of frame) | for calculating iff discard point (add flength) |
| 10 | fctr | frame qword counter | |
| 32 | seq | TCP sequence number | if iSCSI (except flags) for msgRxNotify and msgRxFrame, also need some job fields |
| 32 | ack | TCP acknowledgement number | |
| 32 | flgs | flags, TCP flags, TCP window size | |
| 32 | ts | TCP timestamp | |
| 32 | ets | TCP echo timestamp | |
| 288 | rcp0-rcp8 | Rx chunk pointer 0 up to 8 | depending on flength for msgRxFrame |
| 546 | | total (approx 69 bytes per port, total 552B) | |

FIG. 16

| byte# | #bits | ddig_enb | field |
|---|---|---|---|
| 0 | 8 | | Control bits: |
| | | sp | 7: slow path forever (disallows automatic return to fast path) |
| | | lo_pri | 6: low priority (0=high pri). If set and awr_prx_rdy_lo false, discard frame |
| | | ts_val | 5: TCP timestamp valid. If invalid, timestamp check automatically passes |
| | | rx_dis | 4: PDU Rx disable. Do not store subsequent data or header segments |
| | | flush | 3: PDU flush. Do not store data segment, auto-reset flush at PDU end |
| | | ddig_enb | 2: data digest enable. Enables check of iSCSI data segment CRC |
| | | hdig_enb | 1: header digest enable. Enables check of iSCSI header segment CRC |
| | | fp_enb | 0: fastpath enable. If disabled, entire frame stored to Rx chunk. |
| 1-4 | 32 | nxt_seq | Next TCP sequence number expected |
| 5 | 8 | ts | TCP timestamp [17:10] |
| 6-9 | 32 | pcrc | iSCSI partial digest (checked so far) |
| 10-12 | 24 | dsctl | iSCSI ata segment control: |
| | (1) | wenb | 23: write SCSI data to buffer memory, vs header/non-SCSI data to Rx queue (flags how to interpret bytes 17-31) |
| | (23) | dsctr | 22-0: data segment down counter (# words remaining in data seg, including data digest if present) |
| 13-16 | 32 | wptr | SCSI data write pointer ([3:0] indicates #qword residual bytes) |
| 17-31 | 120 | | Within iSCSI header segments: |
| (17) | (8) | hctl | [7-4]=spare, [3]=final PDU, [2]=scsi data, [1:0]=#residual bytes |
| (18) | (8) | state | [7-5]=spare, [4-0]= state |
| (19-21) | (24) | wres | Word residual (up to 3 bytes) |
| (22) | (8) | ahctr | Additional header segment down counter (#words in AHSs) |
| (23-26) | (32) | hoffst | Data offset from data out or data in header |
| (27-28) | (16) | dplen | Data length from DPT |
| (29-31) | (24) | dpoffst | Data offset from DPT, bits 31:24 (sb 512B boundary) |
| 17-31 | 120 | | Within SCSI: data segments: |
| | | qres | Qword residual (up to 15 bytes) |

FIG. 18B

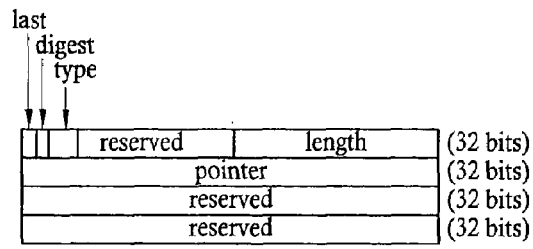
FIG. 22
data in PDU
| 0 | 1 | h | rsv | 48 | ptr to hdr in Tx ch | reserved | reserved |
|---|---|---|-----|-----|---------------------|----------|----------|
| 0 | 1 | d | rsv | #bytes 1 | ptr to data1 | reserved | reserved |
| 0 | 1 | d | rsv | #bytes 2 | ptr to data2 | reserved | reserved |
| 1 | 1 | d | rsv | #bytes 3 | ptr to data3 | reserved | reserved |
login response PDU
| 0 | 1 | h | rsv | 48 | ptr to hdr in Tx ch | reserved | reserved |
|---|---|---|-----|-----|---------------------|----------|----------|
| 0 | 1 | t | rsv | #bytes | ptr to text | reserved | reserved |
FIG. 23
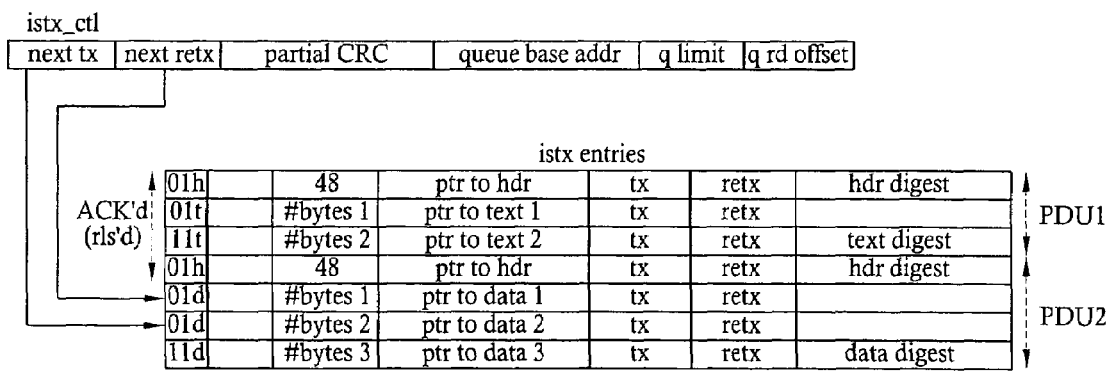
FIG. 24
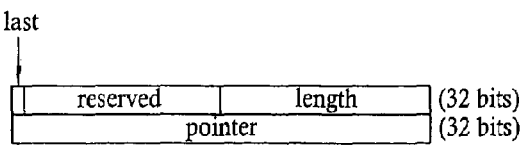
FIG. 25

| Command | Description |
|---|---|
| Push | Writes data beginning at write pointer and saves new write pointer in descriptor. |
| Push/Inc | Writes data beginning at write pointer, increments counter field by one, and saves new write pointer and counter in descriptor |
| Inc | Increments counter field by a specified amount and saves new counter in descriptor |
| Inc Bytes | Increments write pointer field by a special amount and saves new write pointer in descriptor |
| Push/Chkpt | Writes data beginning at write pointer and saves new write pointer in descriptor and in descriptor extension as write checkpoint. |
| Push/Inc/Chkpt | Writes data beginning at write pointer, increments counter field by one, saves new write pointer and counter in descriptor, and saves new write pointer in descriptor extension as write checkpoint. |
| Inc/Chkpt | Increments counter field by a specified amount, saves new counter in descriptor, and copies current write pointer to write checkpoint |
| Rewind | Copies write checkpoint to write pointer and saves result in descriptor |
| Peek | Reads data beginning at read pointer (for queues) or write pointer (for stacks) but does not save new pointer in descriptor |
| Pop | Reads data beginning at read pointer (for queues) or write pointer (for stacks) but saves new pointer in descriptor |
| Pop/Dec | Reads data beginning at read pointer (for queues) or write pointer (for stacks) decrements counter field by one, and saves new pointer in descriptor |
| Dec | Decrements counter field by a specified amount and saves new counter in descriptor |
| Dec Bytes | Decrements read pointer (for queues) or write pointer (for stacks) by a specified amount and saves new pointer in descriptor |

FIG. 26

| | | | |
|---|---|---|---|
| 00000 | -,- | 10000 | -,- | 11000 | Rewind |
| 00001 | Pop/Dec/ (Read) | 10001 | -,- | 11001 | Peek |
| 00010 | Push/Inc (Write) | 10010 | Push/Inc/Chkpt | 11010 | Push/Chkpt |
| 00011 | -,- | 10011 | -,- | 11011 | -,- |
| 00100 | -,- | 10100 | -,- | 11100 | -,- |
| 00101 | -,- | 10101 | -,- | 11101 | -,- |
| 00110 | -,- | 10110 | Inc/Chkpt | 11110 | -,- |
| 00111 | -,- | 10111 | -,- | 11111 | -,- |
| 01000 | -,- | | | | |
| 01001 | Pop | | | | |
| 01010 | Push | | | | |
| 01011 | Dec | | | | |
| 01100 | -,- | | | | |
| 01101 | -,- | | | | |
| 01110 | Inc | | | | |
| 01111 | -,- | | | | |

FIG. 28

| | |
|---|---|
| 00 | Queue Not Empty |
| 01 | Queue Empty |
| 10 | Queue Underflow |
| 11 | Not used |

FIG. 29

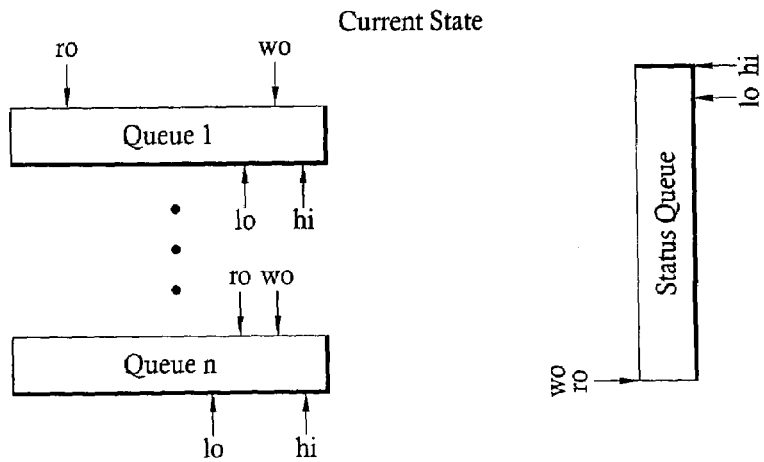
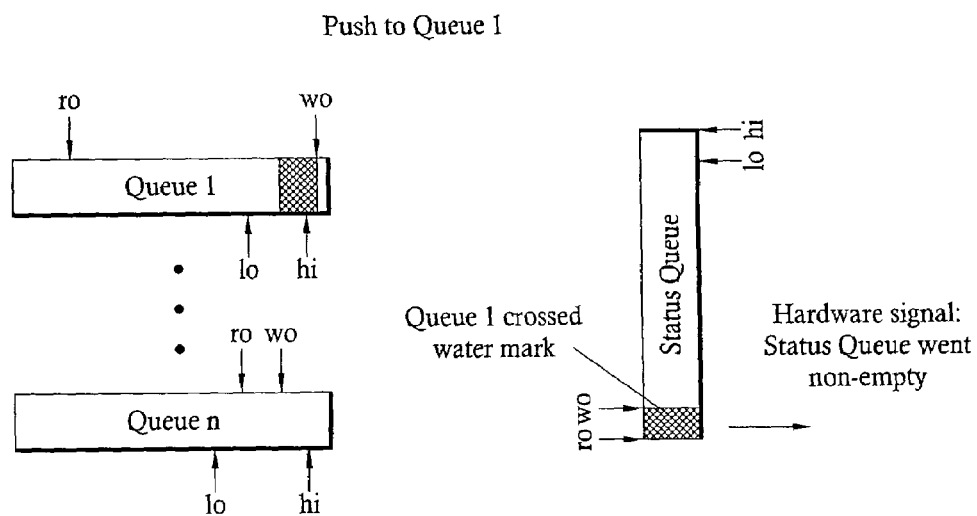
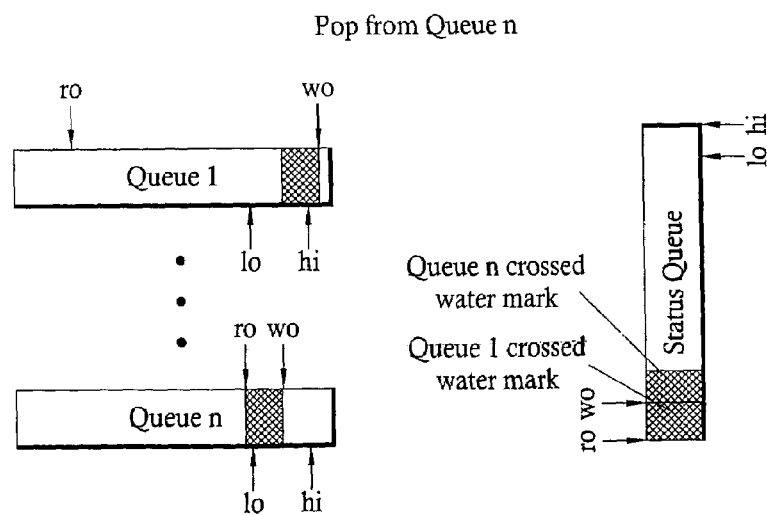
FIG. 32

| 15 | 14 | 13 | 12 | 11 | 10 | 9 | 8 | 7 | 6 | 5 | 4 | 3 | 2 | 1 | 0 | | |
|---|---|---|---|---|---|---|---|---|---|---|---|---|---|---|---|---|---|
| Full Hi Level | Full Lo Level | Read Pointer = 0 | Write Pointer = 0 | Count = 0 | Not Empty Signal | Base Address of Data | | | 0 | M d | Size |

FIG. 33

| 15 | 14 | 13 | 12 | 11 | 10 | 9 | 8 | 7 | 6 | 5 | 4 | 3 | 2 | 1 | 0 | | |
|---|---|---|---|---|---|---|---|---|---|---|---|---|---|---|---|---|---|
| Full Hi Level | Full Lo Level | Read Pointer = 0 | Write Pointer = bytes in system memory | Count = number of units in system memory | Not Empty Signal | Base Address of Data = base address of data written to system memory | | | 0 | M d | Size |

FIG. 34

HARDWARE-ACCELERATED HIGH AVAILABILITY INTEGRATED NETWORKED STORAGE SYSTEM

RELATED APPLICATIONS

This U.S. patent application claims priority to U.S. provisional patent application No. 60/448,207 entitled "High availability integrated storage network processing for iSCSI communication" filed Feb. 14, 2003 the disclosure of which is hereby incorporated by reference in its entirety. Additionally, the application is related to commonly-assigned co-pending applications entitled "Network receive interface for high bandwidth hardware-accelerated packet processing", application Ser. No. 10/781,552, now U.S. Pat. No. 7,460,473, filed Feb. 17, 2004 and "System and methods for high rate hardware-accelerated network protocol processing", application Ser. No. 10/781,553, now U.S. Pat. No. 7,389,462, filed Feb. 17, 2004 the disclosure of which is hereby incorporated by reference in its entirety.

BACKGROUND

1. Field

This invention generally relates to high data rate networking and storage networking. More particularly, this invention relates to a system and methods for hardware acceleration of a high data rate networking or storage networking device or system.

2. Description of Related Art

Recently, systems and software have been developed for networking applications wherein it is necessary or desirable to execute communications protocols at very high data rates. For example, conventional networked storage systems, including those that are block-based, file-based, or object-based may require bandwidth-intensive access to storage devices using communications protocols and subsystems. Additionally, robust and efficient networking implementations may be required for high-traffic network security systems such as firewalls with intrusion detection and prevention mechanisms. Similarly, Layer 4-7 networking systems, including by way of example: server load balancers, web switches, SSL accelerators, web servers, traffic managers, and networking gateways are often associated with high bandwidth traffic and it may be desirable to provide mechanisms for acceleration of these systems to improve performance.

The aforementioned systems and software generally communicate using networking protocols such as TCP/IP (Transmission Control Protocol over Internet Protocol) and can benefit from performance improvements accomplished by accelerating the execution of the underlying network protocol. Furthermore, performance enhancements in other communications protocols coupled with TCP/IP, including for example the Internet Small Computer Systems Interface (iSCSI) network storage protocol, are desirable when implementing systems and applications designed for high speed data throughput.

Network storage protocols represent a relatively new advancement for accessing data over storage networks and form the basis for diverse classes of network storage solutions wherein data is remotely stored and distributed within both storage area networks (SANs) and across larger public networks, including the Internet. The iSCSI transport protocol standard defines one such approach for accessing and transporting data over commonly utilized communications networks. Using the iSCSI command and instruction set, conventional Small Computer Systems Interface (SCSI) commands, typically associated with communication within locally maintained storage devices, may be encapsulated in a network-compatible protocol wrapper allowing SCSI communication between devices in a remote manner. The iSCSI protocol may further be used by a host computer system or device to perform block data input/output (I/O) operations with any of a variety of peripheral target devices. Examples of target devices may include data storage devices such as disk, tape, and optical storage devices, as well as, printers, scanners, and other devices that may be networked to one another to exchange information.

In conventional environments, block data operations associated with the iSCSI protocol are structured so as to be compatible with the general manner of processing associated with existing storage devices. As with the standard SCSI protocol, iSCSI information exchange is based on communication between agents (e.g. client/server model). An iSCSI-compliant device that requests a connection to the storage device and issues an initial series of SCSI commands is referred to as the iSCSI initiator. An iSCSI-compliant device that completes the connection to the initiator and receives the initial SCSI commands is referred to as the iSCSI target. One function of the initiator is to generate SCSI commands (e.g. data storage and access requests) that are passed through an iSCSI conversion layer where the SCSI commands are encapsulated as iSCSI protocol data units (PDUs). Thereafter, the iSCSI PDUs may be sent across a network to the target device where the underlying SCSI instructions and data are extracted and processed. In a similar manner, the target device may transmit data and information prepared using the SCSI responses and encapsulated as iSCSI PDUs to be returned to the initiator.

Running over layers of the TCP/IP protocol suite, iSCSI communication in the aforementioned manner is a computationally intensive process. The principal components of this process can be subdivided into: header processing, protocol processing, and data movement. Header processing includes parsing of packet headers at various layers of the protocol, extracting relevant information from headers, updating information as needed, performing tasks implied by the contents of the headers, creating headers for outgoing packets, and other related tasks. Protocol processing may include generating messages as specified by the protocol and maintaining/updating the protocol state at each agent (e.g. initiator/target) involved. Additional protocol processing steps may include performing connection setups and teardowns, generating Acknowledgements with protocol-dependent parameters, maintaining window sizes for each connection, performing retransmissions as required, and maintaining timers. Data movement refers to storing and retrieving data, typically from a network interface to a memory device or vice versa.

When executed in a principally software implementation, it may take on average approximately one million cycles on a commercially available general purpose processor to perform all the necessary computations and data movements for 1 million bits of data received and transmitted over a network interface. Thus, to achieve a data rate of 10 Gigabits/sec over a conventional network interface, a 10 GHz processor would be theoretically necessary under software-based network protocol resolution techniques. Presently, processors of this speed are not available and even if available, would not be economical and efficient to use for this purpose. Thus, there exists a need to enhance and accelerate the processing of communication protocols such as TCP/IP and iSCSI to overcome the limitations of conventional software-based network protocol resolution methods.

SUMMARY

The present teachings describe a system and methods for acceleration of the TCP/IP protocol suite and the iSCSI protocol. The methods may be adapted to a wide variety of systems and applications that employ communications protocols including TCP, with or without iSCSI. While certain embodiments described herein are based on TCP and iSCSI protocols, it will be appreciated that the methods may be adapted for use with other networking protocols (e.g. UDP, SCTP, iWarp protocol suite, SDP, and DDP) and applications to improve networking and storage networking performance.

Certain embodiments of the present teachings describe a system and methods for processing network packets at high data rates near or at full line speed (e.g. 10 Gbits/sec or more using Ethernet) and may significantly benefit systems where processing packets is a principle function of the system and processing at or near the peak rate of the networking interface is desired.

These methods may be adapted for highly accelerated TCP/IP processing alone or in connection with accelerated processing of iSCSI commands and data contained in TCP/IP streams. The disclosed methods may further be applied to build a high speed iSCSI-based network-attached storage system using various hardware-based acceleration techniques. As will be subsequently described in greater detail, TCP/IP and iSCSI processing is performed in a preferred embodiment by a Protocol Intercept Engine (PIE) subsystem with a network-attached storage hardware solution embodied in a Storage Networking Processor (iSNP).

In one aspect, the invention comprises a system for remotely accessing storage devices across a network. This system further comprises: at least one storage device configured to store and retrieve information based upon instructions issued in accordance with a first instruction set; and a networked storage controller configured to issue instructions to the at least one storage device in accordance with the first instruction set, the storage controller further configured to receive network communications containing embedded instructions in a second instruction set corresponding to storage and retrieval requests from at least one network device, wherein the networked storage controller is configured with a hardware-based acceleration module used for processing common case network communications relating to storage and retrieval requests in the second instruction set that are translated into instructions in the first instruction set and subsequently issued to the at least one storage device, and a software-based module used for processing non-common case network communications including exceptions and errors in network communications.

In another aspect, the invention comprises a system for Internet Small Computer System Interface (iSCSI) command resolution and processing over a TCP/IP network. This system further comprises: a host device configured to receive network data requests from at least one remotely located client device; at least one storage device associated with the host device and configured to store and retrieve information according to a Small Computer System Interface (SCSI) instruction set; and a controller. The controller further comprises, a storage network processor configured with a hardware accelerator module to process TCP/IP network traffic received from the client device containing iSCSI instructions and data, the storage network processor further configured to transform the iSCSI instructions into SCSI instructions to be issued to the at least one storage device; a memory area for buffering data to be subsequently transferred between the host device and the at least one storage device; a storage device interface used for transmitting and receiving data and SCSI instructions between the controller and the at least one storage device; and a network device interface configured to communicate with the at least one remotely located client device and used for transmitting and receiving data and iSCSI instructions.

In yet another aspect, the invention comprises a system for high data rate access to a storage device over a network. This system further comprises: an initiator device configured to transmit network storage and retrieval requests using an Internet Small Computer System Interface (iSCSI) protocol; and a target device configured to receive network storage and retrieval requests in the iSCSI protocol which are forwarded to a storage network processor associated with the target device, the storage network processor configured with a hardware-accelerated protocol processing module used to transform the iSCSI protocol requests into Small Computer System Interface (SCSI) protocol requests that are subsequently forwarded to the storage device for further processing and execution.

In still another aspect, the invention comprises a system for accelerated TCP and iSCSI protocol processing. This system further comprises: a storage network processor (SNP) configured to offload at least some packet processing tasks from a general purpose processor associated with a host device, the storage network processor further comprising: a hardware-accelerated receive module configured to receive TCP network packets; a hardware-accelerated TCP protocol processing module configured to process common case TCP network packets to resolve embedded iSCSI instructions; and a hardware-accelerated transmit module configured to transmit TCP network packets.

BRIEF DESCRIPTION OF THE DRAWINGS

FIGS. 5A-G illustrate details of the composition of an exemplary iSCSI protocol data unit including its format and header composition in addition to the corresponding components of information related to the networking stack.

FIG. 7 illustrates an exemplary flow diagram for network data path control and resolution.

FIGS. 12A-B illustrate exemplary descriptors and tags used in networking packets associated with the PIE architecture.

FIG. 13A illustrates states of a state machine associated with the PIE architecture.

FIG. 13B illustrates exemplary slow path reason codes associated with the PIE architecture.

FIG. 14 illustrates exemplary requests that can be made to a CAM component of the PIE architecture.

FIG. 15 illustrates exemplary types of information that may be extracted by a parser associated with the PIE architecture.

FIG. 16 illustrates exemplary dispatcher frame contexts for the PIE architecture.

FIG. 18B illustrates a summary of fields maintained in a FPRAM region associated with a iSCSI PDU Engine.

FIG. 22 illustrates an exemplary entry in an iSCSI Tx queue.

FIG. 23 illustrates an iSCSI Tx PDU application.

FIG. 24 illustrates an iSCSI connection control structure.

FIG. 25 illustrates exemplary raw Tx queue entries.

FIG. 26 illustrates an exemplary command set supported by a memory structure accelerator.

FIG. 28 illustrates exemplary bit patterns for a command bus.

FIG. 29 illustrates an exemplary status information bus.

FIG. 32 illustrates an exemplary software signaling approach.

FIG. 33 illustrates an empty queue/stack descriptor initialization routine.

FIG. 34 illustrates an exemplary preloaded queue/stack descriptor initialization.

DETAILED DESCRIPTION OF CERTAIN EMBODIMENTS

Figure 1:
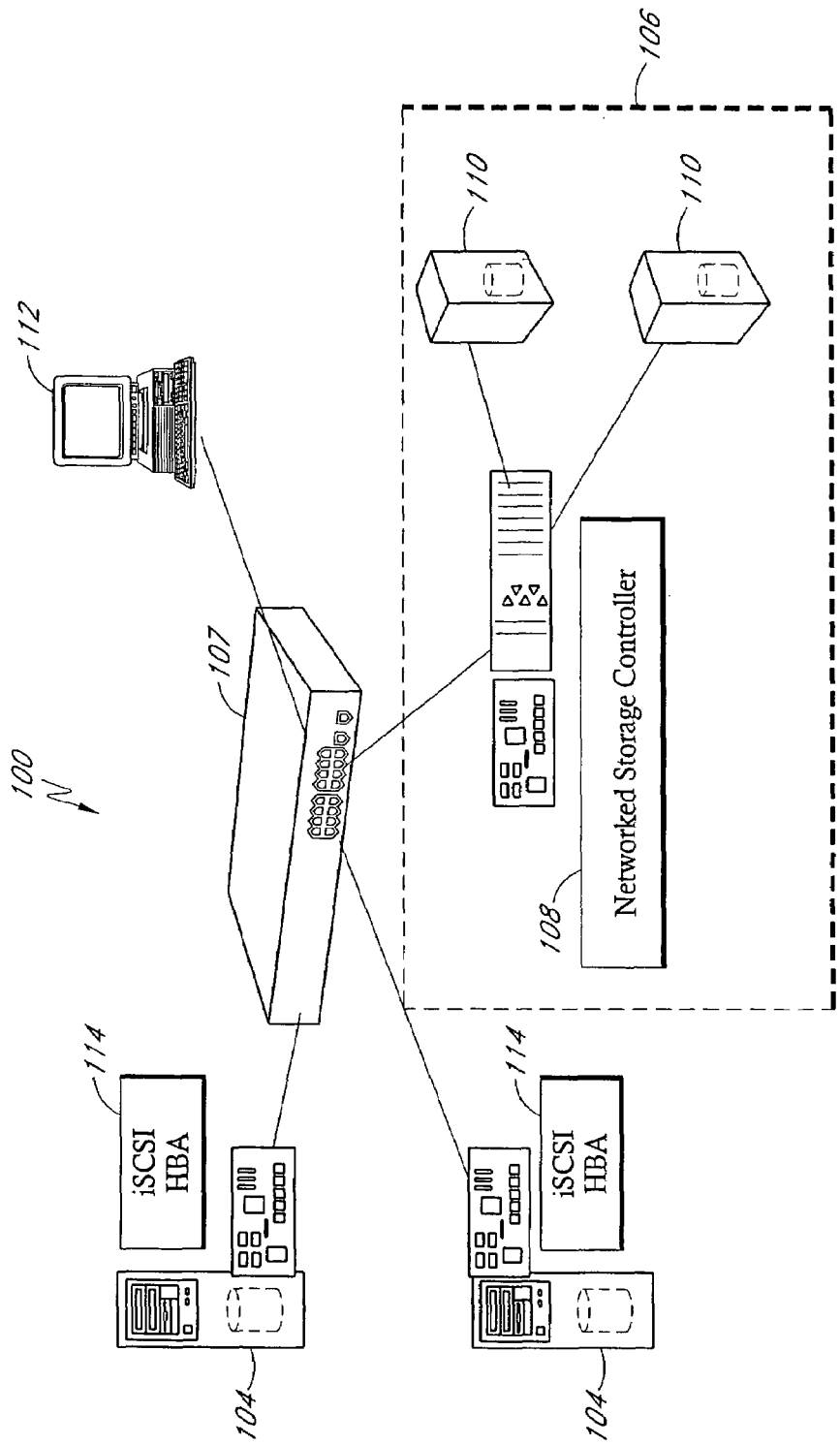
FIG. 1 illustrates an exemplary communications system for remote information storage and retrieval.

Although certain embodiments and examples are disclosed below, it will be understood by those of ordinary skill in the art that the invention extends beyond the specifically disclosed embodiments to other alternative embodiments and uses of the invention and obvious modifications and equivalents thereof. Thus, it is intended that the scope of the invention herein disclosed should not be limited by the particular disclosed embodiments described below.

In the context of the present teachings, offloading and acceleration are terms used primarily in the context of a networking protocol suite, such as TCP/IP. Offloading refers to those computational activities whereby a portion or substantially all of the processing associated with a communications protocol stack is acted upon by an entity other than the main processor in a host computer (e.g. host CPU). Offloading reduces the computational load on the main processor and increases its availability for executing other application software rather than performing networking functions. Acceleration relates to the use of special-purpose hardware components such as an application specific integrated circuit (ASIC) that may be used to perform tasks faster or more efficiently than a general-purpose processor. In certain aspects, acceleration may be distinct from offloading. For instance, TCP processing may be offloaded to a general purpose processor apart from the host CPU—in which case, there is offloading but no acceleration. TCP processing may also be offloaded to a hardware accelerator, wherein the processing task is not only offloaded from the host CPU, but is also performed at a higher rate than that of a general-purpose processor. In certain embodiments, acceleration is desirable when a system is configured to handle high rates/quantities of network traffic. Presently, certain commercial general purpose processors or embedded processors can be used for offloading TCP computational tasks, however, such systems typically require that the rate of network traffic be lower than approximately 3-4 Gbits/sec, for network traffic rates above that, acceleration may be required.

Partial acceleration may also be possible wherein certain network processing aspects are accelerated and others are not. For example, dedicated hardware solutions rather than a general purpose processor may be used for TCP checksum computation and verification. DMA engines may also be used for offloading data movement from the host processor. Packet classification (examining packet headers and extracting needed information) may also be performed by a hardware-based solution. While methods for offloading with "partial acceleration" have been disclosed in various contexts in conventional systems, these systems are typically configured to handle only a relatively small degree of offloading and/or a small degree of acceleration and, as such, are generally only adequate for processing packets at lower rates. Higher traffic rates (e.g. 4-10 Gbits/sec or more) require a larger degree of offloading capability with a correspondingly larger degree of acceleration that is generally not capable of being efficiently provided by conventional systems. The system and methods of the present teachings address this problem to extend offloading and acceleration capabilities beyond that provided by conventional systems.

The following discussion relates to aspects and details of offloading and acceleration of TCP/IP and iSCSI protocol processing. A specification and implementation of the TCP/IP protocol stack are described in: "Internetworking with TCP/IP Vol. 1: Principles, Protocols, and Architecture (4th Edition), D. E. Comer" which is hereby incorporated by reference in its entirety. Additionally, a description of the specification and implementation of a current version of the iSCSI protocol is set forth by the Internet Engineering Task Force (IETF) and described in: "Internet Draft draft-ietf-ips-iscsi-19.txt" which is hereby incorporated by reference in its entirety. As used in the Claims, the terms "TCP/IP" and iSCSI are intended to encompass future versions of the associated protocols.

In one aspect, the present teachings describe a remotely-accessible storage architecture that may be adapted for use with networks which implement packetized information exchange using for example, Transmission Control Protocol/Internet Protocol (TCP/IP) connectivity. Certain embodiments of the storage architecture may be implemented as storage accessible over a wide-area network such as the Internet and enterprise networks, over an Internet Protocol Storage/System Area Network (IP-SAN) that may serve as a replacement for Fibre Channel Storage/System Area Networks (FC-SAN) as well as other convention network attached storage (NAS) and direct storage solutions.

As will be described in greater detail hereinbelow, improvements in transmission efficiency and data throughput as compared to conventional software based implementations of networked storage may be realized using specialized processing of TCP/IP messages and iSCSI commands and information. These protocol acceleration functionalities may be desirably implemented using conventional network infrastructures without significant alterations or upgrades. For example, it is conceived that present teachings may be used in connection with conventional Ethernet configurations wherein commonly available IP routers and Ethernet switches direct the flow of information throughout the network. One desirable benefit realized when using such an implementation is that a relatively low cost and high performance network storage environment can be created based on an existing network without the need to perform substantial costly network upgrades.

The use of dedicated Fibre channel lines and specialized Fibre channel hardware is also not necessary to gain the benefit of high throughput network storage. It will be appreciated, however, that the systems and methods described herein may be readily adapted for use with numerous different types of networking technologies, including Fibre channel-based technologies, to help improve performance and reliability in network storage and data distribution. It will further be appreciated that the present teachings may be adapted for use in networks containing mixed technologies such as Fibre Channel over IP.

FIG. 1 illustrates an exemplary communications system for remote information storage and retrieval comprising a plurality of iSCSI devices that communicate over a network 100 which may include the Internet 101. In the illustrated embodiment, application servers 104 possess suitable network functionality to exchange information with other network devices including switches and routers 105. In one aspect, the application servers 104 comprise computers or other devices which access informational resources contained within a storage server 106. The storage server 106 comprises a networked storage controller 108 and at least one storage device 110. In one aspect, the storage controller 108 comprises a hardware device that provides network connectivity for the at least one storage device 110 and further communicates with the switches and routers 105 used in the network 100.

In various embodiments, the network infrastructure which interconnects the application servers 104 to the storage controller 108 comprises Ethernet connectivity (at Gigabit rates) with suitable Ethernet switches and routers 105. Although FIG. 1 is illustrated as possessing Gigabit Ethernet functionality, it will be appreciated that other network classes such as local-area networks (LANs), wide-area networks (WANs), private networks, or the Internet may be serve as a suitable network infrastructure. Likewise the hardware components and devices described in connection with the present teachings may be adapted for use with these and other network configurations including conventional wired networks and optical networks (e.g. Fibre Channel).

Each application server 104 uses a host bus adaptor (HBA) 114 to enable network communication between the application servers 104 and the network 100. Each application server 104 may further be connected directly to the storage server 106 such that few, if any, switches or routers 105 are necessary to exchange information in the storage network. Additionally, multiple application servers may communicate with a single storage server, and a single application server may communicate with multiple storage servers. In certain embodiments, link aggregation, such as that defined by the I.E.E.E. 802.3ad specification may be used to allow for higher bandwidth than is available over a single link between an application server and a storage server.

Each application server 104 transmits requests for stored resources located on the storage devices 110. As will be described in greater detail hereinbelow, informational requests may take the form of iSCSI PDUs that are transmitted from the application server 104 to the storage server 106. Furthermore, the HBA 114 of each application server 104 may fully or partially offload or accelerate networking and encapsulation/de-encapsulation operations associated with forming an appropriate connection to the storage server 106. These iSCSI instructions are received by the networked storage controller 108 wherein they are decoded and the requested operations associated with the storage devices 110 performed. In a similar manner, the controller 108 may encapsulate SCSI commands and storage device information as iSCSI instructions to be transmitted to the application server 104 for processing.

The controller 108 may also be configured to provide other desirable functionalities such as high availability features that implement backup and failover provisions. In one aspect, the controller 108 may further manage a redundant array of independent disks (RAID) to provide mirroring, error detection and correction, failover, and superior performance through the use of a plurality of storage devices 110 interconnected to the controller 108. Additionally, two or more networked-storage controllers may operate in a coordinated manner to provide additional high availability functionalities as well as load balancing and distribution functionalities. Another feature of the controller 108 is that it may be designed to be compatible with conventional iSCSI HBAs such that existing applications servers 104 which already possess an iSCSI enabled HBA may not require replacement to operate with the storage server 106 of the present teachings.

In various embodiments, a management console 112 may further connect to the network 100. The management console 112 may be associated with an application server 104 or other computer or software-based application that remotely performs administrative functions within the storage server 106 and/or various applications servers 104 located throughout the network 100. In one aspect, the management console 112 may be used to provide software updates and/or firmware revisions to the controller 108 or storage devices 110 of the storage server 106. Use of the management console 112 also provides a means to remotely view and modify the operational parameters of the storage server 106 in a convenient manner.

Figure 2:
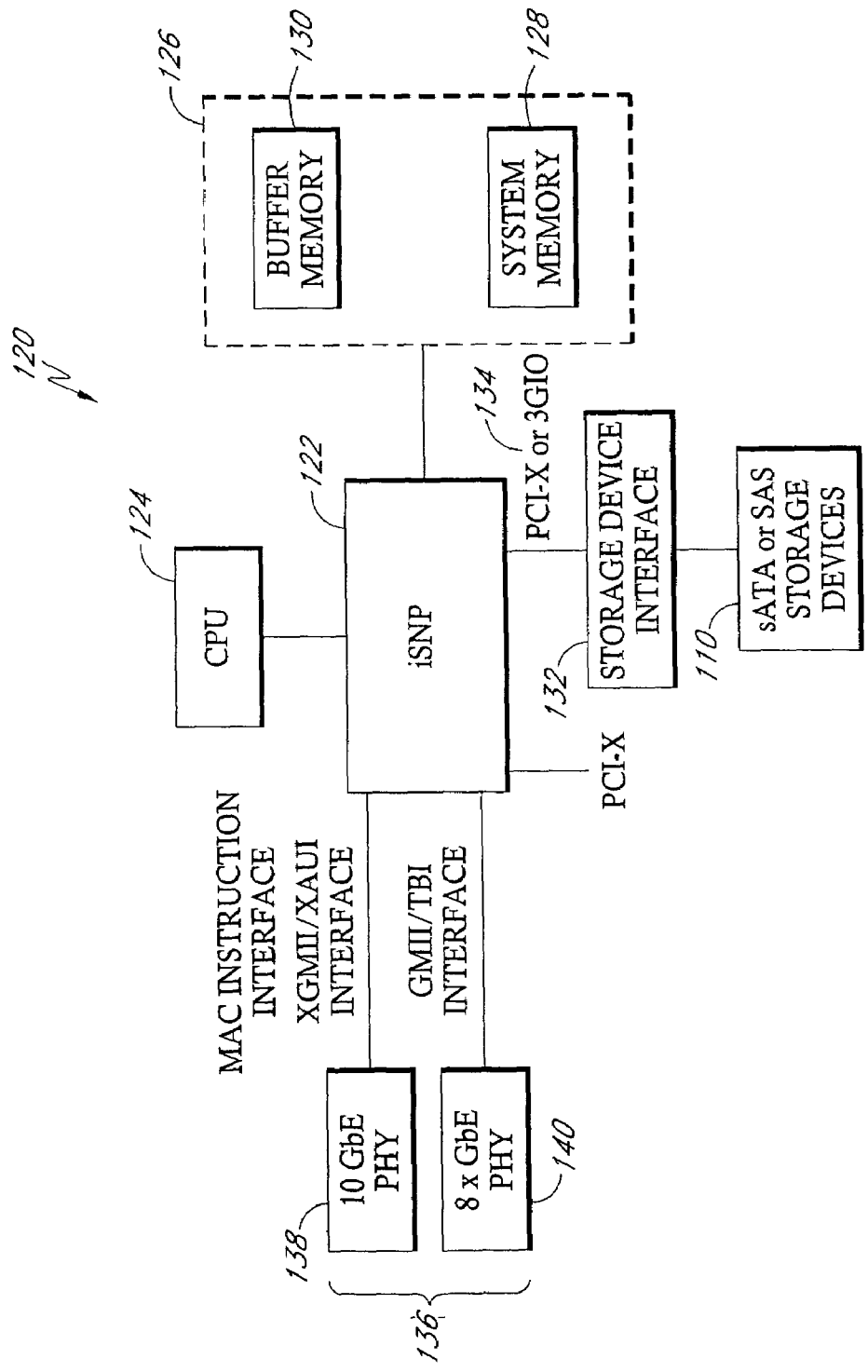
FIG. 2 illustrates a high level block diagram for an iSCSI hardware solution.

FIG. 2 illustrates a high level block diagram of an iSCSI hardware solution 120 that provides iSCSI processing functionality for the controller 108 and/or application server HBAs 114. In one aspect, a storage network processor (iSNP) 122 is principally responsible for the processing of iSCSI instructions and data. In one aspect, the iSNP 122 provides the necessary functionality for processing network traffic at high data rates, including TCP/IP and iSCSI layer processing.

A memory area 126 is further associated with the iSNP 122 wherein a portion of the memory, called buffer memory 130, may be dedicated for data buffering functionality for iSNP 122. Principally all of the data being transferred between host and storage device will be buffered in buffer memory. Another portion of the memory, referred to as system memory 128, may be dedicated for other programs and data associated with the storage controller application.

The iSNP 122 is further associated with a storage device interface 132. The storage device interface 132 represents a hardware interface between the controller 108 and the storage devices 110. The storage device interface 132 may be a conventional interface (e.g. a conventional ATA or SAS controller) or may be a dedicated design that is integrated into the storage controller 108. In various embodiments, a compatible bus 134 may provide a means for communication between the iSNP 122 and the storage device interface 132. Furthermore, one or more storage device controllers 132 may be associated with a single iSNP 122 to provide accessibility to multiple storage devices 110 through one or more buses. Each bus 134 may further adhere to a conventionally used communications standard such as a peripheral control interconnect (PCI) bus or a third generation input output (3GIO) bus.

The iSNP 122 is further associated with a suitable network interface 136 to provide a means for communicating across the network 100. In one aspect, the network interface 136 transmits and receives iSCSI PDUs and acts as an interconnect between the iSNP 122 and other devices present in the network 100. The network interface 136 may comprise a single interface 138 or an aggregated interface 140 which use any of a number of different networking implementations.

As will be described in greater detail hereinbelow, the network interface 136 may comprise a XGMII/XAUI interface which allows interconnection between a Media Access Control (MAC) sublayer of the iSNP 122 and a Physical layer (PHY) of the 10 Gigabit Ethernet network. Additionally, the network interface 136 may comprise a GMII/MII or TBI/SerDes interface for interconnecting to a 1000 based network, a 100/10 based network or other network type. It will be appreciated that numerous different interface specifications exist for the purpose of providing network connectivity; as such, it is conceived that any of these interfaces may be configured to operate with the iSNP 122 without departing from the scope of the present teachings.

It will be further appreciated that the principle components of the iSNP solution 120 may differ somewhat between that used in the networked storage controller 108 and those used in the application server HBAs 114. For example, the storage controller 108 may be configured to accommodate higher bandwidth by providing an increased iSNP 122 processor speed, additional memory 126, multiple controllers 132, and/or higher capacity network interfaces 136. Furthermore, HBA-associated iSCSI hardware solutions may lack certain components that are not required in iSCSI communication such as the storage interface 132 if no storage devices are directly interconnected to the associated device.

Figure 3A:
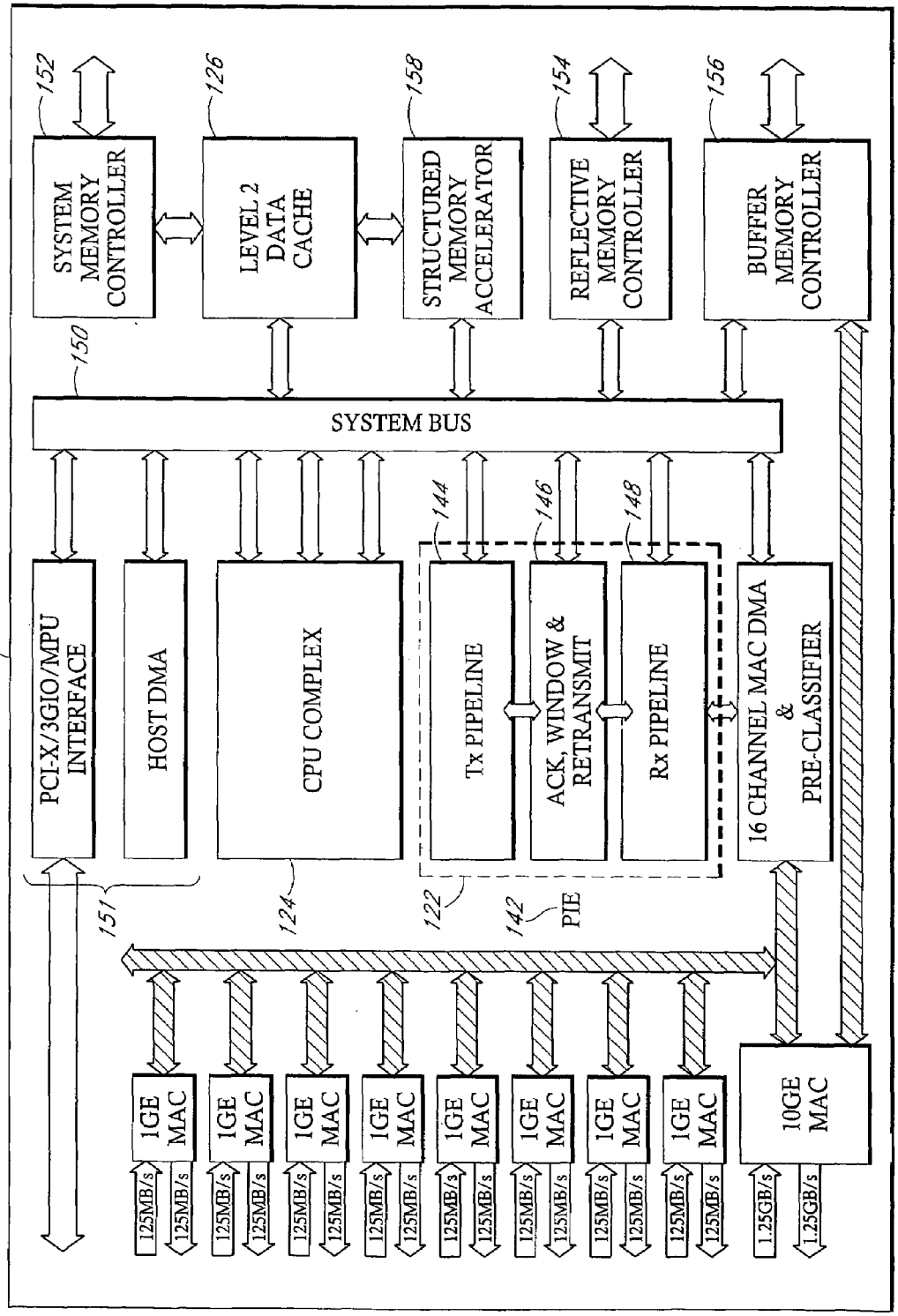
FIG. 3A illustrates a high level block diagram for an iSNP solution used to provide iSCSI processing functionality.
Figure 3B:
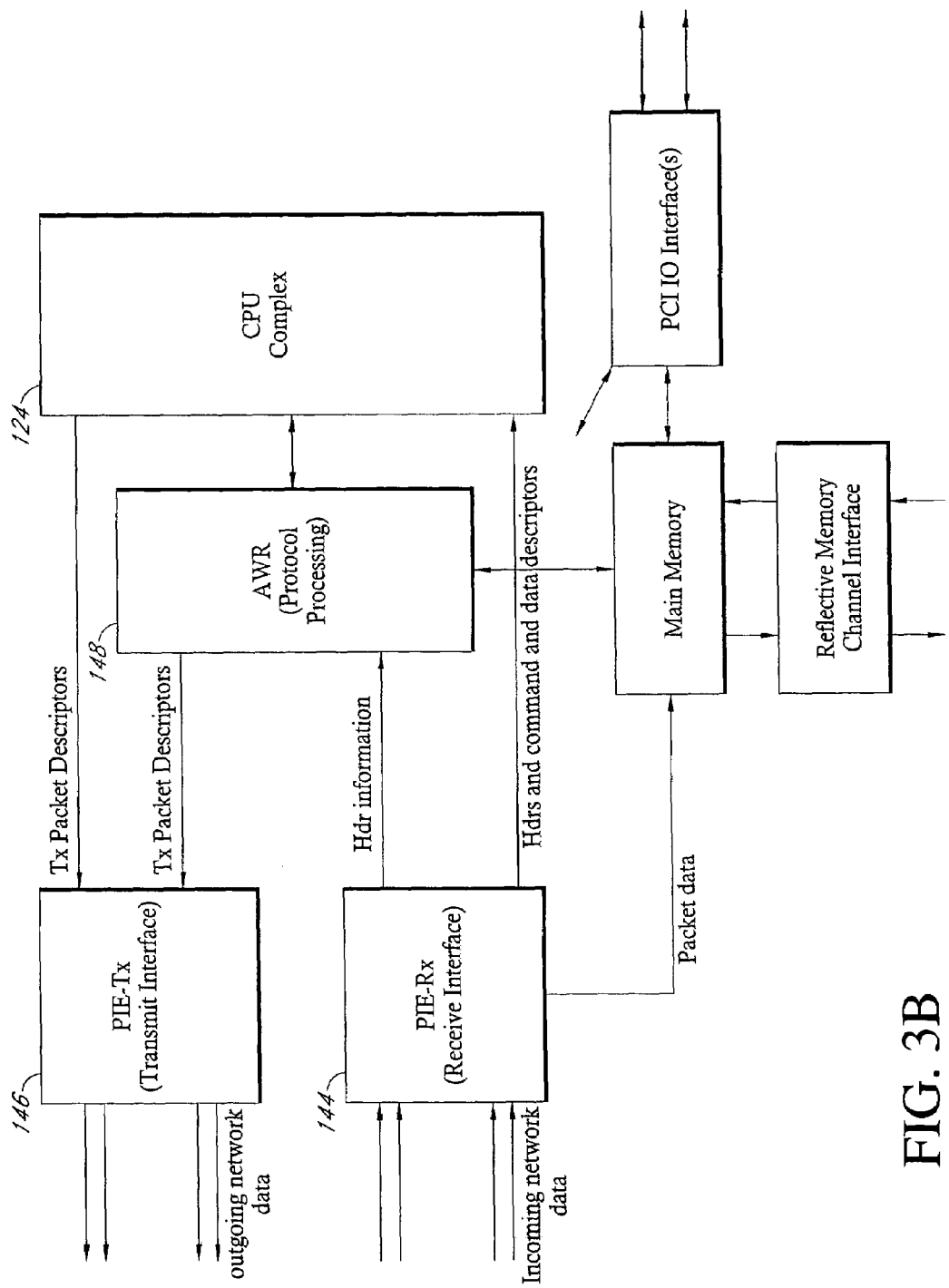
FIG. 3B is a functional view of the iSNP hardware, illustrating the flow of information through the system.

FIG. 3A illustrates another high level block diagram of the iSNP solution 120 for providing iSCSI processing functionality. FIG. 3B is an abstract functional view of the same hardware, illustrating the flow of information. In various embodiments, the iSCSI hardware solution 120 is desirably implemented as an application-specific integrated circuit (ASIC) and may support a very long instruction word (VLIW) architecture for one or more of the subcomponents contained therein.

Referring to FIG. 3A, the iSNP 122 includes a Protocol Intercept Engine (PIE) 142 subsystem, responsible for hardware acceleration of TCP/IP and iSCSI processing. The PIE subsystem 142 comprises principally of a receive (PIE-Rx) module 144, a transmit (PIE-Tx) module 146, and an acknowledgment /windowing/and retransmit (AWR) module 148. In one aspect, the PIE subsystem 142 achieves a high level of computational performance through using one or more hardware accelerators to perform tasks associated with TCP/IP and iSCSI processing. The PIE subsystem can be employed independently of other iSNP components for other applications (besides iSCSI storage controller) that require high data rate hardware acceleration of TCP/IP, iSCSI, or similar protocols. For example, the PIE subsystem may be employed in networking security systems, web switches, fibre-channel over IP systems, and so on.

The PIE Subsystem 142 communicates with other components of the iSCSI hardware solution 120 through an internal system bus 150 as well as through dedicated queues. This interconnect may include a switch or other medium that could be used, based on the engineering requirements of the system in which the PIE is deployed. The CPU Complex 124, may be formed as a collection of processors used for application processing. For example, the iSNP, as a storage controller, may perform storage management tasks including handling of SCSI commands, managing a storage system cache, managing space on attached disks, failover and recovery tasks, managing data movement between disks and memory. In other applications, such as a network security system, the CPU complex may be used for performing security processing tasks.

An Input-Output (IO) interface 151 may also be logically associated with the system bus 150 and provides functionality for interacting with the storage device interface 132 (shown in FIG. 2). As previously described, the interface 132 may serve as a converter from a PCI-X bus type to a serial ATA bus type and may be used to provide communication functionality between the storage blade 108 and the storage devices 110. In one aspect, the storage controller interface 151 facilitates server blade communication through various bus standards including, for example, PCI, ISA, and 3GIO.

In various embodiments, two or more iSNP solutions 120 may be desirably interconnected via a Reflective Memory Channel (RMC) to provide improved high-availability capabilities, failover, load-balancing, and redundancy features. Interconnection in this manner is accomplished through a coordinated system memory controller 152, reflective memory controller 154, and a buffer memory controller 156 which are linked in a peer to peer manner between each interconnected iSNP solution 120. Together these components 152, 154, 156 are responsible for communicating and coordinating the activities of each hardware solution 120 with respect to one another, such that if one fails, the other can take over, thus providing advanced error correction and data recovery functionality. Additional details regarding the functions of the coordinated system memory controller 152, reflective memory controller 154, and a buffer memory controller 156 will be described in greater detail hereinbelow.

A structured memory accelerator 158 may also be integrated into the iSNP solution 120 to provide advanced queuing of messages between components. In one aspect, the structured memory accelerator 158 interacts with the system memory 126 to improve performance during enqueuing and dequeueing of information (in the form of descriptors or messages) between various parts of the iSNP system. A desirable feature of the structured memory accelerator 158 is that it is capable of handling and managing a large number of queues simultaneously to enhance system performance. This feature further provides the ability for components of the ISNP and PIE systems, including processors in the CPU complex, to enqueue/dequeue messages without excessive load penalties and thus enables the systems to perform at high data rates. As previously indicated the PIE subsystem 142 provides a number of significant features and functionalities related to the processing of TCP/IP and iSCSI traffic. The iSNP/PIE components process and pass information through a layered networking and storage networking stack wherein one or more of the following functions are performed by the iSNP/PIE components in selected layers. In the subsequent portions of the description, the basic units of information associated with each networking layer are defined as frames when referring to the Ethernet and IP layer, TCP segments when referring to the TCP layer, and iSCSI PDU (protocol data unit) when referring to the iSCSI layer.

As shown in, FIG. 3B, incoming network data is received by the iSNP solution 120 through the PIE-Rx 144. The PIE-Rx 144 is responsible for receiving and decoding packetized information and distributing various portions thereof to other components of the PIE and iSNP solution 120. In one aspect, the PIE-Rx 144 identifies appropriate header information, performs selected header processing tasks, and passes selected header information to the AWR 148 wherein TCP protocol processing takes place. Likewise, the PIE-Rx 144 identifies appropriate header, commands, and data descriptors in incoming packets to be passed to the CPU complex 124 for processing with packetized data received by the PIE-Rx 144 passed to or deposited in the main memory component or appropriate region of memory.

In an analogous manner the PIE-Tx 146 is responsible for collecting packetized outgoing network data to be transmitted to other systems, components, and/or devices. The PIE-Tx 146 receives data and descriptors from the CPU complex 124 and the AWR 148, performs selected header processing tasks, and determines the appropriate formatting and timing for data distribution as will be described in greater detail hereinbelow.

Figure 4A:
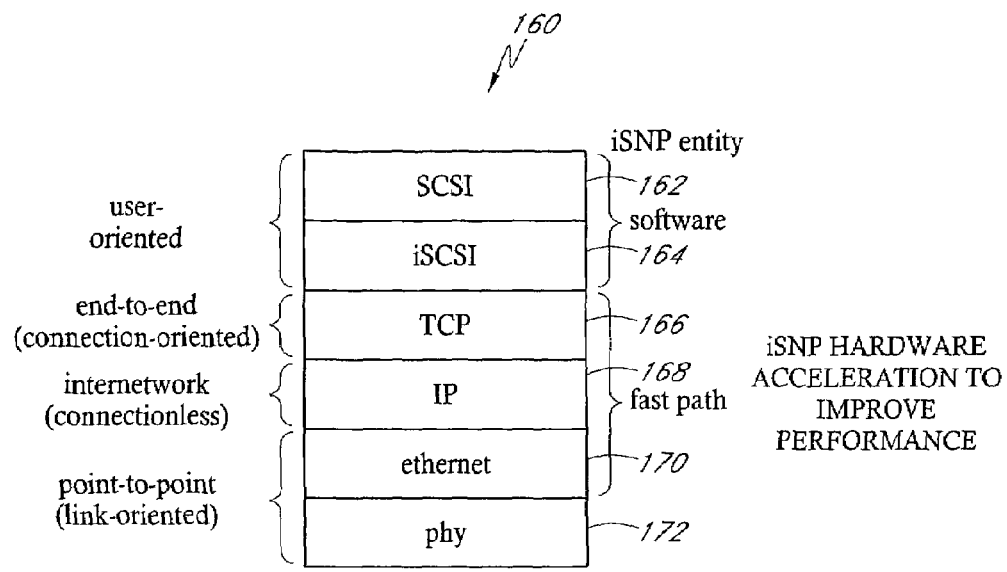
FIGS. 4A-B provide an overview of storage networking and the iSCSI protocol in the context of the iSNP solution.
Figure 4B:
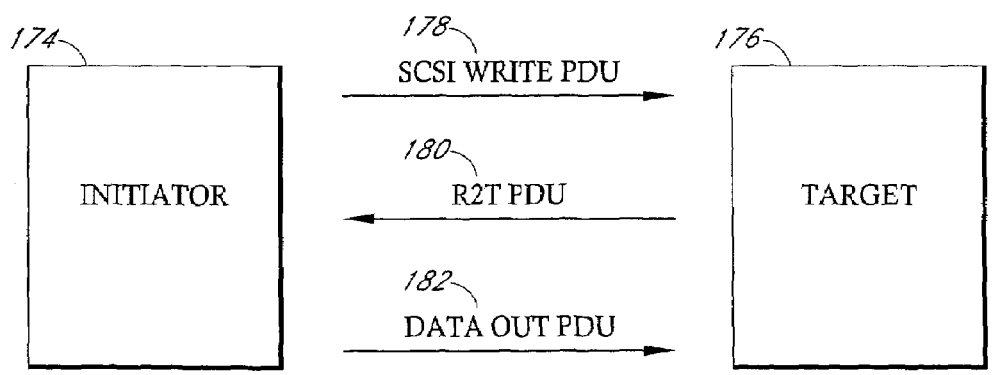

FIGS. 4A-B provide an overview of storage networking and the iSCSI protocol in the context of the iSNP solution 120. As shown in FIG. 4A the layering of protocols for an iSCSI storage networking system is described in terms of the Open System Interconnect (OSI) model 160. According to the model 160, storage networking and communication generally follow a layered, or hierarchical approach wherein a plurality of layers 161 exist to perform selected functions related to the processing of information.

The principal layers of the storage networking model 160 include a SCSI layer 162, an iSCSI layer 164, a TCP layer 166, an IP layer 168, an Ethernet layer 170, and a physical layer 172. The SCSI layer 162 implements the SCSI command set wherein storage block data operations (e.g. input/output) to SCSI devices are performed and managed. The iSCSI layer 164 is responsible for transmitting and receiving SCSI commands over a TCP/IP-based network. In various embodiments, the iSCSI layer 164 transports SCSI input/output (I/O) over an IP network through the use of iSCSI protocol data units (PDUs), the composition of which is illustrated below in FIGS. 5A-G.

The TCP layer 166 serves as the principal end-to-end network protocol and is typically used for establishing a reliable (connection-oriented) session between sending and receiving devices. iSCSI PDUs, contained in TCP segments, are transmitted as TCP data (shown in FIGS. 5B, 5D). The amount of data transmitted in a single TCP segment is generally limited by the Maximum Segment Size (MSS) parameter and typically negotiated at connection setup time between sender and receiver devices. The stream oriented nature of TCP results in iSCSI PDUs not necessarily starting at the beginning of a TCP segment. Further, iSCSI PDUs may be larger or smaller than the MSS for a selected connection and there may be one or more PDUs within a TCP segment or a single iSCSI PDU that may span several TCP segments. The TCP layer provides a mechanism to help aid in the error-free reception of iSCSI PDUs by the receiving device in the order (in the sequence) intended by the sender device. For example, a receiver may receive TCP segments out of sequence which may be corrected by the TCP layer by re-sequencing them before passing them to the iSCSI layer.

The IP layer 168 serves as a connectionless service that is typically used to route data and information between network devices. Each IP frame (see FIG. 5C) comprises an IP packet header that includes the source address, destination address, and other information as specified by the Internet Protocol. The IP layer 168 further uses IP frames to transport TCP segments from a sender to a receiver.

Occasionally, certain devices in a IP network may cause IP frames to be broken up into smaller fragments in a phenomenon referred to as IP fragmentation. This may occur when the maximum transfer unit (MTU) of the device is smaller than the size of the IP frame it receives. Typically, TCP/IP protocols reduce the possibility of fragmentation by negotiating MTUs appropriately. However, if IP fragmentation occurs, the IP layer 168 in the receiver should be capable of re-assembling IP fragments before passing them to the TCP layer 166.

The Ethernet layer 170 serves as the media access control (MAC) protocol handler to transfer Ethernet frames across the physical link (e.g. physical network connection/layer). The format of the Ethernet frame is illustrated in FIG. 5D. In one aspect, each frame comprises a MAC address that serves as a universally unique address that is pre-assigned for each Ethernet MAC device.

The physical layer 172 defines physical medium itself (e.g. physical cable or connection type) and provides the electrical and mechanical means to maintain the physical link between systems.

From the perspective of the iSNP 120, SCSI layer 162 and part of iSCSI layer processing 164 generally occur at the software level whereas part of iSCSI layer, TCP layer 166, IP layer 168, and Ethernet layer 170 processing occur at a hardware accelerated level. In one aspect, hardware acceleration performed by the iSNP solution 120 desirably improves performance and provides a means to rapidly transmit storage data and information in a more efficient manner as compared to conventional network storage solutions.

It will be appreciated that the aforementioned discussion of the network stack 160 utilized by certain embodiments of the iSNP solution 120 describes but a subset of the features and functionalities that may be associated with iSNP operations affecting certain layers of the network stack 160. The interoperation of these layers in addition to how data and command units are formed, distributed, and interpreted will be described in greater detail hereinbelow. It will be further appreciated that each of the various aforementioned communications layers may be executed in either in a hardware accelerated manner or through a comparable software implementation to provide the desired communications functionality.

FIG. 4B illustrates a high level model of iSNP information exchange between an initiator device 174 and a target device 176 in the context of the aforementioned network stack 160. In one aspect, a SCSI write command is desirably encapsulated in a SCSI write PDU 178 that may be transmitted from the initiator 174 to the target 176. Upon receipt of the SCSI write PDU 178, the target 176 may respond with an acknowledgment signal comprising a ready to transmit (R2T) PDU 180. The information contained in the R2T PDU serves as a signal to the initiator 174 that the target 176 is ready to receive information and determines when the initiator 174 will commence with data transmission in the form of one or more data out PDUs 182. The behavior of reads as well as other iSCSI commands is described more completely in the aforementioned iSCSI protocol definition.

Figure 5E:
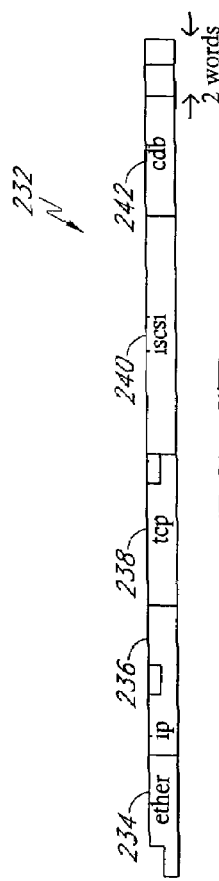

FIGS. 5A-G illustrate details of the composition of an exemplary iSCSI PDU including its format and header composition in addition to the corresponding components of information related to the networking stack. As shown in FIG. 5A, an iSCSI PDU comprising a SCSI command in an iSCSI "wrapper" comprises a SCSI opcode, the Logical Unit Number (LUN) associated with the target, a Task Tag utilized by initiators and targets to identify and associate responses and requests, an error correction code or digest for the header and data, if present.

In one aspect, the composition of an iSCSI PDU may be further divided into a basic header segment (BHS), an optional additional header segment (AHS), an optional header digest (HD), an optional data segment (DS), and an optional data digest (DD). The digest portions of the iSCSI PDU provide error-correction or data validation information to insure the content of various portions of the iSCSI PDU remain error free during transmission/reception. In general, the header segments provide instructions and information that is interpreted to determine how the data contained in the iSCSI PDU should be utilized. It will be appreciated that the structure and content of the iSCSI PDU as shown in FIG. 5A represents but examples of some of the functionalities and features associated with the iSNP solution 120 and should not be construed as limiting as to the scope of the invention.

Similarly, FIG. 5B summarizes certain aspects of the format and header information associated with an exemplary TCP Segment. The TCP Segment includes "source port" and "destination port" identifiers that are used at the source and destination respectively to direct data to the process associated with the port number. A "sequence number" comprises a 32-bit number and is used to indicate the position of the attached data in the TCP stream and may be used to send bytes of data to an application in the correct sequence. In an exemplary connection process involving initiation of a TCP connection, each participant may identify a random number to start with, notify the other participant of the number, and keep track of the sequence number of the next expected segment. In this manner, each participant may determine the order in which bytes are sent by the other and allows for the detection of dropped or duplicate segments.

A "window size" parameter may be used for purposes of flow control where each participant indicates a number or quantity of bytes it can safely receive from another participant. Various "flags" may further be used by the protocol to reset, synchronize, or end a session and to indicate when a packet is to be sent with high priority or on an urgent basis. A "checksum" value may also be used for error detection and information validation. Finally, a data or payload component represents information to be delivered from the sender to the receiver.

FIG. 5C summarizes some of the aspects of the format and header information associated with an exemplary Internet Protocol (IP) frame. A "version" parameter indicates the version of the protocol is being used (e.g. ipv4 or ipv6). A "Type of service" parameter may be used to implement various quality of service features. An "Identification" parameter represents a 16-bit number that, together with the source address, uniquely identifies a selected packet and may be used during reassembly of IP fragments. One or more "Flag" parameters may further be used to indicate whether or not a packet may be fragmented by routers. A "Fragmentation Offset" parameter represents a byte count from the start of an original sent packet, set by a router which performs IP router fragmentation. A "Time to Live" parameter denotes the number of router hops after which a frame may be discarded, for example, because it is excessively old or in a routing loop. A "Service Access Point" (SAP) parameter indicates the transport protocol associated with the frame (e.g. 1=ICMP; 2=IGMP; 6=TCP; 17=UDP). A Header Checksum parameter may be used to detect errors that may occur during transmission. A Source Address and Destination Address represent the IP addresses of the source and destination nodes. Finally, one or more "IP Options" parameters may be used as mechanisms for control and debugging.

FIG. 5D summarizes some of the aspects of the format and header information associated with an Ethernet frame. In various embodiments, one of two frame formats may be used and may include: (a) A standard frame format of the type issued in 1978 by Xerox Corporation, Intel Corporation and Digital Equipment Corporation, typically referred to as Ethernet (or DIX Ethernet) or (b) An international frame format complying with the IEEE 802.3 standard representing a more recently defined standard. These two standard frame formats may be distinguished using a "type" field present in the header that contains a protocol-type number for Ethernet and specifies the length of the data contained in the frame for IEEE 802.3. Typically the maximum length for an Ethernet frame is 1526 bytes indicating that a data field may be a length of up to approximately 1500 bytes. Alternatively, the length of the 802.3 data field may be limited to limited to approximately 1500 bytes, however, the system may be configured to support jumbo frames of up to approximately 9000 bytes as permitted on modern 802.3 networks.

FIG. 5E illustrates an exemplary iSCSI command PDU segment 138 that incorporates the header information for various layers of the network stack 160. The packet header may be organized such that the headers are interpreted according to the order of the stack 160. For example, the iSCSI command PDU segment 138 comprises an Ethernet header 234, an IP header 236, an TCP header 238, and an iSCSI header 240 each of which are arranged substantially adjacent to one another. One or more of the headers 234, 236, 238, 240 may further include checksum or error correction information that may be used to verify the received information during the various stages of decoding and resolution to insure integrity in the transfer of data and command information.

When processing of the iSCSI command PDU segment 138, the Ethernet header 140 is first decoded/interpreted by the Ethernet layer 170 of the receiving device which passes the remaining contents of the PDU to the next higher layer which in the illustrated example is the IP layer 168. Subsequently, the IP header 236 is decoded/interpreted and the remaining contents of the PDU passed to the next higher layer. The above-described manner of processing proceeds sequentially for each header portion continuing through the decoding of the iSCSI header 164. Thereafter, an underlying SCSI command 242 is resolved and may be executed by the receiving device to accomplish tasks associated with storage and retrieval of information.

Figure 5F:
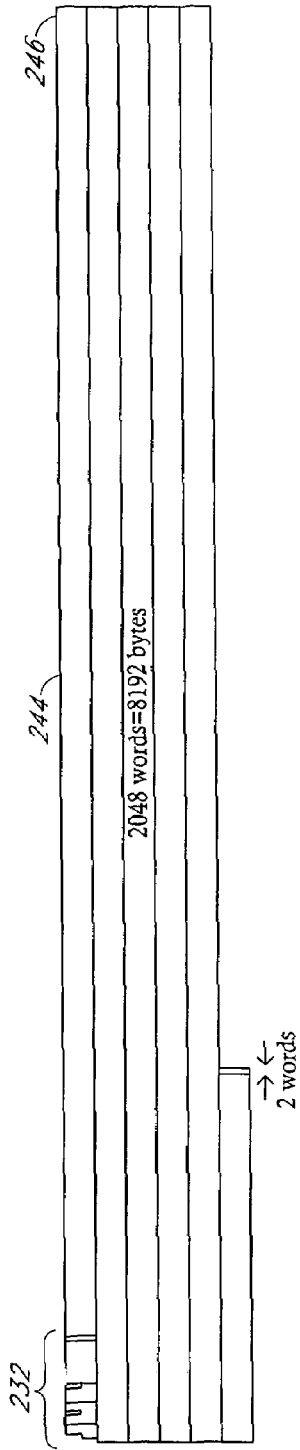

FIG. 5F illustrates an exemplary iSCSI frame data PDU 244 containing a data or information segment 246 associated with the aforementioned iSCSI command header information. In one aspect, the data segment 246 is preceded by the iSCSI command PDU segment 232 which carries the necessary information for the data segment 246 to be interpreted by the receiving device. One desirable benefit of the storage network of the present teachings' is that relatively large data frames are supported which may be useful in improving data transmission efficiency between devices. Additionally, only a single iSCSI command PDU segment 232 need be associated with the data segment 246 therefore reducing the amount of information which should be transmitted between devices and reducing the amount of computation involved in processing header information. In the illustrated example, a data segment 246 of 2048 words or 8192 bytes is shown however, it will be appreciated that other data segment sizes can be readily supported.

Figure 5G:
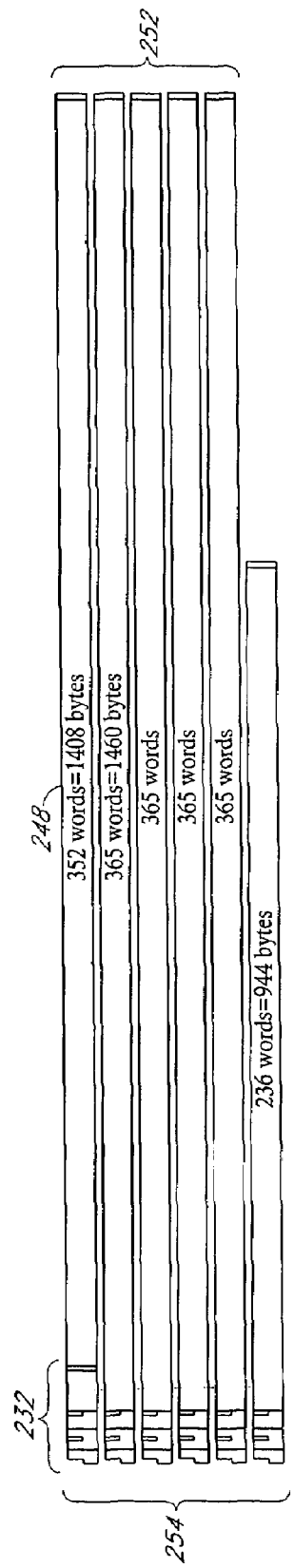

FIG. 5G illustrates an exemplary iSCSI frame data PDU 248 comprising a plurality of sub-segments each of which are associated with an initial iSCSI command PDU segment 232. In the exemplary iSCSI standard frame data PDU 248, each sub-segment comprises separate header information 254 which is transmitted with the sub-segments 252. During the receipt and decoding of the iSCSI frame data PDU 248 each of the sub-segments are re-associated to join the information stored therein. The use of separate header information 254 in the aforementioned manner allows smaller frame sizes to be transmitted which may be re-associated and provides a means to recover or retransmit smaller portions of data as compared to the iSCSI frame PDU 244.

Figure 6A:
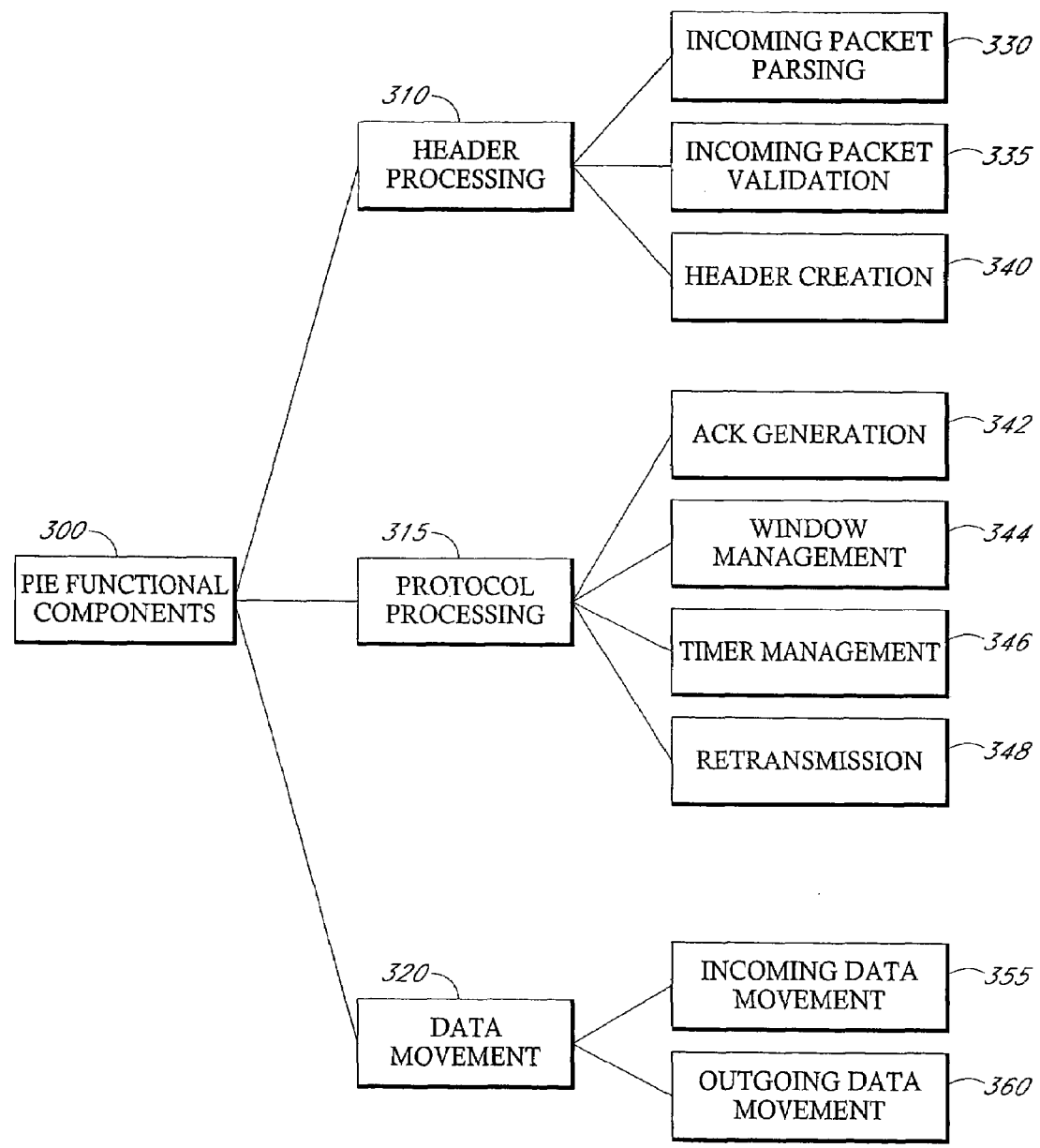
FIG. 6A illustrates a block diagram of the principal functional components of the Protocol Intercept Engine (PIE).

FIG. 6 illustrates a block diagram of the principal functional components 300 of the Protocol Intercept Engine that provide for acceleration of TCP/IP and iSCSI network information processing for high data rate applications. As illustrated the principal functional components of the PIE architecture include a header processing component 310, a protocol processing component 315, and a data movement component 320.

The header processing component 310 may be further characterized by functionalities that may include an incoming packet parsing functionality 330, an incoming packet validation functionality 335, and a header creation functionality 340. The incoming packet parsing functionality 335 comprises parsing incoming packets at the MAC 170, IP 168, TCP 166, and iSCSI layers 164 to demarcate headers, data, PDUs, and extracting certain relevant pieces of information from the packet headers. The incoming packet validation functionality 335 comprises performing operations associated with validating incoming packets by verifying the correctness of checksums, CRCs, data digests and other fields. The header creation functionality 340 comprises creating headers for outgoing packets that may be recognized by other devices and/components.

The protocol processing component 315 may be further characterized by operations that a sender or receiver participating in a protocol is required to perform. For TCP procotol processing, these operations may include: ack generation 342, window management 344, timer management 346 and retransmission 348 as well as other operations directed towards connection setup and teardown, flow control, error recovery, and congestion management. Additional details of the protocol processing component 315 and its associated functionalities will be described in greater detail hereinbelow.

The data movement component 320 may be further characterized by functionalities that may include incoming data movement operations 355 and outgoing data movement operations 360. Incoming data movement operations 355 relate to the moving of the data contents of packets to appropriate destination buffers and application memory whereas outgoing data movement operations 360 relate to the aggregations of the data as described or required by an upper layer protocol or an application and preparing or enabling it to be transmitted.

A distinguishing characteristic of the present teachings over that of the prior art is that commercial general purpose processors are unable to perform all three of the above-indicated functionalities at data rates that are allow for high speed data transmission (e.g. at or near full line speed for 10 Gbit/sec networks at the current time). The PIE architecture of the present teachings desirably overcomes this limitation by employing specialized hardware accelerators that contain dedicated logic to perform these operations at very high data rates thus improving overall performance of the iSNP 120 over conventional network communication devices. More specifically with regard to TCP/IP network communication, the PIE architecture accelerates header processing 310, protocol processing 315, and data movement 320 for the TCP/IP protocol such that very high data rates can be effectively and efficiently handled. As a result, data rates of 10 Gbits/sec or more are achievable with even higher data rates possible applying substantially similar methods and components.

In certain embodiments, for iSCSI layer 164 processing, the PIE architecture may be configured to perform accelerated header processing 310, TCP protocol processing, and data movement 320. iSCSI protocol processing 315, which is not typically computationally intensive, being performed in software on a general purpose processor. Typically, the PIE architecture is configured to perform some or all processing at a high rate of speed such that the iSNP 120 can handle incoming and outgoing traffic at or near a targeted line rate (e.g. 10 Gbits/sec) on a substantially continuous basis. To accomplish the high rate of throughput, the PIE architecture is configured for pipelined processing of packets to improve overall efficiency and to eliminate or reduce stalls.

In conventional network processing scenarios, problems frequently arise in a pipeline when certain data or pieces of information are not be readily accessible or available at the time they are needed by the pipeline or when computations take longer as a result of an exceptional condition. These problems contribute to an overall slowdown of the processing pipeline and lead to undesirable data transmission/processing stalls that markedly reduce performance. The PIE system and architecture of the present teachings overcomes many of these issues and limitations by implementing discrete processing paths wherein each processing path is directed towards handling network traffic and data of a particular composition. In various embodiments, each processing path is optimized to manage a selected network traffic composition and addresses certain issues and problems associated with the selected network traffic composition in order to achieve improved overall information handling.

Figure 6B:
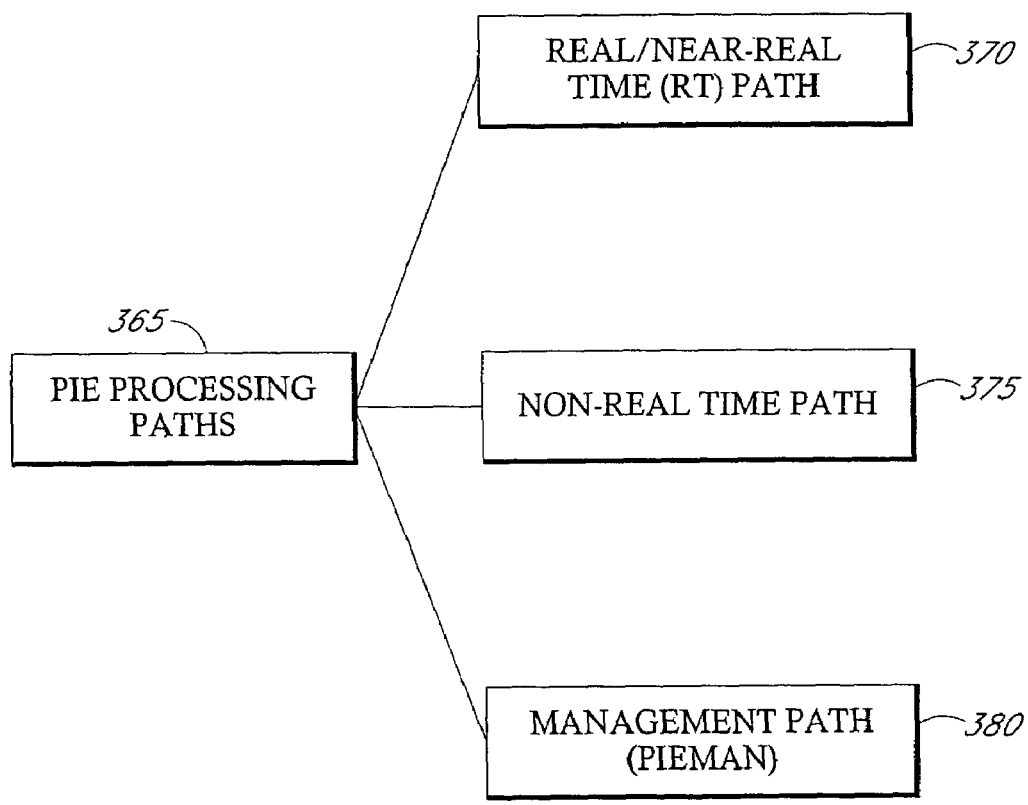
FIG. 6B illustrates a block diagram of processing functionalities of the PIE architecture.

FIG. 6B illustrates a block diagram of processing functionalities of the PIE architecture 365 associated with processing paths comprising: a Real or Near-Real Time (RT) path 370, a Non-Real Time (NRT) path 375, and a Management (PIE-Man) path 380. The RT path is also sometimes referred to as "fast path". The NRT and PIEMan paths are collectively referred to as "slow path". It will be appreciated that the TCP/IP protocol stack is fairly large and complex and a software implementation for accomplishing network processing may give rise to an application having approximately 20,000 lines of -code or more. A further consequence of this complexity is that implementing the entire protocol stack using special-purpose hardware component is generally neither practical nor efficient. The present teachings, address this potential limitation by making use of the fact that most network data transfers occur in a "common case" during steady-state operation of a TCP connection. In such a scenario, significantly similar computations are typically performed on most (a very large fraction of) packets and hence a significant benefit can be obtained by implementing a hardware acceleration solution for the common case network traffic.

Based on this approach the RT path 370 may be directed towards processing common case network traffic in a hardware-accelerated manner to achieve maximum throughput. According to certain embodiments of the present teachings, the RT path 370 comprises a fully hardware-accelerated solution wherein the majority or substantially all of the common case network traffic is processed along the RT path 370.

The NRT path 375, comprises a software-based computational solution that may be executed on one or more general purpose processors and may further be coupled to certain acceleration mechanisms as will be described in greater detail hereinbelow. According to certain embodiments of the present teachings, this path 375 may be used for network traffic cases that are less frequently encountered than the common case network traffic. Typically, there is the potential for a large number of different variations of infrequent case network traffic and hence it is not practical to implement a hardware solution corresponding to each infrequent case (although it may be theoretically possible to do so). Additionally, the overall impact on throughput of such infrequent cases is minimal when the common cases are performed in a hardware-accelerated manner and therefore it is not generally necessary to accelerate these computations.

The PIEMan path 380 represents another software-based computational approach akin to the NRT path 375. Typically, acceleration along this path 380 is not necessary (although it is theoretically possible to do so) as the network traffic that proceeds along this path is very infrequent in nature as compared to the common case. In general, the PIEMAN path 380 addresses specialized network traffic cases and manages aspects of the IP and TCP protocols as will be described in greater detail hereinbelow.

Figure 6C:
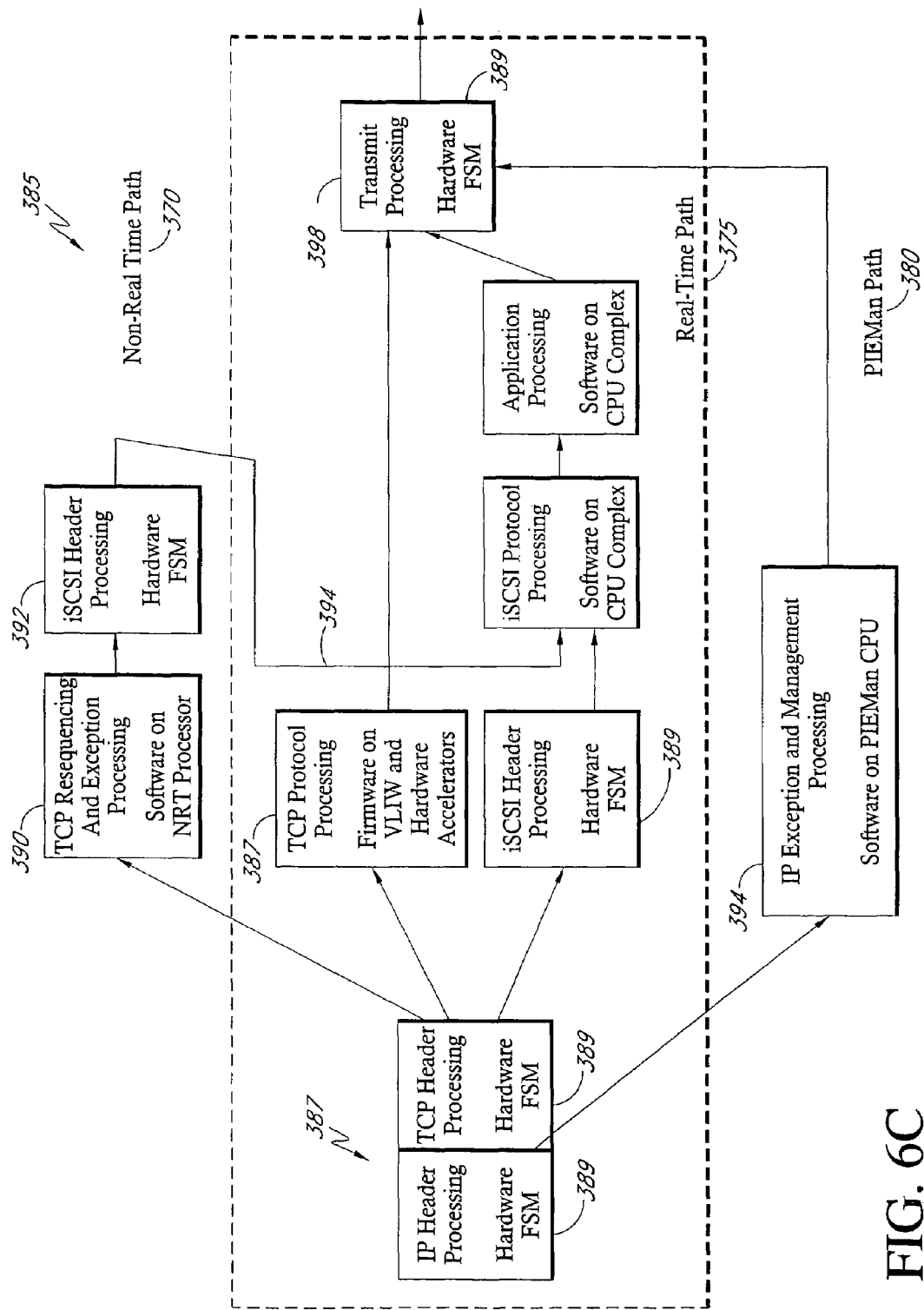
FIG. 6C illustrates a block diagram of PIE processing and acceleration paths as they relate to the iSNP solution.

FIG. 6C illustrates a block diagram of PIE processing and acceleration paths 385 as they relate to the iSNP solution 120. One of the principle functions of the PIE 142 is to receive and categorize network/storage traffic using one or more hardware state machines 387. In the instance of TCP/IP network traffic, IP header processing 388 and TCP header processing 389 take place in the hardware state machines 387 and is classified into Real Time (RT) 375, Non-Real Time (NRT) 370, and PIE-Management (PIEMan) 380 paths as previously indicated and shown.

Information used in subsequent stages of processing is extracted from incoming frames and forwarded to appropriate blocks or components according to the path 370, 375, 380 through which the information will proceed. For example, network/storage traffic that is amenable to hardware processing in the Real Time Path 375 may be processed in the manner shown. Alternatively, network/storage traffic that proceeds through the Non-Real Time path 370 including out-of-sequence TCP segments, TCP connection setup and teardown related segments, and other TCP infrequent and exception cases (e.g. information associated with TCP options) may be processed in the alternate illustrated software accelerated path. Finally, IP frames that are fragmented, are IP-layer management protocol frames, or do not belong to the principal protocols targeted by PIE, are processed in the PIE-Management path 380.

A principal advantage conferred by the present teachings in using the selective data path approach according to the PIE architecture is that the RT path can process the majority of network traffic at very high data rates and in real-time or near real-time. Furthermore, the PIE architecture provides a means to process traffic in a pipelined manner without undue stalls or substantial delays that might otherwise impede the overall performance of network traffic processing. For frames entering the hardware-accelerated real-time path, the worst-case frame-sizes (generally being the smallest frame sizes) may generally be handled without inserting any "bubbles" or pauses in the pipeline.

In various embodiments, the hardware acceleration mechanisms, which may include the use of very long instruction word (VLIW) processors 387 and hardware finite state machines (FSM) 389, represent a convenient and efficient means to enable the real time processing capability for iSCSI/TCP/IP/GbE packet reception, classification, protocol processing, and data transmission. As will be appreciated by those of skill in the art, real-time or near real-time packet header processing and protocol processing in the aforementioned manner represents significant advancement in high bandwidth networking and networked storage applications.

The use of very long instruction word (VLIW) processors 387 further provides an efficient and rapid computational means for TCP Protocol processing using VLIW commands processed by the AWR 146 as will be described in greater detail hereinbelow. Briefly described, the use of software running on VLIW processors 387 impart a significant degree of flexibility beyond that of using exclusively hardwired state machines 387. One rationale for the improvement in flexibility is that these instructions may be reconfigured such that the AWR module 148 can be made to implement a variety of algorithms and parameters that can be used in TCP and similar transport protocols.

Another desirable feature associated with the aforementioned architecture is that a zero-copy buffering approach may be implemented improving processing performance and characteristics ranging from the network receive interface to application data buffers. In one aspect, end to end zero-copy buffering capabilities describe a manner of storing information in memory such that the information received from the Ethernet MAC layer interface 136 from another network device or component may be stored directly into the final main memory region or area designed by the application (for example, the storage controller application) without intermediate buffering and copying in main memory. Zero-copy buffering in this manner improves performance by reducing the amount of main memory and system bandwidth required and provides a means for improved information processing and retrieval as will be described in greater detail herein below.

Referring again to FIG. 6C, when processing incoming frames, the PIE first parses and processes the frames using hardware implemented parsers within the PIE-Rx block 144 (shown in FIG. 3B). The parser functionality verifies the correctness of various headers, checksums, etc. and extracts relevant information from the frames. The parser results further indicate whether a selected frame should be processed in the RT path 375, the NRT path 370, or the PIEMan path 380.

Information processed in the RT path 375 typically comprises the type of computing involved during the data movement indicative of a steady state TCP connection. The header processing aspects of RT path 370 include all parsing, classification, and extraction of relevant information at IP, TCP, and iSCSI layers for incoming data using hardware finite state machines 389. For outgoing data, packet headers may be composed and outgoing data may be assembled using hardware finite state machines 389 as well. The protocol processing aspects of the RT path 375 include generating acknowledgement packets, managing window sizes for TCP flow-control and congestion control, and retransmission (if necessary) using hardware accelerators including VLIW processors 387. Data movement from the network interface to main memory and vice versa may also be handled by hardware DMA engines.

Information processed in the NRT path 380 typically comprises slower and infrequent parts of TCP protocol processing. This type of protocol processing may include re-sequencing of TCP segments that arrive out-of-sequence, TCP connection setup and teardown processing, and TCP options processing. In terms of header processing, the NRT path frames may be processed using hardware FSMs 389 that perform IP and TCP header processing. Subsequently, TCP protocol processing may be performed in software on a general purpose processor, referred to as a NRT processor 390 (present in the AWR block).

If a frame contains an out-of-sequence TCP segment, the software processing functionality of the NRT path 270 may buffer the frame until previous frames in the sequence arrive. Subsequently, the frames may be re-sequenced and passed to an NRT iSCSI PDU Engine 392 for header processing. The NRT processor 390 and NRT iSCSI PDU engine 392 possess a number of accelerators that may share commonality with the RT Path 375. As a result, after re-sequencing and iSCSI header processing, the TCP segment may be returned 394 to the RT Path 375 for further processing in a hardware accelerated manner.

If a frame corresponds to selected TCP protocol exception cases, including connection setup and teardown or TCP options being present, the frames may be processed in software on the NRT processor 390. In certain instances, such as when a frame contains an in-sequence TCP segment but also contains one or more TCP options, the processing associated with TCP options may be directed to the NRT path 370. Generally, however, normal processing associated with in-sequence TCP segments is conducted within the RT path 375 to improve overall performance.

In certain instances, as a result of IP-level analysis, it may be determined that a selected frame is a non-IP frame, an IP-layer exception case (e.g. an unknown upper layer protocol, an IP fragment, an IP options frame), or an IP-layer management protocol frame (e.g. ARP, ICMP, RIP, OSPF). Frames of these types may be categorized as PIE-Man frames for processing in software on a general purpose processor 394 in the PIEMan Path 380. Typically, these frames do not occur with high frequency and hence, their handling need not necessarily be accelerated as overall performance will generally not be significantly affected by these frames.

In certain embodiments, somewhat different criteria for categorizing frames may be implemented, depending on the application. In general, the PIE parses the frames so as to quickly, identify frames that meet certain pre-defined criteria which can be taken out of the RT path 375 to help insure that overall processing can proceed at a maximal or optimal rate without being hindered by non-common case frames.

When any creates a new frame to be transmitted 398, it may be configured to pass descriptor information to the PIE-Tx subsystem 144, which completes the task. If the PIEMan path 380 encounters a set of IP fragments, it may be configured to re-assemble them into a non-fragmented IP frame and analyze the TCP headers in the frame. Subsequently, the frame may be transferred to the NRT path 370 if the frame possesses suitable criteria or properties.

FIG. 7 illustrates an exemplary flow diagram for network data path control and resolution 400. In state 405, incoming data or frames are received by the PIE-Rx 144 and are evaluated in state 410 to determine whether or not they correspond to an iSCSI frame type. If the frame is determined to be a non-iSCSI frame then the data or frame is saved to buffer memory 415 and is subsequently passed to dedicated network information processors designed to manage non-iSCSI traffic.

If the frame is determined to be an iSCSI frame, a separate set of operations is performed which determine the manner of processing that may be used in conjunction with the incoming iSCSI traffic. To improve processing speed and throughput it is generally desirably to route iSCSI traffic through the aforementioned real-time path 375 (e.g. fast path). The real-time processing mode desirably implements a dedicated hardware resolution schema that processes a majority of common case iSCSI traffic. In one aspect, real-time processing in this manner substantially accelerates processing of iSCSI traffic and improves performance, especially in high bandwidth/high demand storage environments. Any iSCSI traffic which is not amenable to real-time processing may be routed through the aforementioned non-real-time path 370 to facilitate resolution of the iSCSI traffic. The non-real-time processing mode 370 may be implemented in hardware in dedicated processors that are distinct from the fast path dedicated processors, or may be implemented on the same dedicated processors used for real-time processing, using additional logic.

Upon determination that an iSCSI frame has been received in state 410, a header check/data digest check may be performed in state 420. This check may be used to validate the contents of the iSCSI frame and used to insure data integrity and consistency in the incoming iSCSI traffic. Subsequently, in state 425 a Protocol Data Unit (PDU) resolution operation is performed wherein the information contained in the iSCSI frame is identified and evaluated to determine the subsequent manner of processing that is to be desirably used in conjunction with the contents of the iSCSI frame. If the iSCSI frame is determined to contain information relating to a target mode data out PDU or an initiator mode data in PDU in state 430 then the information contained in the header of the iSCSI frame is saved to a iSCSI Rx queue and the data contained in the iSCSI frame is saved to a SCSI data cache in state 435. Alternatively, if the frame comprises another type of iSCSI PDU then the header and data information of the PDU are saved to the iSCSI Rx queue in state 440.

In state 445, a determination is made as to whether the incoming data is amenable to real-time processing. In one aspect, iSCSI data that is received in sequence and free of errors may be routed through the real-time processing mode in state 450. Otherwise, if the iSCSI data is determined not to be amenable to processing via the real-time processing mode then the iSCSI data may be routed through the real-time processing mode in state 455. As will be described in greater detail, real-time processing may desirably comprise saving iSCSI data directly to the final destination with zero memory copy, with Transmission Control Protocol (TCP) flow management information passed directly to a flow control module. In the non-real time processing mode, iSCSI data which may include fragmented or out-of-sequence iSCSI data may be saved to buffer memory and subsequently passed to one or more dedicated processors for reassembly and/or resequencing and flow control. Processed iSCSI data may then be returned to the iSCSI Rx queue and SCSI data cache area and the buffer memory area occupied by the iSCSI data released back into a free pool.

Figure 8A:
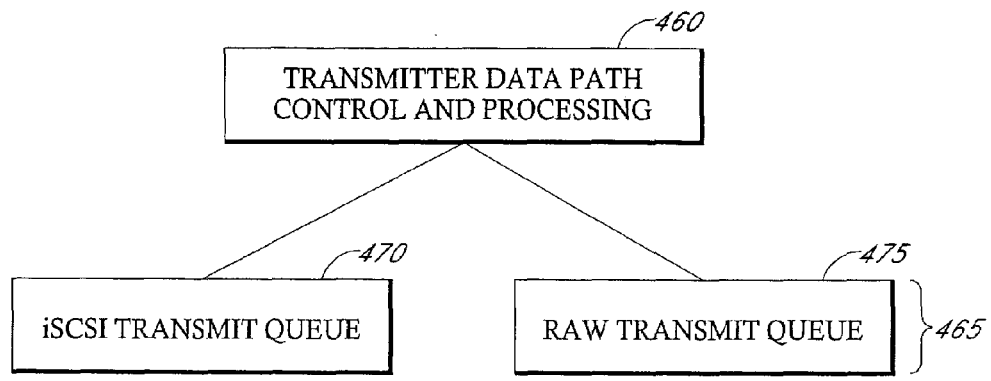
FIG. 8A illustrates a block diagram detailing PIE transmit data path control and resolution functions.

FIG. 8A illustrates a block diagram detailing the PIE-Tx data path control and resolution functions 460 of the storage architecture for iSCSI processing. In one aspect, two types of transmit queues 465 are supported comprising an iSCSI transmit queue 470 used to specify iSCSI PDUs and a raw transmit queue 475 used to point to non-iSCSI frames. Each queue may support one or more connections using fully configurable port priorities. The PIE-Tx data path control and resolution functions 460 may further be used to fulfill iSCSI transmit requests wherein PDUs are specified in an iSCSI Tx queue with transmission managed by flow control functionality within the storage architecture. Additionally, these functions 460 may support the creation of iSCSI header and data digest information for selected PDUs, frames, or chunks, as well as TCP checksum generation to help insure data integrity across the storage network.

Flow control and error recovery may be desirably managed using a Tx window model wherein sliding window management provides end-to-end flow control. Using this model, transmit requests may be created as well as Ethernet, IP and TCP headers for the Tx path. In one aspect, the Tx window model may be used to maintain information detailing unacknowledged transmissions and moderate subsequent transmissions allowing new transmissions up to the remaining Tx window's size. The Tx window model may further provide retransmission timers for unacknowledged transmissions thereby providing a mechanism for timeout retransmission of missing data segments or frames.

In one aspect, the Tx window model provides fast retransmit and recovery functionality by detecting out-of-order segments or frames and subsequently returning a duplicate acknowledgement signal (ACK) to the sender. Upon receiving one or more duplicate ACKs, the sender may be configured to recognize that the indicated data segment or frame may be lost and retransmit the appropriate data thereby avoiding timeouts in data transmission. This manner of processing may be used to desirably improve the performance of the system and reduce dead time.

Round trip time (RTT) estimation may also be incorporated into the flow control and error recovery mechanisms to help improve network performance. In one aspect, an RTT may be calculated as a weighted average or RTT variance by evaluating one or more round trip data transmission samples and calculating the elapsed time between the transmission of each segment or frame and receipt or arrival of the corresponding ACK. Using the calculated RTT information and estimates, retransmission timeout values may be adjusted to adapt the transmission characteristics to a variety of network conditions.

Figure 8B:
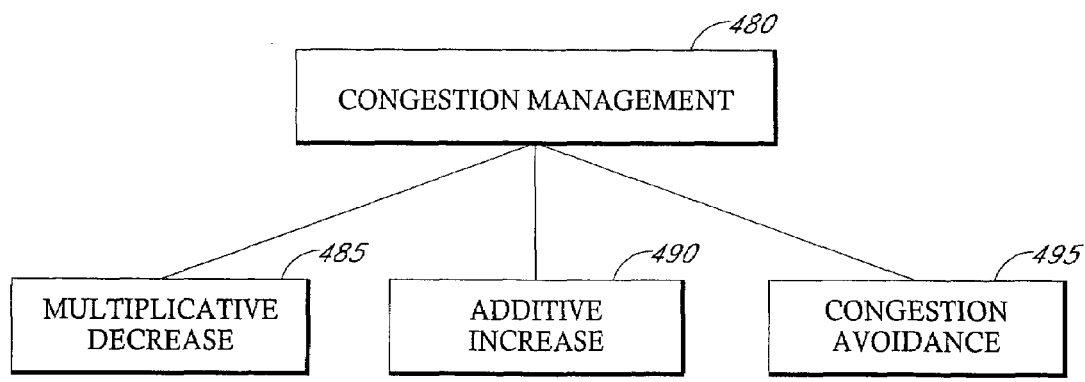
FIG. 8B illustrates the congestion management functionality of the PIE architecture

As shown in FIG. 8B, the congestion management functionality 480 of the PIE architecture may comprise several approaches to reducing network congestion and traffic overload. For example, the congestion management functionality 480 may comprise implementation of a multiplicative decrease approach 485 wherein a congestion window is maintained which limits the Tx window size. Upon loss of a data segment or frame, the congestion window may be reduced in size, for example, approximately halved, and the timeout value for the retransmission timer increased, for example approximately exponentially increased. This manner of processing provides a rapid and significant reduction in traffic thereby providing a means to allow congestion to be resolved in a timely manner without undo performance penalties.

Another congestion management functionality 480 may comprise implementation of an additive increase or slow start approach 490. Using this approach 490, when initiating a TCP connection or increasing the rate or amount of traffic following data congestion, a congestion window may be resized to accommodate increased amounts of traffic. In one aspect, resizing of the congestion window comprises increasing the congestion windows size by one segment or frame for each ACK received. This manner of congestion management limits initial data transmissions until ACK latencies can be evaluated A further congestion management functionality 480 may comprise implementation of a congestion avoidance approach 495 wherein when the congestion window reaches approximately half of its original pre-congestion size, the congestion window is resized by approximately one segment or frame size when one or more segments or frames have been acknowledged. In one aspect, this manner of congestion management provides a means to slow down the rate of increasing congestion thereby avoiding recongesting the network.

Figure 9:
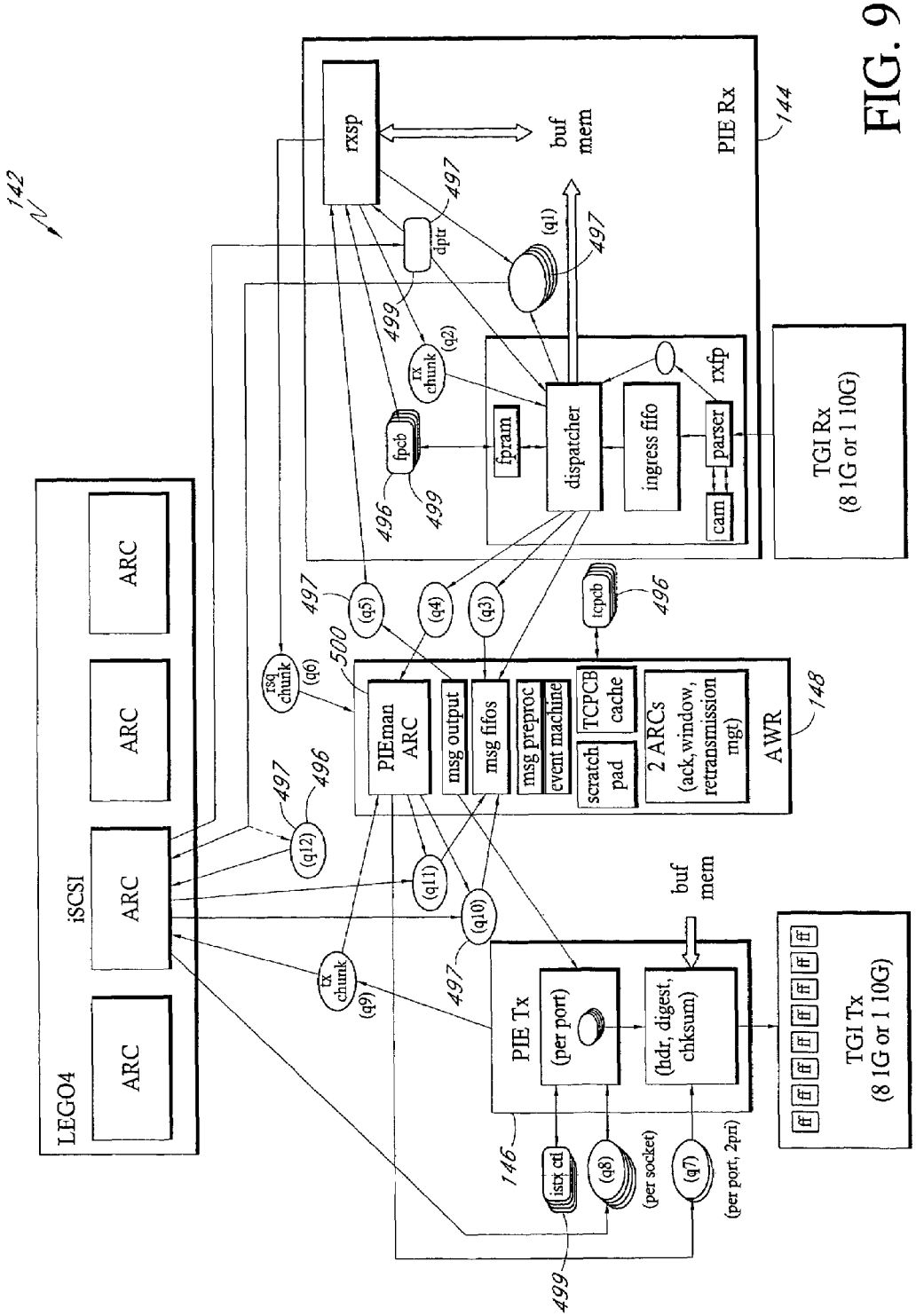
FIG. 9 illustrates a functional diagram of some of the components of the PIE architecture that provide for acceleration of data storage and retrieval requests.

FIG. 9 illustrates a functional diagram of some of the principal components of the PIE 142 that provide for acceleration of data storage and retrieval requests. As previously indicated, a principal feature of the PIE 142 is to offload protocol processing from a software-bound environment and to provide an improved hardware functionality for iSCSI data resolution. In the illustration, greyed elements 496 may be contained within system memory and hatched elements 497 may be contained within cache memory (e.g. L2 cache). Additionally, ellipses are indicative of queue data structures 498 and rounded rectangles are indicative of tables or other data structures 499.

The PIE Rx 148, PIE Tx 144, and AWR 146 modules represent hardware solutions for performing the functions associated with the aforementioned architectural functionality's. More specifically, the PIE Rx 148 principally performs functions associated with receiver data path control and processing, the PIE Tx 148 principally performs functions associated with transmitter data path control and processing, and the AWR 146 principally performs functions associated with flow control and error recovery. Additionally, these components 144, 146, 148 may coordinate their activities and communicate in such a manner so as to provide for congestion management, window avoidance, and activity monitoring functionality's. A further component of the PIE 142 may include a PIE manager hardware component or ARC (PIE Manager processor) 500. In one aspect, the PIEMan processor 500 serves to handle non-iSCSI traffic that has been identified by other components of the network storage system.

As previously noted, the PIE-Rx pipeline 148 (shown in FIG. 3A) provides an efficient receive interface for high-bandwidth hardware accelerated packet processing at the Ethernet, IP, TCP, and application layers. Hardware acceleration of network communications including TCP/IP-over Ethernet and iSCSI network storage data are principal applications of the system, however, it will be appreciated that the acceleration methods may be applied to other communications protocols as well. In various embodiments, the methods described herein are applicable to systems and devices including by way of example: network adapters in computer systems, storage platforms, and various networking systems that process TCP/IP traffic. Implementation of the PIE-Rx 148 and other system components enables acceleration of TCP/IP packet processing alone as well as acceleration of iSCSI processing along with TCP/IP processing in an integrated solution.

Hardware acceleration of routine traffic or common cases in packet processing by the PIE-Rx 148 represents an efficient means by which to gain a substantial performance increase over conventional systems while at the same time reducing the complexity and inherent problems that may arise when attempting to provide a hardware-accelerated solution for all possible types or circumstances of network traffic. As will be appreciated by those of skill in the art it is neither practical nor efficient to employ dedicated hardware acceleration for all aspects of TCP/IP and iSCSI protocols at the commercial level. As such, in the following discussion, the common case hardware-accelerated path is referred to as the Real-Time Path (RT Path or fast-path) and represents the path through which the majority of network traffic proceeds during routine operation. Non-accelerated or partially-accelerated aspects of network traffic processing are likewise handled in a Non-Real Time Path (NRT Path or slow-path) resolution scheme that is expected to handle a significantly smaller fraction of the overall quantity of network traffic and is principally directed towards dealing with network traffic that does not conform to the common case.

Figure 10:
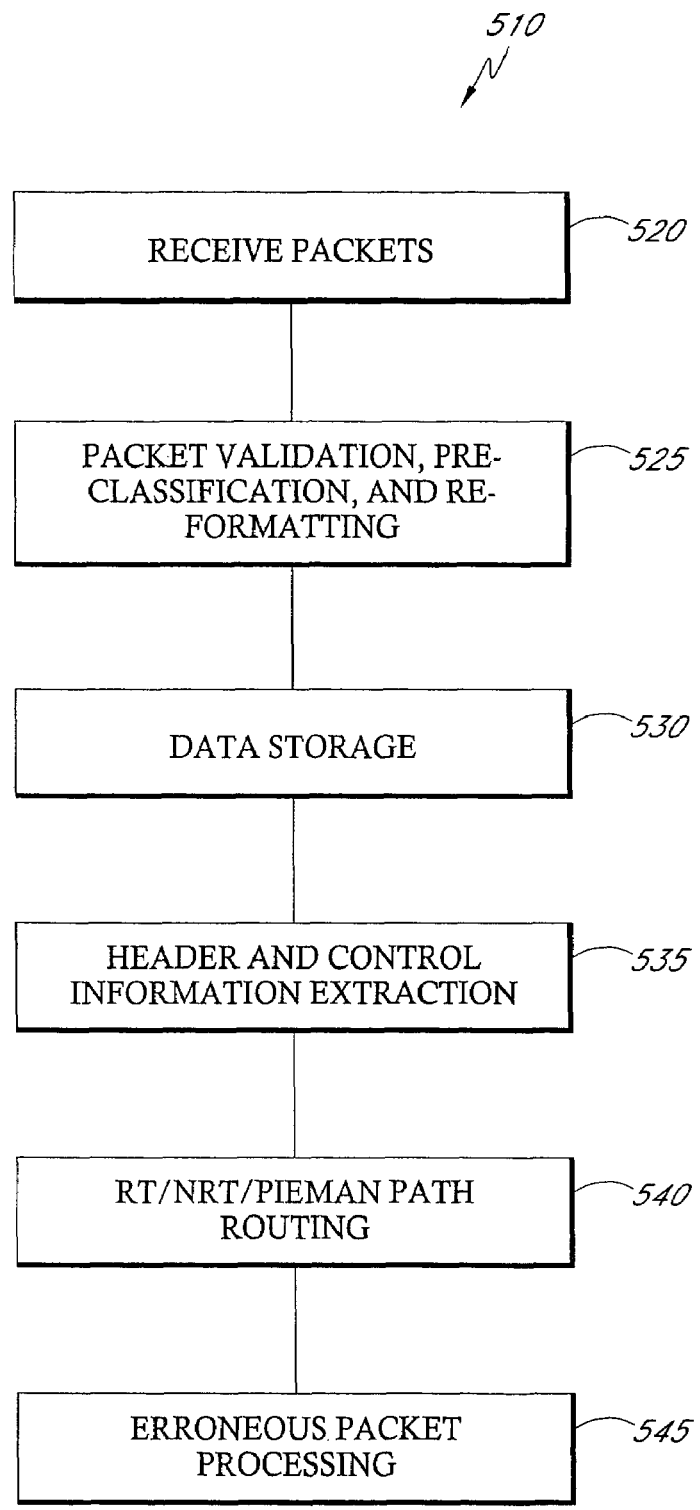
FIG. 10 is a block diagram that summarizes the principal functionalities of a PIE receive module.

FIG. 10 is a block diagram that summarizes the principal functionalities 510 of the PIE-Rx 148. A more detailed description of each of these functionalities 510, as well as the underlying components of the PIE 142 that may be used to achieve these functionalities 510 will be described in greater detail hereinbelow. The PIE-Rx 148 serves as a logical gateway for routing of network traffic to achieve improved performance which commences in stage 520 with the reception of network packets arriving on incoming network ports. As previously indicated, the PIE-Rx 148 may be configured to handle incoming traffic from a plurality of ports and may further process multiple different types of network traffic relating to one or more different protocols.

In stage 525, the PIE-Rx 148 performs operations directed towards processing of the received packets. These operations may further comprise de-encapsulation of packetized information, packet/data validation using data digests, packet classification, and incoming packet parsing at the Internet Protocol (IP), TCP, and iSCSI levels. In stage 535, the PIE-Rx 148 may identify header and control information within the incoming packets and pass the appropriate components to other subsystems for related processing. In state 540, the PIE-Rx 148 performs a routing determination wherein a decision is made as to whether a packet will be processed by the RT, NRT, or PIEMan path. At least a portion of this determination may be predicated upon identifying the packet composition and the nature of the incoming packet stream. Common case packets received in-order and free from error are desirably routed through the RT path hardware accelerated path to insure improved processing efficiency and speed. Alternatively, non-common case packets including packets received with errors or out-of-order are routed through a suitable NRT path mechanism to properly handle the packets. In stage 530, the PIE-Rx 148 may identify data containing within the incoming packets and write this data to a selected memory location/region designated by an associated application. In stage 545, the PIE-Rx 148 performs a specific identification of the nature of the erroneous or incomplete packets and determines the appropriate action to take including routing of the non-common case packets to a suitable packet resolution mechanism.

A brief synopsis of some of the salient capabilities of the PIE-Rx 148 include:

The PIE-Rx possesses the ability to operate at or near full line rate. This implies that network communications including network storage requests and information transmissions may proceed at or near the maximum bandwidth or speed of the transmission line without significant bottlenecking arising during packet resolution at a source or destination device. Current embodiments of the system can be demonstrated to operate with approximately a 10 Gb per second aggregate line rate with efficient processing at higher line rates readily possible. Thus the system and methods of the present teachings are well suited to improve performance in current networking implementations as well as being able to accommodate future implementations.

The PIE-Rx 148 can be used both as a TCP/IP-offload engine and an iSCSI-over-TCP/IP offload engine. This implies that the PIE-Rx 148 is not limited exclusively to improving performance in the context of network storage communications but may also be utilized during routine network communications in a non-network storage context. Consequently, the PIE-Rx 148 may be adapted for use with a wide variety of networking protocols to improve communications in many contexts.

The PIE-Rx 148 improves performance through "Zero Copy" transfer of data. This implies that data contained in network packets may be written directly to its final destination in memory as indicated by application layer software, for example storage subsystem software, without requiring the use of intermediate memory buffers for re-assembly, re-sequencing, error-checking, etc. In one aspect, avoiding the use of intermediate memory buffers desirably limits performance penalties incurred as a result of multiple memory access, copying, and transfer operations using a more streamlined approach in which the final destination for the data is identified and written to in a singular operation. This capability is significant to performance and cost-effectiveness in high throughput systems wherein by way of example a "One Copy" data path would require twice as much buffer memory bandwidth and which would typically require twice as many pins and memory arrays to achieve the same end-result as the "Zero Copy" solution.

Figure 11:
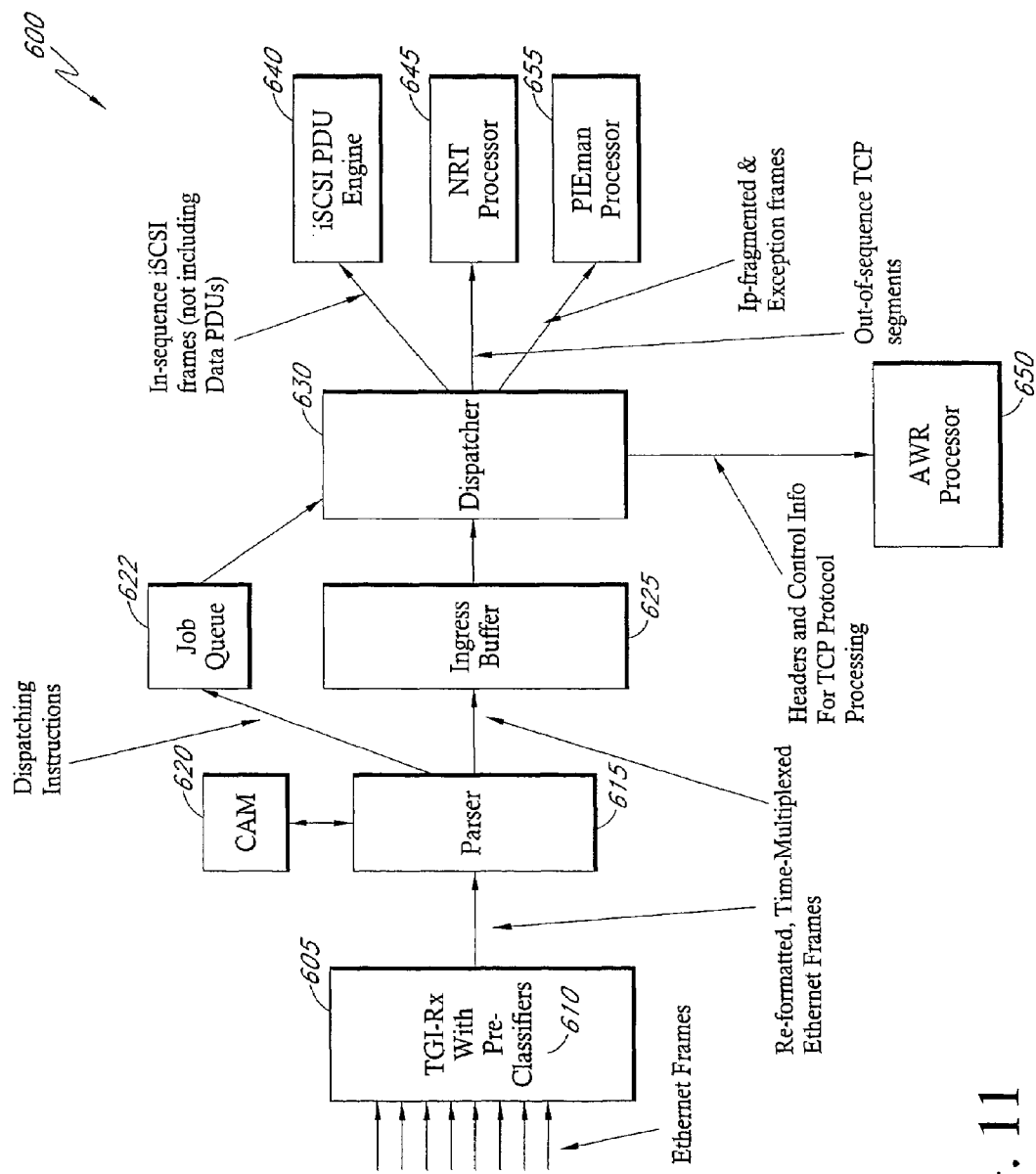
FIG. 11 illustrates a detailed block diagram of the principal components of a PIE receive pipeline.

FIG. 11 illustrates a detailed block diagram 600 of the principal components of the PIE-Rx pipeline 148 used to achieve the aforementioned capabilities and benefits. A TGI-Rx component 605 represents the receive interface for incoming network traffic. The TGI-Rx component 605 operates by acquiring network traffic and forwarding the information to other components of the PIE-Rx 148. The TGI-Rx component 605 may further be configured to support one or more network protocol interfaces including for example a 10 Gbit/sec Ethernet interface or a plurality of 1 Gbit/sec Ethernet interfaces. In various embodiments, the network traffic represents a time-multiplexed stream of data from one or more network ports. It will be appreciated that the methods described herein are suitable for other types of network protocol interfaces and may support higher or lower bandwidths.

Information received by the TGI-Rx component 605 is typically reformatted and processed by a Pre-Classifier component 610 which partially validates and pre-classifies packets for easier handling downstream. The Pre-Classifier component 610 may perform a packet header alignment function to improve downstream informational processing by alleviating the need for subsequent components from having to parse the packets multiple times. Furthermore, the packet header alignment functionality facilitates various downstream components ability to locate specific information at selected locations in the data stream. In one aspect, the Pre-Classifier component 610 re-formats each Ethernet frame and attaches a TGI Tag and a TGI Offset to each double-word of data that it forwards to other components of the PIE-Rx 148.

A parser component 615 then receives the re-formatted, time multiplexed frames from the TGI-Rx component 605 and parses them to extract selected information from the packet headers. The parser 615 is responsible for making the determination as to whether a selected frame will be processed by the "fast path" or the "slow path" based upon the type of frame received. In one aspect, the parser 615 operates in connection with a Content Addressable Memory (CAM) component 620 to determine if the frame is part of an active TCP connection with the information relating to this determination passed to later pipeline stages.

An ingress buffer 625 represents a buffer for incoming packet streams passed from the parser 615. In one aspect, data is stored in the ingress buffer 625 using a FIFO queue for each network port related to the system. Data that is accessed from the ingress buffer 625, it is typically written directly to a region of memory designated by the application software. For such a configuration to operate efficiently and to avoid application data from becoming corrupted, packets may be validated prior to being written to the designated memory region. To this end, each FIFO queue may be configured to buffer a complete packet. In one aspect, the PIE-Rx pipeline may be configured to support packet sizes of varying lengths including relatively large Ethernet packets (jumbo packets) of up to 9016 bytes or more. Operating at or near full line rate, may further be accomplished by providing approximately 12% additional storage in each FIFO queue.

A dispatcher component 630 accesses data and information from the ingress buffer 625 and is responsible for sending relevant control information and data to various processing subsystems, based on information extracted by the parser 615. For in-sequence TCP segments containing iSCSI frames (e.g. common case information), the TCP payload is forwarded to an iSCSI PDU engine 640 for further processing (e.g. RT path processing). In one aspect, the iSCSI PDU engine 640 receives the TCP payload from the dispatcher 630 and performs selected iSCSI-layer processing operations. These operations may include the demarcation of iSCSI PDUs, headers, and data segments. Furthermore, the iSCSI PDU engine 640 may determine the type of each iSCSI PDU and direct iSCSI header and data to destination queues and buffers in the storage subsystem.

For out-of-sequence TCP segments, header information is sent to a NRT path processor 645 and data is directed to a region of memory designated as "Rx Chunks" (not shown). For non-IP-fragmented TCP frames, a message may be enqueued to a AWR subsystem 650 that performs TCP protocol processing including acknowledgement, windowing, and retransmission. IP-fragmented and other exception packets are directed to a PIEMan processor 655 for processing in software.

In one aspect, the TGI-Rx 605 operates in multiple selectable modes. For example, the TGI-Rx 605 may operate in a 10 Gb Ethernet (XGE) mode, representative of a single 10 Gbits/sec Ethernet port utilizing a single pre-classifier 610. Additionally, the TGI-Rx 605 may be configured to operate in a 1 Gb Ethernet (OGE) mode wherein the TGI-Rx 605 comprises up to eight discrete 1 Gbit/sec network interfaces and associated pre-classifiers 610.

Figure 12B:
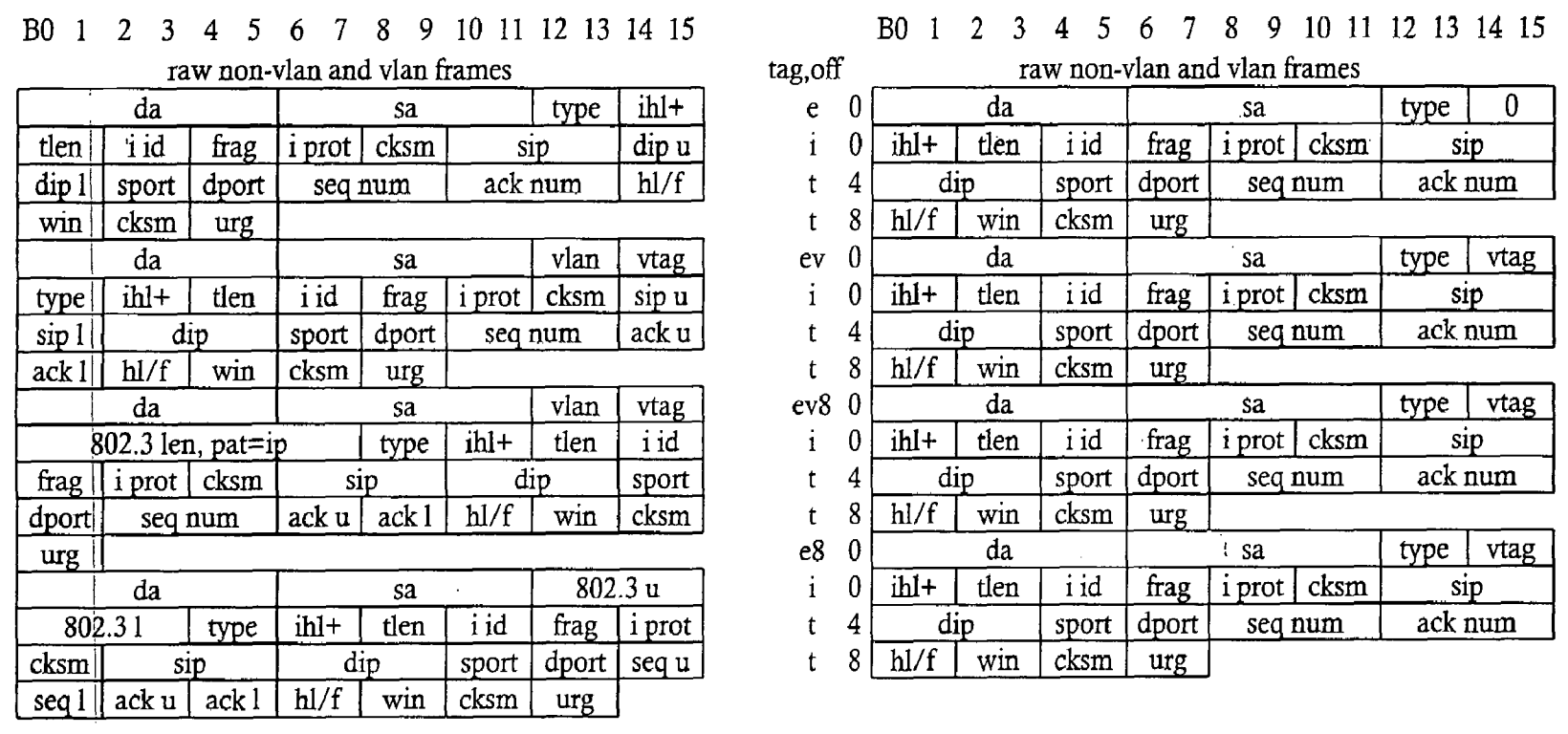

The TGI-Rx 605 generally transfers data to the parser 615 one double-word (64 bits) at a time. In OGE mode, data from the eight ports may be multiplexed onto the link to the parser 615. The integrated packet pre-classifier(s) 610 integrated with the TGI-Rx 605 operate to generate tags and offsets for each individual double-word to indicate the particular contents, as shown by way of example in FIGS. 12A-B. For IP frames, each pre-classifier 610 may be configured to reformat the data such that the IP header starts at the 17$^{th}$ byte (byte 0x10) in the frame. A VLAN tag, if present, resides in the 16$^{th}$ byte (byte 0xf). The presence of 802.3 rfc1042 formatting (length plus LLC/SNAP pattern 0xaaaa03_000000 after MAC addresses) may be indicated by a special tag value. Finally, the TGI-Rx 605 pads the last dword of a frame with an end of frame (EOF) dword.

In various embodiments, a tag may be used to indicate whether a selected frame is good or bad. When the tag is good, the EOF data dword may be configured as follows:

1) The length of the formatted frame may be specified (in bytes, starting with the MAC destination address);
2) The TCP/UDP checksum may be specified (if applicable) (Note: for unfragmented TCP/UDP frames, the checksum may include coverage of the SIP, DIP, protocol, and segment/datagram length pseudo header. For IP fragment 0 frames, the length field of the pseudo header may be set to zero indicating it is unknown.);
and
3) The TGI-Rx may be configured to remove pad bytes prior to the EOF dword.

As data is received from the TGI-Rx 605, it is examined by the parser 610 to determine how to process each frame. In OGE mode, the parser 610 processes a multiplexed data stream collected from each network port. The parser 610 may be implemented as a single state machine, time-shared between data from distinct ports which maintains one context register per network port.

An exemplary illustration of the context maintained by the parser for each network port is shown in FIG. 13A. When the parser 610 receives a double-word corresponding to port "N", it loads the context register "N", processes the data, and stores the context register "N" back to a register file. The state field 805 describes the current state of the parser 610 for each network port wherein the parser finite-state-machine 800 may be configured with a plurality of states. The ts_offst field 810 indicates if a timestamp TCP option is present and if present, the offset at which it occurs in the TCP header. The parser 610 checks the TCP options to see if any options other than the timestamp option are present. Generally, a timestamp option may be present if (a) the TCP header length is a specified length (e.g. 8 words including a 5-word header plus 3-word option) and (b) the TCP option begins with a specified value (e.g. a timestamp value of 0x080a, a NOP/timestamp value of 0x01080a, or 2 NOPs/timestamp value of 0x0101080a). An option other than a timestamp value may be present if the TCP header is of a specified length (for example greater than 5 but is not equal to 8 or if the above option check fails). If a timestamp is present, the parser 610 may be configured to set the ts_offst field 810 to the appropriate nonzero value shown in FIG. 13A. In one aspect, if an option begins with 0x080a it may end with 0x0000 (two end of option bytes), or if the option begins with 0x01080a it may end with 0x00 (one end of option byte), however NOPs may also be accepted. The t_left field 815 indicates that the TCP header starts in the left half of the double-word. This may happen when IP options exist and occupy an odd number of words. The reason field 820 may be used to indicate the reason that a frame can not be processed by the RT path. When 0, RT processing is possible; for all other values, the frame should be processed in one of the slow paths—NRT or PIEMan. The reasons are listed in FIG. 13B. In certain embodiments, reasons b, c and d are not determined by the parser 610, but may instead be determined by the dispatcher 630 in a subsequent stage of the PIE-Rx pipeline 148 wherein the dispatcher 630 maintains knowledge of each TCP session state, including sequence numbers. The remaining fields shown in FIG. 13A including Msw_par, d_left, d_data, and d_par constitute intermediate states that may be maintained by the parser f605 or each packet stream as it switches between packet streams.

In various embodiments, the parser 615 utilizes the uses the CAM 620 to determine if a selected frame belongs to an active connection. Generally, application software is responsible for initializing the CAM 620 with information that may be used to properly identify active connections. Exemplary identifying information that may be used by the CAM 620 may include source-address, destination-address, port number, and other such information. Information obtained from each incoming frame is then compared against the CAM entries to determine if the packet corresponds to an active connection. In those instances where a match occurs between the incoming frame and the CAM entries, the CAM 620 returns the connectionID for the frame which may then be forwarded by the parser 615 to later stages of the computational pipeline.

When IP fragmented frames are encountered, the fragment "0" frame will contain the TCP header. The TGI-Rx 605 performs a special check for this occurrence and tags the TCP header of the corresponding frame. If the IP-fragmented frame represents a TCP segment with an iSCSI payload, the parser 615 selects the aforementioned slow-path-reason code (shown in FIG. 13B) to "iSCSI, IP fragment" such that the connection ID and other TCP information will be forwarded to slow-path processing elements 645.

As previously indicated, the parser 615 utilizes the content addressable memory (CAM) component 620 to look up upper layer connection information for each frame which may include an associated TCP connection number. Typically, each active connection is associated with a unique TCP connection number by application software. In one aspect, the application software associates the TCP number with a TCP-connection 3-tuple comprising the source-IP-address, destination-IP-address, and TCP-port-number when it is created. Here, the 3-tuple is entered into the CAM 620 at the location specified by the TCP number. Thereafter, software may delete the CAM entry when the iSCSI connection is closed. While the connection is active, however, a search within the CAM 620 with a matching 3-tuple returns the TCP-connection number.

In various embodiments the CAM 620 and associated search keys are configured to be approximately 81-bits wide and comprise a 32-bit IP source address, a 32-bit IP destination address, a 16-bit TCP port number, and a 1 bit flag indicating a target or initiator mode. In the target mode (TCP DPORT matched iSCSI) the SPORT is used for the search while in the initiator mode (TCP SPORT matched iSCSI) the DPORT is used for the search. The search result returns a 10-bit TCP connection number plus a valid flag.

In addition to a content-addressable memory array, the CAM component 620 may further comprise a search request queue, a search result file, and a search control block. Requests to the CAM component are summarized in FIG. 14. As shown in the illustration there exists a CAM-Key register for each network port. The register may be written by the parser 615 incrementally as it parses portions of incoming packets. When all fields of the search key are assembled, a CAM_REQ command may be issued that enqueues the search request to a CAM search request queue. Thereafter, the CAM 620 signals command completion by asserting a completion signal for the corresponding port. At this point, a CAM_RESULT command may be used to acquire the TCP connection number resulting from the search and a valid bit. The valid bit provides an indication of whether the search found a matching entry within the CAM 620 and that the TCP connection number in the result is valid.

To achieve frame processing at or near full line rate the CAM 620 is desirably configured to perform lookups in a rapid and efficient manner. For example, in the current implementation, the CAM 620 is configured to complete a lookup in four or less cycles as a worst case average rate at which IP frames can arrive in the XGE mode. For the OGE mode, a similar constraint is imposed as a result of the concurrent arrival of multiple frames. For example, frames may start back-to-back for approximately eight cycles, with an average rate of approximately one per four cycles. In such instances, a CAM search queue serves as a buffer for high demand instantaneous bursts. In general, searches initiated by the parser 615 have priority over CAM_LOAD, CAM_READ, and CAM_INV operations by a processor. In fact, a preemption technique may be employed wherein the latter operations may be aborted if a search request arrives to improve the processing speed of fast-path frames at or near full line rate.

In certain embodiments, the CAM 620 comprises approximately 1024 entries. Thus, if the number of connections is limited to approximately 1024, the CAM 620 can be expected to maintain substantially all active connections. In an alternative implementation, the CAM 620 can be configured to support more than 1024 connections. In this alternative implementation, the software can manage the CAM 620 like a cache such that when all entries are occupied and a new connection is created, the software can delete an entry and replace it with an entry for the new connection. Subsequently, when a frame corresponding to the replaced connection arrives, it may be directed for slow-path processing in software. The software may then be configured to create a CAM entry for it, potentially replacing another existing entry. By judicious choice of an entry replacement policy, the performance of this approach can be highly effective and give performance characteristics rivaling that of a larger CAM 620. In various embodiments, replacement policies may include: replacing the least recently used entry and replacing an entry not used for some selected time period.

For each frame, the parser 615 extracts information which is desirably communicated to later pipeline stages and components and sends this information to the dispatcher 630 via a job queue component 622 (see FIG. 11). FIG. 15 illustrates exemplary types of information that may be extracted by the parser 615. In one aspect, the job queue component 622 may be implemented using a singular FIFO queue for each network port. These FIFOs may be further configured as bit-writable by the parser 615 thereby enabling fields to be written as they are encountered in the packet stream. When an End-of-Frame (EOF) indication is received by the parser 615 and after the results of the aforementioned CAM lookup are available, if no error conditions exist for the frame, the tail pointer for the FIFO queue may be incremented thereby enqueueing an entry in the FIFO queue. If the frame is found to be erroneous, the tail pointer is not incremented effectively dropping the packet.

The ingress buffer 625 buffers data as it arrives from network ports until the data can be deposited to a memory region in the application software domain. In various embodiments, the ingress buffer comprises a singular FIFO queue for each network port in PIE-Rx 148. The aforementioned principle of "zero copy" buffering may further be employed in the design of PIE-Rx 148 where data is written directly to data structures in the address space of the application software. In general, main memory-based buffers, including for example network interface buffers or operating system buffers, are not necessarily employed for temporary storage, reorganization, or re-assembly of data. In conventional systems where main-memory based buffers are used, data must be read and written to memory more than once. These reads and writes to intermediate buffers consume memory bandwidth and impart performance penalties on the system. In high bandwidth applications where memory bandwidth is at a premium this represents a potential bottleneck wherein intermediate buffer accesses significantly degrade overall performance.

One implication of the zero-copy paradigm of the present teachings is that data is not written to the application memory space until it is validated. Writing data contained in an erroneous or corrupted packets would undesirably cause the application to generate potentially incorrect results. To avoid this problem, the PIE-Rx 148 buffers each frame into the entirety of the ingress buffer 625 and validates it before writing to an application memory space. In one aspect, the ingress buffer 625 for each network port is configured to be at least as large as the expected maximum size of incoming network frame. For example, Ethernet jumbo frames, the largest frames defined for Ethernet, typically possess a maximum size of 9016 bytes, consequently the ingress buffer 625 for each network port is configured to be at least this large to accommodate a full frame.

In various embodiments of the present teachings, a buffer size of approximately 10 Kbytes is used for each port with each buffer implemented using a single-ported RAM. Each cycle, the control logic alternates between reading and writing operations (dequeueing and enqueueing, respectively). Following this approach desirably utilizes less chip area and less power than other conventional alternatives, such as a dual port RAM. Additionally, circular buffers with read and write (e.g. head and tail) pointers may be used to implement each FIFO queue.

In addition to the read and write pointers, each FIFO queue may possess a "Frame-Start-Pointer", which points to the first word of the current frame. When an arriving frame is determined to be erroneous and subsequently discarded, the write pointer may be reset to the value contained in Frame-Start-Pointer, effectively discarding the frame.

In various embodiments, the read-interface to the Ingress buffer 625 comprises a random access interface. Rather than reading data in FIFO order, the dispatcher 630 may access the data in random order. In this manner, the dispatcher 630 may skip a selected number of data elements (e.g. qwords) contained in the queue and accesses a desired data element first. By examining the desired data element first and comparing it with the stored sequence number, the dispatcher 630 can determine if the corresponding frame is a fast path frame. In such an instance, the dispatcher 630 need not read the first and second data elements at all and allows the dispatcher 630 to maintain full or near full line-rate operation for fast-path packets.

There are two programmable thresholds associated with Ingress FIFOs: the "pause on" threshold and the "pause off" threshold. When a FIFO level first exceeds the "pause on" threshold, the PIE-Rx causes a PAUSE frame to be sent to the upstream device on the corresponding network port. Subsequently, when the level drops before the "pause off" level, a PAUSE-OFF frame can be sent to the upstream device on the corresponding network port. PAUSE and PAUSE-off are flow control packets defined in the Ethernet specification.

The dispatcher 630 is responsible for routing frames to fast-path 640 or slow-path 645 processors, based on control information sent by the parser 615. Upon receiving a task from the job queue component 622, the dispatcher 630 performs functions that may include:

For in-sequence TCP segments containing iSCSI frames, the TCP payload is forwarded to the iSCSI PDU engine 640;

For out-of-sequence TCP segments, header information is sent to the slow path processor 645 and data is directed to a region of heap space in application memory (referred to a "Rx Chunks"), from where it is re-sequenced;

For non-IP fragmented TCP frames, a message containing information related to TCP-protocol processing including acknowledgement, windowing, and retransmission (AWR) is passed to the AWR subsystem 650; and For packets marked as IP-fragmented or with other exception reason codes (except possibly codes 0 and c) that may utilize software handling, the packets are sent to the PIEMan subsystem 655 for software processing.

In certain embodiments, the dispatcher 630 processes frames from a plurality of network ports. These frames arrive at the dispatcher in the form of time-multiplexed data streams, one from each network port. Since the dispatcher consists of a single state machine that must process multiple data streams, it maintains context for each network port, as shown in FIG. 16. While processing data from a particular network port, the dispatcher state machine uses context for that specific port.

Additionally, the dispatcher 630 processes frames from a plurality of TCP connections at the same time. In order to do so, it maintains state information corresponding to the data streams from each connection in the form of "connection contexts". Typically, a single context is assigned for each connection. Elements of the context are listed in FIG. 16. As the dispatcher switches between connections, it accesses the corresponding context.

The dispatcher maintains connection contexts in a private memory called the FPRAM. However, when slow path processing is required for a connection, it copies the context to a region of main memory to enable the NRT processor to access the information. Once the NRT processor is done, and the connection returns to fast path, the context is copied back into the FPRAM.

The dispatcher 630 may further be optimized for the fast path iSCSI processing at or near full line rate. In general, the dispatcher 630 is configured to handle fast-path iSCSI frames relatively expediently and efficiently, prior to considering other frame types. In one aspect, a scenario in which a frame comprising a fast path iSCSI frame is identified is termed an "expected scenario". The dispatcher 630 fetches frame data from the ingress buffer 625 on the basis of where it is expected to be located in the expected scenario. If upon further examination it is determined that due to the presence of IP options, fragmentation, and other exceptions, the information is not located where it would reside in the expected scenario extra cycles may be involved in processing.

In one aspect, the steps involved in processing include:

The dispatcher 620 fetching the job from the job queue 622 and concurrently fetching the third qword of the ingress buffer 625 using a random access mode when the job is available. In the expected scenario, the TCP sequence number and ACK number are located in the third qword.

If the job is determined to be an iSCSI job, the dispatcher 630 fetches the fourth qword from the ingress buffer 625, in the aforementioned random access mode, as well as the connection context for the corresponding connection. These two fetches may be performed concurrently. In the expected scenario, the TCP sequence number for the frame may be compared with the TCP sequence number in the connection context for the corresponding connection. In the expected scenario, the numbers will match and the iSCSI frame may be dispatched to the iSCSI PDU engine 640 and headers/TCP control information dispatched to the TCP Protocol Processing or AWR subsystem 650. The iSCSI PDU engine 640 subsequently moves the data payload from the ingress buffer 625 to the designated space in application memory and the information in the FPRAM is updated.

In one sub-case instance, the sequence number may not match, but the sum of the sequence number in the frame and the TCP payload length may be less than the expected sequence number in the connection context. In this scenario, the frame may be determined to be a duplicate, and depending on a flag configured by software, the frame may be discarded or passed to the slow-path processor 645.

In another sub-case instance, the dispatcher 630 or application software may set a bit in the FPRAM, causing subsequent frames for the corresponding connection to proceed through the slow path processor 645 at least until the bit is reset.

If IP options are present within the frame, the location of the TCP sequence number may be determined to depend on the number of IP option words in the frame. The TCP sequence number may then be desirably extracted from the third, fourth or fifth qword. Once the sequence number is extracted, it may be compared with that in the FPCB. If the numbers match, the frame may be processed as a fast path frame and dispatched as indicated above. In addition, the IP options may be extracted and a control message sent to the PIEMan 655 for processing of the IP options.

The presence of TCP options also affects the start of the iSCSI payload. Hence, when this is indicated in the TCP header, the offset at which iSCSI PDU starts is calculated and the PDU is demarcated based on the calculated offset.

In various embodiments, the three values (hex c, d, and e) of the slow-path-reason code shown in FIG. 15 are defined by the dispatcher 630 and used as described hereinbelow.

Slow path processing may be employed in cases where the slow-path-reason code is greater than 0. According to this embodiment, two distinct processors may be used for slow-path processing and including the Non-Real-Time processor 645 responsible for re-sequencing out-of-sequence TCP segments that are iSCSI PDUs and the PIEMan processor 655 responsible for other exception frames.

In various embodiments, NRT path processing may proceed as follows:

In NRT path cases, the frame is stored in a heap space referred to as "Rx chunks";

If the code is 8 or greater, the TCP connection number is determined to be valid, and fast path processing is not disabled, the dispatcher 630 may disable fast path processing for the connection. In one aspect, the dispatcher 630 may set a fast-path-disabled bit for the corresponding connection in the FPRAM and then copy the content to the FPCB in main memory, where it can be access by the NRT 645.

For iSCSI frames with valid socket IDs, the dispatcher 630 may calculate the next expected sequence number by adding the received sequence number to the TCP payload length. If the resulting value is less than the expected Seq_number in the FPRAM, the FPRAM value may be updated, whether or not fast path is enabled. If the fast path is disabled, the next_seq number may be used to determine when to return from slow path to fast path.

For non-iSCSI frames, corresponding to slow-path reason codes 1-7, the control information may be forwarded to the PIEMan processor 655, for processing in software. Similarly, for IP fragmented iSCSI frames, corresponding to slow-path reason code 8, the control information may be forwarded to the PIEMan processing 655, for processing in software.

For slow-path reason codes 9-d, if IP options are present within the frame, the control information may be sent to the PIEMan processor 655. If IP options are not present, the control information is sent to the near real time processor 640.

In order to reduce the size of buffers used in the ingress buffer 625, the dispatcher 630 may perform a time-multiplexing operation between data from distinct network ports when unloading frames from the ingress buffer 625 to application space in main memory. In one aspect, jumbo frames may occupy as much as approximately 90% of an ingress FIFO, if each Jumbo frame resides in discrete ingress FIFOs, corresponding to discrete network ports, and the frames are unloaded one at a time, overflow may occur. Therefore, it is beneficial to unload the frames in parallel, prioritizing them by the instantaneous degree of fullness of each ingress FIFO. Processing in this manner may result in substantially all FIFOs being unloaded without significant overflow or PAUSE frames.

Figure 17:
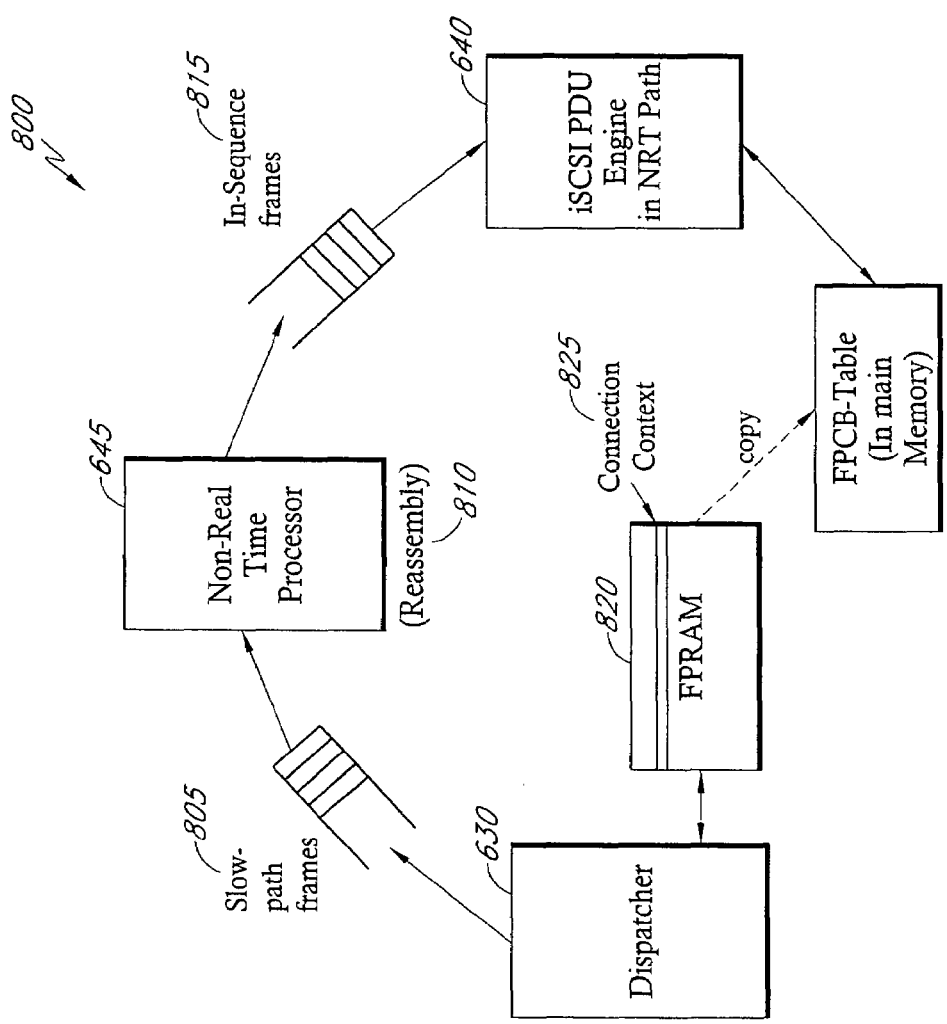
FIG. 17 illustrates a block diagram of routing functionality provided by a dispatcher component associated with the PIE architecture.

FIG. 17 further illustrates a block diagram 800 of the routing functionality provided by the dispatcher 630. For TCP segments containing iSCSI frames, the switch from RT path to NRT path and vice versa is negotiated by the dispatcher 620 that is configured to decide whether a frame should proceed through the NRT path or stays in RT path. In various embodiments, this determination is based on conditions that may include (a) the value of the fast-path-disable bit in the FPRAM for the connection and (b) the value of the TCP sequence number in the frame. NRT path frames 805 are sent to the NRT (slow path) processor 645 for re-assembly 810. After re-assembly, the frames 815, now in-sequence, are forwarded to NRT path hardware subsystem, which includes an iSCSI PDU engine 640. The iSCSI PDU engine 640 demarcates the iSCSI PDUs and forwards them to the storage application software. There are two instances of the iSCSI PDU engine—one in the RT path subsystem and another in the NRT path subsystem. The use of duplicate iSCSI PDU engines makes the transition between NRT and RT paths significantly easier than if one engine were shared between the two paths.

Figure 18A:
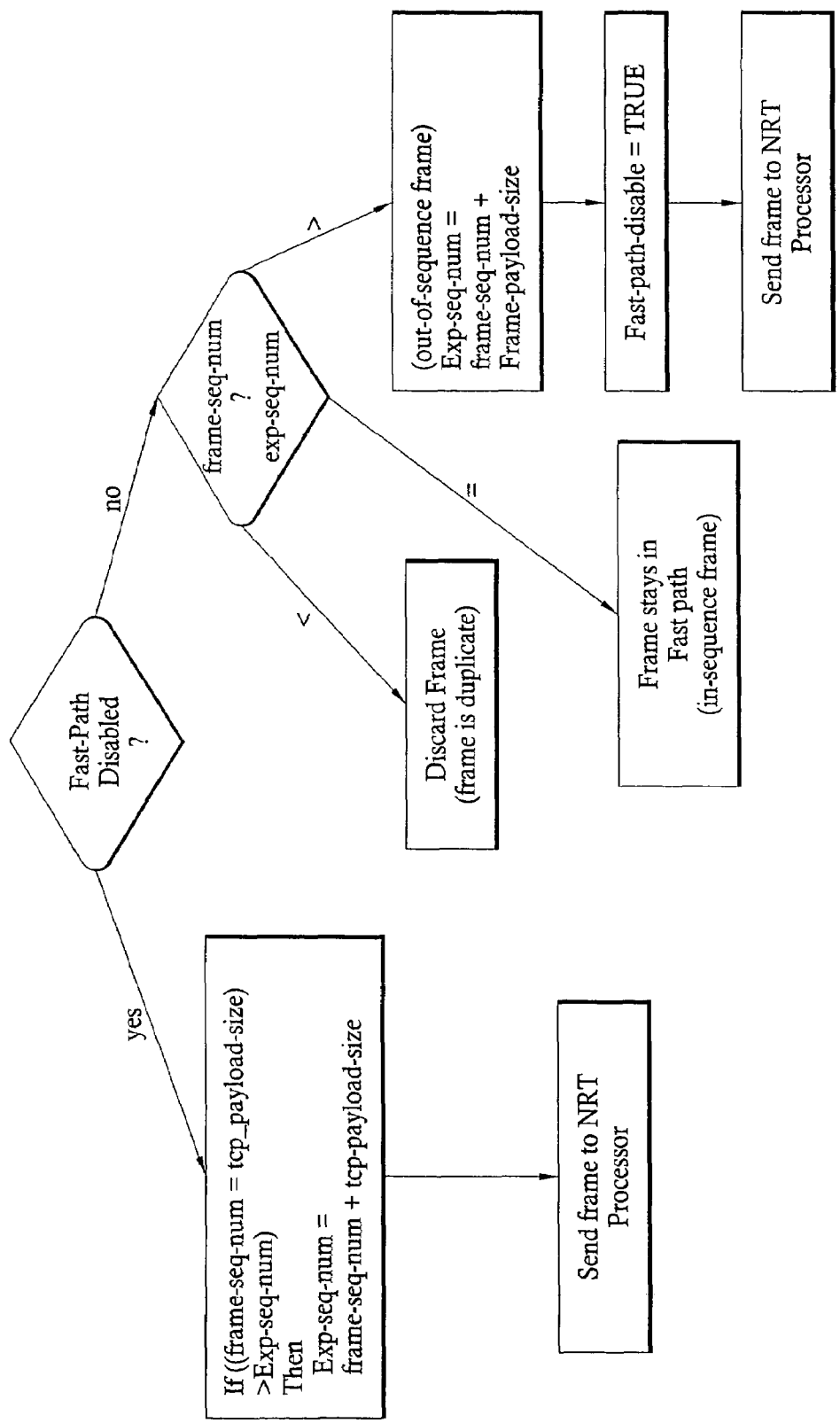
FIG. 18A illustrates a decision tree detailing fast-path/slow-path switching in the context of the PIE architecture.

After processing each frame, the iSCSI PDU Engine 640 further checks with dispatcher associated FPRAM 820 to determine if the expected-sequence-number after the frame just processed is equal to the expected-seq-number in the FPCB 825 in the FPRAM 820. If so, the iSCSI PDU Engine 640 resets the fast-path-disable bit in the FPCB 825 in the FPRAM 820 and frame processing returns to fast path. Additional details of the switch from fast-path to slow-path and vice versa is illustrated in an exemplary decision tree shown in FIG. 18A.

In various embodiments, the iSCSI PDU Engine (IPE) 640 is configured to receive an in-sequence TCP stream and demarcate iSCSI PDUs within the stream. The iSCSI PDU Engine 640 further validates optional header and data digests (e.g. CRCs) and checks header fields such as target transfer tag and PDU data length for consistency. The IPE 640 is a hardware accelerator for parsing and demarcating iSCSI PDUs. It receives a time-multiplexed stream of data corresponding to one or more network ports from the parser and the dispatcher. After parsing the incoming data stream and demarcating the iSCSI PDUs and SCSI data, the IPE 640 sends the SCSI commands and non-SCSI data to the iSCSI-layer software, which in various embodiments is integrated into the SNP storage controller application. Typically, SCSI data is deposited directly to a memory region reserved for it by the storage controller application. The IPE also validates optional header and data digests (CRC) and performs checks on header fields, such as the target transfer tag and PDU data length.

In certain embodiments, there are two instances of the IPE, one each in the RT and NRT paths. The instance in the RT path receives a time-multiplexed data stream from the dispatcher. The instance in the NRT path receives packets after re-sequencing by the NRT processor. Each network port receives TCP streams from several TCP connections. Thus, TCP segments from each connection may be interleaved with those from others. iSCSI PDUs are embedded in each TCP stream in order. However, iSCSI PDUs may start and end at any position in a TCP stream, without knowledge of the segmentation. Thus, iSCSI PDUs may be scattered over multiple TCP segments. A TCP segment may contain zero or more complete iSCSI PDUs and one or more fractional iSCSI PDUs.

In order to parse TCP streams from N connections (in the current embodiment, N=1024), the IPE maintains context for each connection in a region of memory. The RT path IPE maintains the state in the abovementioned FPRAM, which is also accessible by the dispatcher. The NRT path uses a region of main memory for context storage. The IPE saves context at the end of a frame or segment, to be retrieved later when a new frame or segment for the same TCP connection is encountered. FIG. 18B summarizes the fields in the context maintained in the FPRAM.

The IPE may additionally be capable of receiving time-multiplexed streams of TCP segments, one from each network port. In this scenario, the interleaving is at a much finer grain than described above. It may receive a few bytes from one frame before context switching to another, much like the parser and dispatcher. This mode of operation is referred to as the IPE TDM mode.

The IPE TDM mode may be advantageously used when large Ethernet frames are employed, such as specified by the jumbo frames standard for Ethernet. Since the TDM mode allows the IPE to retrieve partial segments from the ingress buffer, a smaller ingress buffer may be used in the PIE.

In an additional aspect, the IPE deposits SCSI data to a memory region indicated by the storage application software. As described elsewhere, iSCSI commands carry a "transfer tag" field which may be used to relate responses to requests. For instance, when the SNP sends an iSCSI R2T command to an iSCSI initiator, it may include a unique transfer tag in the command. When the initiator returns data corresponding to the R2T command, it may include the same transfer tag in the data PDU.

Before sending an R2T command, the storage application determines the address where the data should be deposited when received from the initiator. The address is referred to as the data pointer. It associates this information with a transfer tag and places the 3-tuple <connection id, transfer tag, data pointer> in a table called the Data Pointer Table (DPT). The DPT is also accessible to the IPEs in the RT Path and the NRT path, so that they can deposit incoming data directly to the intended location in accordance with the "zero copy" paradigm.

Figure 18C:
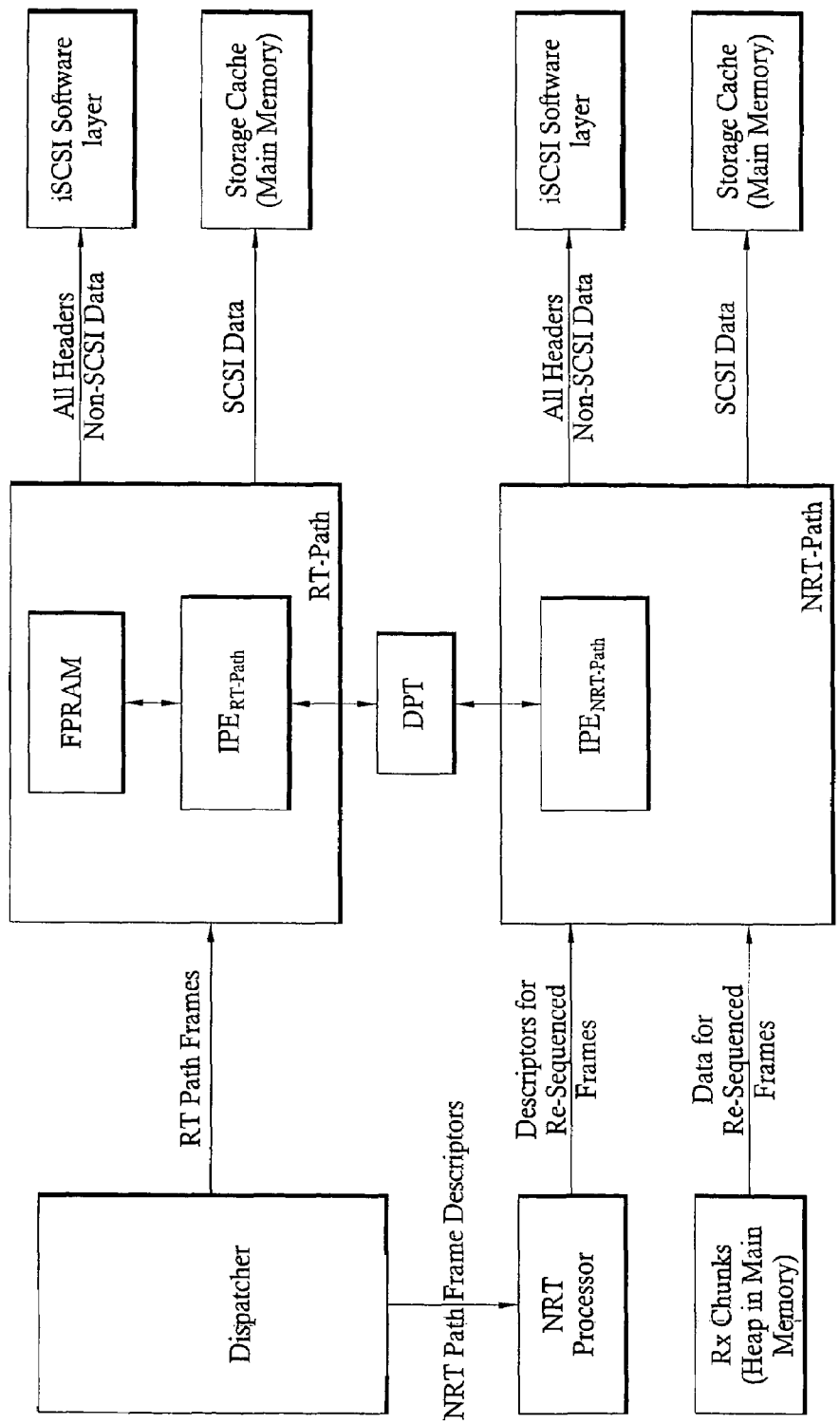
FIG. 18C illustrates a block diagram of the flow of information through the iSCSI PDU Engine.

FIG. 18C illustrates a block diagram of the flow of information through the IPEs. As illustrated, the IPE in the RT Path receives frames from the dispatcher and processes them in real-time in a pipelined manner. It parses the frames and verifies data digests. Subsequently, if the frame includes SCSI Data (that is, data to be written to disk), it looks up the Data Pointer in the DPT for the associated transfer tag and connection id. Based on the indicated buffer offset in the iSCSI PDU and the data pointer, the destination address of the data is calculated. Data is transferred starting at the destination address. Generally, headers and non-SCSI data are sent to the storage application software via a queue called the iSCSI-Rx-Queue.

The IPE in the NRT path receives iSCSI PDU descriptors from the NRT processor after re-sequencing. These include header information as well as pointers to the payload (if any) in the Rx-Chunks area of main memory. Thus IPE is not necessarily required to access the FPRAM. Instead, the IPE may be configured to load/restore context information from a dedicated region in main memory, after the context information has been deposited there by the RT processor. Subsequent processing is similar to the IPE in the RT path.

The IPE comprises two components: a iSCSI digest checker and a finite state machine (IPE-FSM) for parsing incoming data streams. The IPE-FSM is complex because of the large number of alignment possibilities it must handle in real-time. iSCSI PDUs may appear at any position in a TCP stream. Further, each quad-word (the unit of data that the IPE-FSM looks at each cycle) may contain one or more PDUs, for PDUs can be as small as one byte. Additionally, in certain instances only a subset of the bytes in a qword may be valid. Furthermore, the data stream may contain errors. Each of these possibilities contributes to the complexity of the IPE-FSM.

The aforementioned Acknowledgement, Windowing, and Retransmission (AWR) subsystem 146 provides functionality for hardware acceleration of network protocol processing at high rates. As previously indicated the Transmission Control Protocol (TCP) is the dominant protocol used by data communication networks and is responsible for reliable, in-order, delivery of data. In addition, it is responsible for congestion management and flow control via mechanisms that may be termed "windowing mechanisms". Today, most Internet applications are configured to utilize TCP for communication. For applications that communicate data at relatively low bandwidths, the processing involved in the protocol may be performed in software without undue performance degradation. However, for increasingly high bandwidth applications, it is advantageous to utilize hardware accelerators to perform protocol processing. In various embodiments, the system and methods described herein can be used in connection with a large class of platforms, including computers, servers, network interfaces for computers, specialized networking platforms including security processors, server load balancers, web switches and TCP proxies, and network-attached storage devices.

Figure 19:
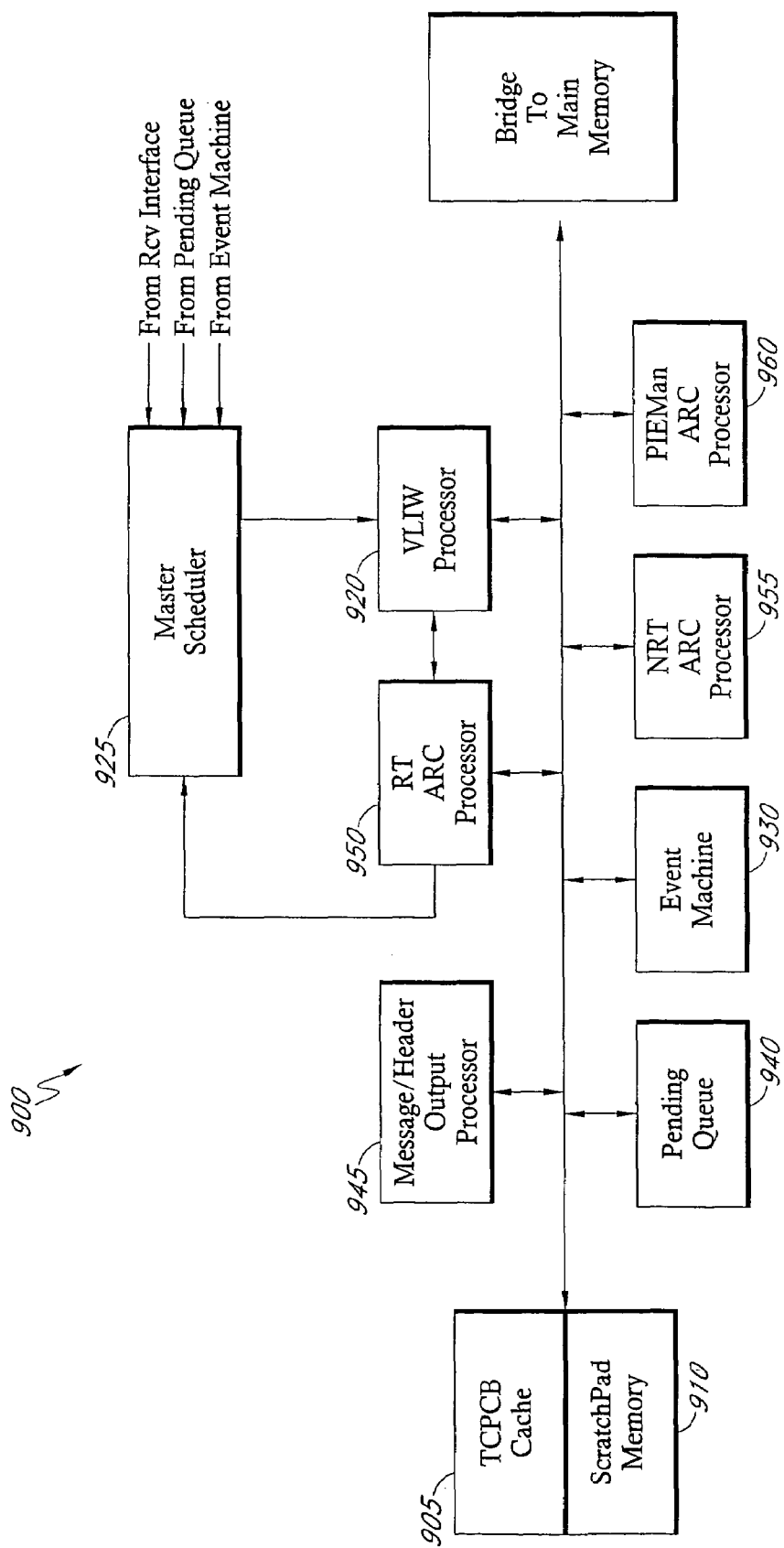
FIG. 19 illustrates a detailed block diagram for a Acknowledgement, Windowing, and Retransmission (AWR) subsystem of the PIE architecture.

FIG. 19 illustrates a detailed block diagram 900 for the AWR subsystem 146. The AWR 146 comprises one or more general purpose processors, referred to as ARC processors, coupled to one or more hardware acceleration components. According to certain embodiments of the present teachings, these components comprise: a TCPCB Cache 905, a Scratch Pad memory 910, a Message TCPCB loader/saver 915, a VLIW processor 920, a Master Scheduler 925, an Event Machine 930, a Pending Queue 940, and a Message/Header Output Processor 945.

As previously noted, computation involved in TCP protocol processing may be categorized into three paths including: (a) the Real Time (RT) path (also referred to as the "fast path") (b) the Non Real Time (NRT) path (one aspect of "slow path") and (c) the Protocol Intercept Engine Management (PIEMan) path (a second aspect of "slow path").

Figure 20:
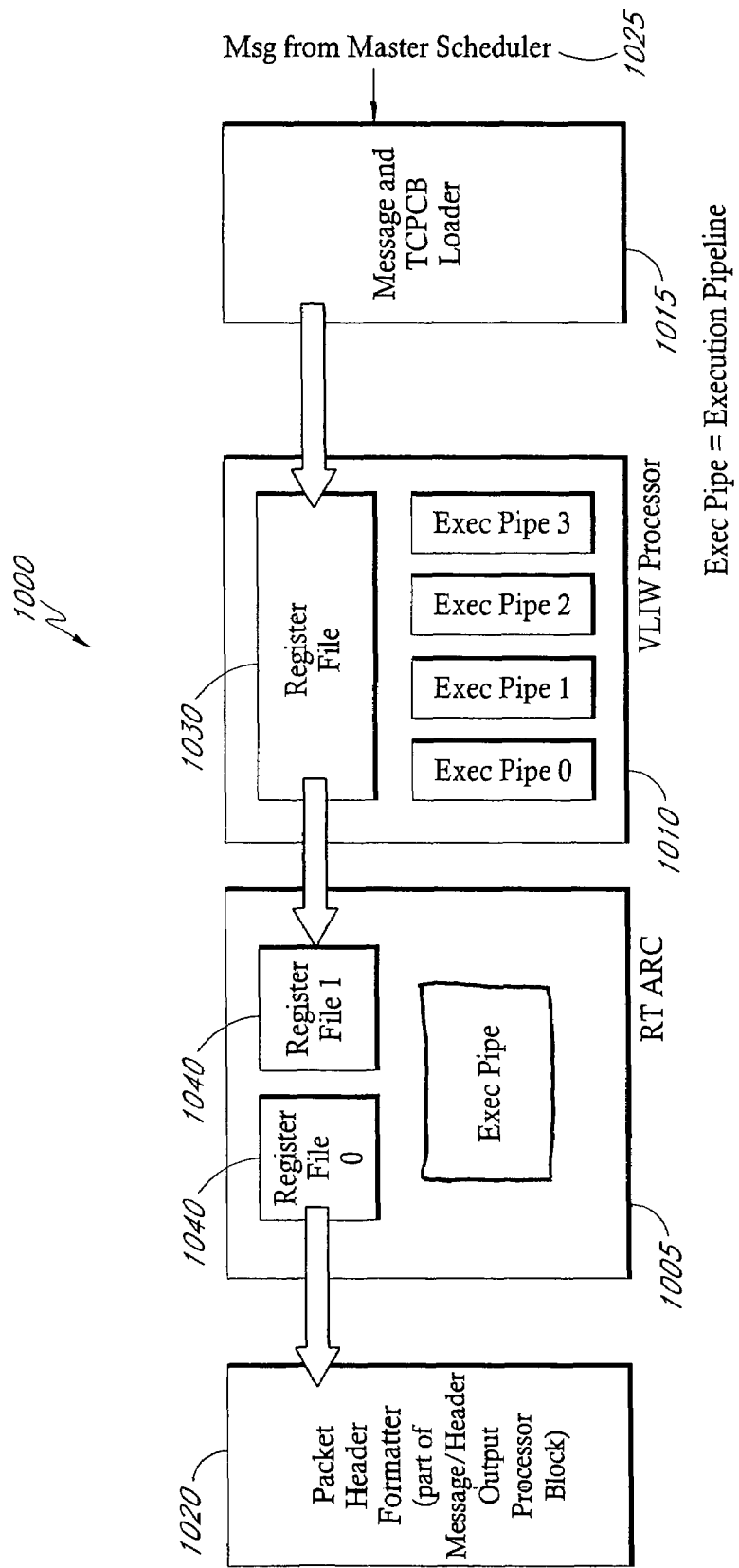
FIG. 20 illustrates an exemplary real time accelerator subsystem.

The RT path is typically associated with intensive data movement in a steady state TCP connection. In one aspect, the operations associated with fast path processing include generating acknowledgements, managing window sizes for flow-control and congestion control, and retransmission. In general, hardware accelerators are used to improve network communications performance within the RT path. FIG. 20 depicts the hardware components used exclusively to accelerate the RT path. These constitute the RT-Accelerator block 1000. In various embodiments, the RT-accelerator 1000 is capable of processing normal (common case) TCP traffic at a rate of approximately 10 Gbits/sec with higher rates achievable using similar designs.

The NRT path is typically associated with slower and infrequent parts of TCP protocol processing. These operations may include re-sequencing TCP segments that arrive out-of-sequence, TCP connection setup and teardown processing, and TCP options processing. Computations for the NRT path processing may be accomplished in software on a general purpose processor. In various embodiments, NRT path processing may be performed on a dedicated general purpose processor referred to as a NRT ARC processor 955.

The PIEMan path comprises the computational operations involved in management aspects of networking protocols. Management protocols including by way of example ARP, ICMP, RIP, and OSPF may be handled through the PIEMan path as well as fragmented IP frame and IP options handling. Like NRT path processing, PIEMan path processing may be accomplished in software on a general purpose processor. In various embodiments computations for the PIEMan path may be performed on a dedicated general purpose processor referred to as a PIEMan processor 960.

Each of the aforementioned paths and associated processors 950, 955, 960 are further configured to access the TCPCB Cache 905, the TCPCB loader/saver 915, the Pending Queue 940, the Event Machine 930, and Scratchpad memory 910. Details of the interoperability of these components are described in greater detail hereinbelow.

As previously noted, the TCP protocol stack is large and software implementations may comprise approximately 20,000 lines of code or more. A significant fraction of this code typically corresponds to infrequently executed portions of the protocol (e.g. infrequent cases/non-common cases), which need not be accelerated as their contribution to processing capacity utilization is minimal as compared to common case network traffic. In the AWR 146 these aspects of the protocol are executed in software using general purpose processors. For more frequently executed portions of the protocol (e.g. common case), there is a significant design tradeoff between using hardware acceleration and maintaining flexibility through programmability. If the protocol is implemented entirely with dedicated state machines in hardware, programmability is lost.

In one aspect, it is desirable to maintain programmability for a number of reasons. For example, enhancements and variations to the TCP protocol are typically developed over time. Programmability is desirable to implement new TCP protocol features that may include window management policies, congestion control policies, and retransmit policies. Furthermore, since the protocol stack is generally large, there is the possibility that an implementation may have an error or systemic inefficiency contained within. As will be appreciated, it is not uncommon for errors to be found in commercial software implementations several years after they've been in the market. For these reasons, the AWR design 146 implements the RT path aspects of the networking protocol in firmware on the relatively high performance VLIW processor 920.

The VLIW processor 920 can desirably execute a number of operations in parallel but is less complex than a superscalar processor. In a VLIW program, instructions may be scheduled statically by the programmer or a compiler. On a superscalar processor, the processor generally must dynamically figure out how to schedule instructions resulting in significant complexity and energy consumption. However, in the absence of dynamic scheduling capability, the VLIW processor operates at peak rates only when it does not have to wait for long memory access times. In this regard, the AWR 146 pre-fetches data that the VLIW processor 920 requires into a local memory store (e.g. TCPCB cache 905 and scratchpad 910) before triggering the VLIW processor 920 to start processing. Thus, the VLIW processor 920 takes a fewer number of cycles to execute the RT path instructions. In various implementations, VLIW processor 920 takes between approximately 30-70 cycles, depending upon the processing path.

As shown in FIG. 20, an exemplary RT-Accelerator subsystem 1000 comprises a general purpose processor 1005 coupled with a VLIW processor 1010 with a message/TCPCB loader 1015 and a packet header formatter 1020. In alternate implementations, such as ones targeted to higher traffic rates, two or more VLIW processors may be used. Alternately, two or more RT-Accelerator blocks may exist within each AWR system and with network traffic possessing distributed among them.

The aforementioned blocks 1005, 1010, 1015, 1020 operate as a pipeline wherein messages are received by the message/TCPCB loader from a Master Scheduler 1025. These messages correspond to tasks defined within the messages that are to be executed. In one aspect, the Message/TCPCB loader block 1015 fetches a TCPCB from a TCPCB Cache area (not shown) and stores data contained in the TCPCB into registers 1030 in the VLIW processor 1010. The Message/TCPCB loader block 1015 further loads the content of the message itself into the registers 1030 in the VLIW processor 1010. For purposes of improving efficiency and processing speed, the registers 1030 may be loaded in parallel. Using conventional processors and register files would take significantly more time to load and unload a large number of registers, resulting in much lower performance. Thus, the parallel register loading capability is a key accelerator in this design.

Once the registers 1030 have been loaded, the VLIW processor 1010 commences processing. When complete, the contents of the registers 1030 are transferred to the RT ARC 1005. In various embodiments, the RT ARC 1005 comprises two register sets 1040 (register file 0 and 1), allowing one to be loaded from the VLIW processor 1010 while the other is actively used by the RT ARC 1005. After the RT ARC 1005 has completed processing, if there is a frame to be transmitted, the header information for the new frame is passed to the Packet Header Formatter 1020 (a component of the Message/Header Output Processor block 945 shown in FIG. 19). At the end of the pipeline phase, the updated TCPCB header information may be written back to the TCPCB Cache 905.

Referring again to FIG. 19, in certain instances the RT-Accelerator 1005 may receive a message that requires post-processing by the NRT Processor 955. In other words, after some processing in the RT Path 950, the task may be continued in the NRT Path 955 in software. In such cases, the RT ARC 950 will forward the message to the NRT processor 955. Examples of where the aforementioned scenario occurs include (a) termination of TCP connections and (b) TCP options processing.

When terminating a TCP connection, the frame is first processed by the RT-Accelerator 950. Subsequently, the slow path task of closing the TCP connection may be executed by the NRT processor 955. In performing TCP options processing, the RT Accelerator 950 may process the fast path aspects of the frame initially and subsequently hand off the TCP options processing to the NRT processor 955. In the aforementioned examples, transferring a portion of the processing to the NRT processor 955 may involve the RT-Accelerator 950 writing message data into the scratch pad memory 910.

If the NRT input queue becomes full and the RT-Accelerator 950 is unable to enqueue a message to the NRT 955 immediately the message may be passed to the master scheduler 925 and flagged to indicate that the message is targeted to the NRT 955. In this way, undesirable stalls in the system are avoided and processing efficiency is maintained.

The message/TCPCB loader block 915 shown in FIG. 19 is responsible for populating the registers in the VLIW processor 920 in a timely manner. In one aspect, the message/TCPCB loader block 915 fetches a TCPCB from the TCPCB cache 905 and maps relevant fields onto the VLIW processor register file. The message/TCPCB loader block 915 may also extract selected fields from the message header that describe the processing task and map them onto the VLIW processor register file. Subsequently, the message/TCPCB loader block 915 may copy the data in parallel to the VLIW processor's register set. Parallel processing in this manner desirably reduces the number of cycles required to perform this operation.

In various embodiments, the VLIW processor 920 makes use of a plurality of execution pipelines with each pipeline containing one or more ALUs. As a result, the processor 920 can perform a plurality of ALU operations in parallel during each cycle. Typically, the execution pipelines share a register file that allows results produced in one cycle on one pipeline to be used in the following cycle in another pipeline. Additionally, condition codes from each pipeline are available to each other immediately (e.g. in the same cycle). This feature enables the processor 920 to execute complex conditional operations with reduced latency. Taken together these features allow code to be packed in a highly efficient manner. For example it is readily possible to achieve processing of a plurality of instructions (e.g. 4 or more) in substantially each cycle.

The design of the VLIW processor 920 is such that it need not necessarily access main memory or any information that may take more extended periods of time (e.g. more than one cycle) to access. As a result, the processor 920 can be operated at a peak rate or near peak rate the majority of the time. In various embodiments, execution times in the VLIW processor 920 range from between approximately 30 cycles to approximately 70 cycles per message, depending on the type of message being processed.

In various embodiments, the RT ARC 950 represents a general-purpose RISC processor with a dual-context register file. The nature of the register file is such that as one register set is being actively used for computation on the processor, the other can be loaded or unloaded. The RT ARC 950 can further switch between registers in a single cycle enabling highly efficient data transfer between components in the RT accelerator 950.

The packet header formatter 1020 of the AWR subsystem 146 is responsible for building packet headers from information provided by the RT ARC 950 and that contained in the TCPCB cache 905. In one aspect, information describing the type of header is contained in the TCPCB cache 905 with the RT ARC 950 specifying the sequence number, acknowledge number, payload size, and timestamp for the header.

The Master Scheduler 925 is responsible for scheduling RT-Accelerator block processing and receives messages from various sources including: the PIE-Rx network receive interface 148, the event machine 930, and the pending queue 940. In one aspect, the messages received from the event machine 930 correspond to event messages that indicate expiration of timers while messages received from the pending queue 940 correspond to frames waiting to be transmitted. The aforementioned messages represent information related to processing tasks and may contain the TCP connection ID for the message as well as all relevant control information required for the task (including message type and packet header information). In one aspect, the current state of each connection is contained in the TCPCB for the connection, which resides in main memory, and is cached in the TCPCB Cache 905.

Tasks are scheduled for processing by the RT-accelerator 950 based upon a priority schema wherein the PIE-Rx messages have the highest priority, Pending Queue messages have the next lower priority, and Event messages have the lowest priority. In order to avoid blocking of lower priority messages, the master scheduler 925 enforces a fair arbitration mechanism between the message types. However, the fair arbitration mechanism may be suspended when the number of messages for a higher priority message type exceeds a selected threshold.

Messages are verified to be ready for processing by the master scheduler 925 that checks a number of conditions. In one aspect, the master scheduler 925 checks with the TCPCB Cache Manager 905, to determine if the TCPCB for the corresponding connection is available in cache. If the TCPCB is not available, a request to fetch it is issued and the task waits until TCPCB is available in the cache. When available the task may be scheduled by the master scheduler 925.

The master scheduler 925 further checks a TCPCB Lock Domain Manager to determine if any other task corresponding to the same connection is currently active. If so, the task waits otherwise the task may be scheduled. For pending queue messages, the master scheduler 925 additionally checks for space in the output processor to absorb the results. For event messages, the master scheduler 925 verifies that scratch pad memory 910 is available. This check is made to insure that if the RT-Accelerator block 950 needs to pass the message to the NRT processor 955 the space will be available. When the aforementioned conditions are met and the VLIW processor 920 is made available and the message is scheduled.

The event machine 930 may be used to manage TCP timers. TCP protocol processing requires the maintenance of a four timers associated with each TCP connection including a retransmission timer, a persist timer, a keep-alive timer, and a 2MSL timer. Each timer is initialized and triggered at various points in the TCP protocol. Timer values typically range from a few tens of milliseconds to a few hours or more. When a timer expires, the protocol requires certain actions to be taken. For instance, the retransmission timer is initialized and triggered when a sender transmits a packet. If the timer expires before the corresponding Acknowledgement is received, the base TCP protocol requires that the sender retransmit the packet. The value of this timer is based on an estimation of the round trip delay from transmission of packet to receiver and the reception of an acknowledgement of the packet at the sender.

Timers are added to the event machine 930 by specifying their expiration time and may be deleted or updated to a new expiration time. The event machine 930 further keeps track of the expiration time of each timer such that when the current time (as maintained by a free running counter) exceeds the expiration time of a selected timer, the event machine 930 sends a message to the master scheduler 925 indicating the connection ID associated with the timer.

As previously indicated, a plurality of TCP connections are supported by the system. For each connection, the event machine 930 manages the timer with the earliest expiration time and when this timer expires other timers can be checked, as necessary. In various embodiments, the event machine 930 comprises a hardware component specialized in the task of managing these timers.

The event machine 930 further comprises three components including an event processor, an event chain, and a message formatter. The event chain represents a data structure for storing timers in a sorted manner and may be characterized by N buckets of granularity T where T is a time interval. In various embodiments, each timer is assigned to a bucket using the formula:

$$\text{Bucket\_ID} = (\text{expiry\_time modulo}(N*T))/T \qquad \text{Formula 1}$$

For example, if T is 1 second and N is 100, then timers with expiration times of 5, 7, 105, 207, and 305 seconds will be categorized into buckets 5, 7, 5, 7, and 5 respectively. Timers in each bucket may then be maintained as a sorted linked list with the earliest expiration time first.

In certain embodiments, the event processor is responsible for maintaining the event chain and executes external operations including: adding event timers, deleting event timers, and updating-and-moving event timers. Furthermore, the event processor may be configured to continuously scan the event chain for expired timers. When a timer expires, the message formatter may be configured to enqueue a message for the message scheduler 925. The contents of the message are based on control information associated with the timer.

Figure 21:
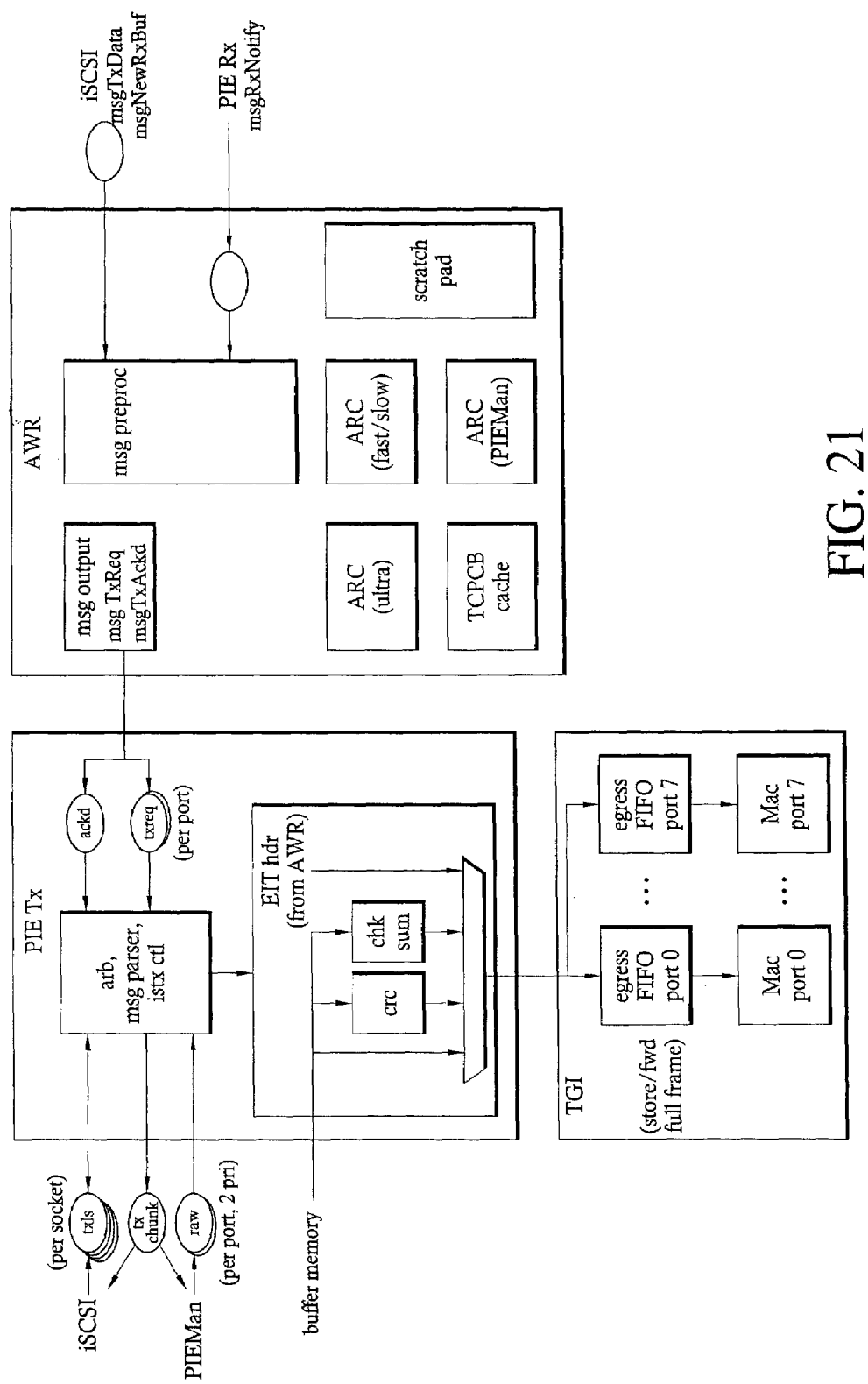
FIG. 21 illustrates a block diagram of a PIE-Tx path and its associated modules.

The block diagram shown in FIG. 21 illustrates one embodiment of the aforementioned PIE-Tx path and its associated modules. In one aspect, the PIE-Tx path provides for frame handling functionality used to transmit data and information across the network. The PIE-Tx module may be configured to support two types of transmit queues including: iSCSI Tx queues (having one queue per iSCSI connection) and raw Tx queues (having two priorities per port).

In various embodiments, the iSCSI Tx queues are used by the iSCSI processor to specify iSCSI PDUs for the PIE Tx. Transmission from these queues may be controlled by the AWR, which may bee configured to recognize when the queues contain entries to transmit (for example from a msgTxData message from the iSCSI processor), and when the Tx window is open enough to transmit a frame (for example from the msgRxNotify message from PIE Rx). The AWR may further be configured to generate Tx requests to PIE Tx, which assembles iSCSI frames using Ethernet, IP, and TCP headers supplied by the AWR, iSCSI headers prepared by the iSCSI processor in buffer memory, and data from buffer memory. The PIE Tx may also be configured to generate and insert optional iSCSI header and data digests (e.g. CRCs). Also, in certain embodiments, if any iSCSI PDU ends in the frame, the PIE Tx may optionally be configured to set a PUSH flag in the TCP header.

In various embodiments, the raw Tx queues contain pointers to non-iSCSI frames in buffer memory. On a per-port basis, high priority raw frames may take precedence over iSCSI frames, which may take precedence over low priority raw frames. The PIE Tx may be configured to service one or more output port(s) based on the presence of Tx requests for each port and the availability of space in each port. For each port, the TGI may be configured to contain an egress FIFO large enough to store and forward a frame or jumbo frame (approximately 9K).

In one aspect, the large egress FIFOs, provide a means for the PIE Tx to be able to generate TCP checksums for iSCSI frames on the fly. The checksums may further be configured to cover a pseudo header region (SIP, DIP, IP protocol, and TCP length), TCP header, and TCP payload. At the frame end, the PIE Tx may be configured to insert the checksum into the TCP header which has been stored in the egress FIFO. Subsequently, the PIE Tx signals the network interface (e.g. TGI) that the frame is now ready to transmit from the FIFO. In one aspect, these actions desirably allievate the need to generate checksums and CRCs for 512-byte SCSI data blocks in buffer memory, or to trim back a Tx frame to a 512-byte boundary in buffer memory.

An entry in the iSCSI Tx queue may comprise approximately four words (one qword) and describes a contiguous area of buffer memory to transmit. An exemplary entry has the format shown in FIG. 22 (reserved fields may be zeroed) wherein the fields may be described by: "last"—This entry is set if this is the last entry for the PDU; "digest"—This entry is set to enable iSCSI digest for this type; "type[1:0]"—This entry is set for information type (01=header, 10=data, 11=text); "length[15:0]" this entry is set for length for this type in bytes, 0=64 KB; "pointer[31:0]"—This entry is set for the starting address in buffer memory; additionally two reserved words may be used by PIE Tx to manage transmission and re transmission.

In one aspect, the iSCSI processor prepares a PDU for transmission as follows: Step (1) Prepare the iSCSI header in ARC scratch RAM; Step (2) Get a Tx chunk (pop an address from the Tx chunk queue); Step (3) DMA the header from scratch RAM to the Tx chunk in buffer memory; Step (4) If the "text" payload exists (any data segment which should be created by the processor, e.g. responses), create in scratch RAM, get Tx chunk, DMA to the Tx chunk area. Repeat until complete; and Step (5) push entries to the iSCSI Tx queue to specify the PDU (push/inc each qword). FIG. 23 illustrates application of the aforementioned description for exemplary iSCSI Tx PDUs.

In various embodiments, as the iSCSI processor is preparing PDUs for transmission, the iSCSI processor sends msgTxData messages to the AWR. The iSCSI processor may then choose to wait until a selected number of small entries have been pushed, or after each large entry is pushed. The transmit length in the message may further include various iSCSI digest words, for example, the transmit length for an R2T PDU with header digest may be 52 bytes.

In one aspect, there is one istx_ctl structure per iSCSI connection, as shown in FIG. 24. At connection (or start up) time, software may be configured to set up the queue base address and limit per the associated iSCSI Tx queue settings, and zero the next tx, next retx, partial CRC, and rd offset fields. Thereafter, the istx_ctl structure may be maintained by PIE Tx, which may use the information to directly access the entries as system memory data.

In various embodiments, the iSCSI Tx queue entries are transformed by PIE Tx as necessary into istx entry structures. The third word in the original PDU request may be made available to indicate a 16-bit byte offset to where to transmit or retransmit next within this entry. The fourth word may be made available to store generated CRC values for possible retransmission later. When entries are no longer needed for retransmission (per the msgTxAckd message from the AWR), the PIE Tx may be configured to release acknowledged Tx chunks (header or text) back to the Tx chunk pool, and pop any acknowledged istx entry structures off of the iSCSI Tx queue (pop/dec each qword).

An entry in the raw Tx queue comprises two words (one dword) long and describes a contiguous area of buffer memory to transmit. Each entry may be configured with the format shown in FIG. 25 describing Raw Tx queue entries (reserved fields may be zeroed). For each entry "last" may be set if this is the last entry for the frame; "length[13:0]" may be set as the length for this entry in bytes; and "pointer[31:0]" may be set as the starting address in buffer memory.

In various embodiments, the PIEman may be configured to prepare a frame for transmission as follows: Step (1) The PIEman may prepare the frame (or partial frame) in ARC scratch RAM. This may include the Ethernet header and encapsulation headers, as appropriate; Step (2) The PIEman may be configured to get a Tx chunk (pop an address from the Tx chunk queue); Step (3) The PIEman may be configured to DMA from scratch RAM to the Tx chunk in buffer memory. These steps may be repeated until the process is complete and thereafter the PIEman may be configured to push entries to the raw Tx queue to specify the frame (increment at the end of the last entry for the frame).

In one aspect, for multiple-entry frames, each entry should completely fill its Tx chunk except for the last entry which may be shorter. Flow control for raw frames may be handled substantially completely by PIEman or an upper level, and does not interfere with AWR flow control. Typically, the maximum frame size is expected to be 9000 bytes plus the Ethernet header.

The PIE Tx pops and processes entries (dwords) from the queue until it pops the last entry, at which point it decrements the queue. After the PIE Tx completes an entry from the raw Tx queue, the pointer is silently pushed back to the Tx chunk queue (no message is sent to PIEman The PIE Tx then indicates "end of frame" to the TGI when data for the last entry has been copied to the egress FIFO.

The following section provides details describing various embodiments of the Memory Structure Accelerator (MSA) and the corresponding modules used by iSNP. Additional details regarding the various components and modules described herein may be found elsewhere in the specification.

The Memory Structure Accelerator (MSA) is an accelerator for managing and accessing queues and stacks. If queue and stack data structures were managed entirely using software, the management and access operations would take a large number of cycles, specially when a number of processors or other components of the iSNP access them concurrently. Several memory operations would be required to push, pop, enqueue, dequeue, or advance a queue pointer. Further, for each operation to appear atomic, mutual exclusion operations would be involved. Since the iSNP architecture involves a large number of queues and a number of agents accessing them concurrently, it is highly advantageous to implement queue management in hardware in the Memory Structure Accelerator (MSA).

The MSA provides support for up to 8192 queues and stacks. Queues may be accessed by hardware components of the iSNP or by software components running on one of the processors in the ISNP. The MSA supports the communication of information from a hardware component to a hardware component, a hardware component to a software component, a software component to a hardware component, and from a software component to a software component.

Each queue or stack has a descriptor and descriptor extension which are located within main memory. These descriptors contain information about the structure's size, data location, thresholds, and signaling methods when significant events occur. The data contained in each queue or stack is located within system memory.

Queues are implemented using a contiguous region of memory as a circular buffer. The boundaries of the region are indicated in the descriptors. There are three other fields in the descriptor: the readpointer (rptr), the write pointer (wptr), and a count register. In various embodiments, the rptr points to the current head of the queue, from where elements are de-queued. The wptr points to the current tail of the queue, to where elements are en-queued. The count is used to keep track of the number of elements in the queue at any time, so that a queue-full condition may be detected. Stacks are also implemented using a contiguous region of memory. The stack generally has a single pointer, the write pointer (wptr), and a count register.

In various embodiments, the Memory Structure Accelerator supports a plurality of commands for the manipulation of queues and stacks. Exemplary commands are illustrated in FIG. 26. Agents using the MSA queue can push or pop or enqueue or dequeue substantially any amount of information (any number of bytes) in a command. Furthermore, the count may be incremented or decremented by substantially any amount. This makes the MSA highly versatile.

Figure 27:
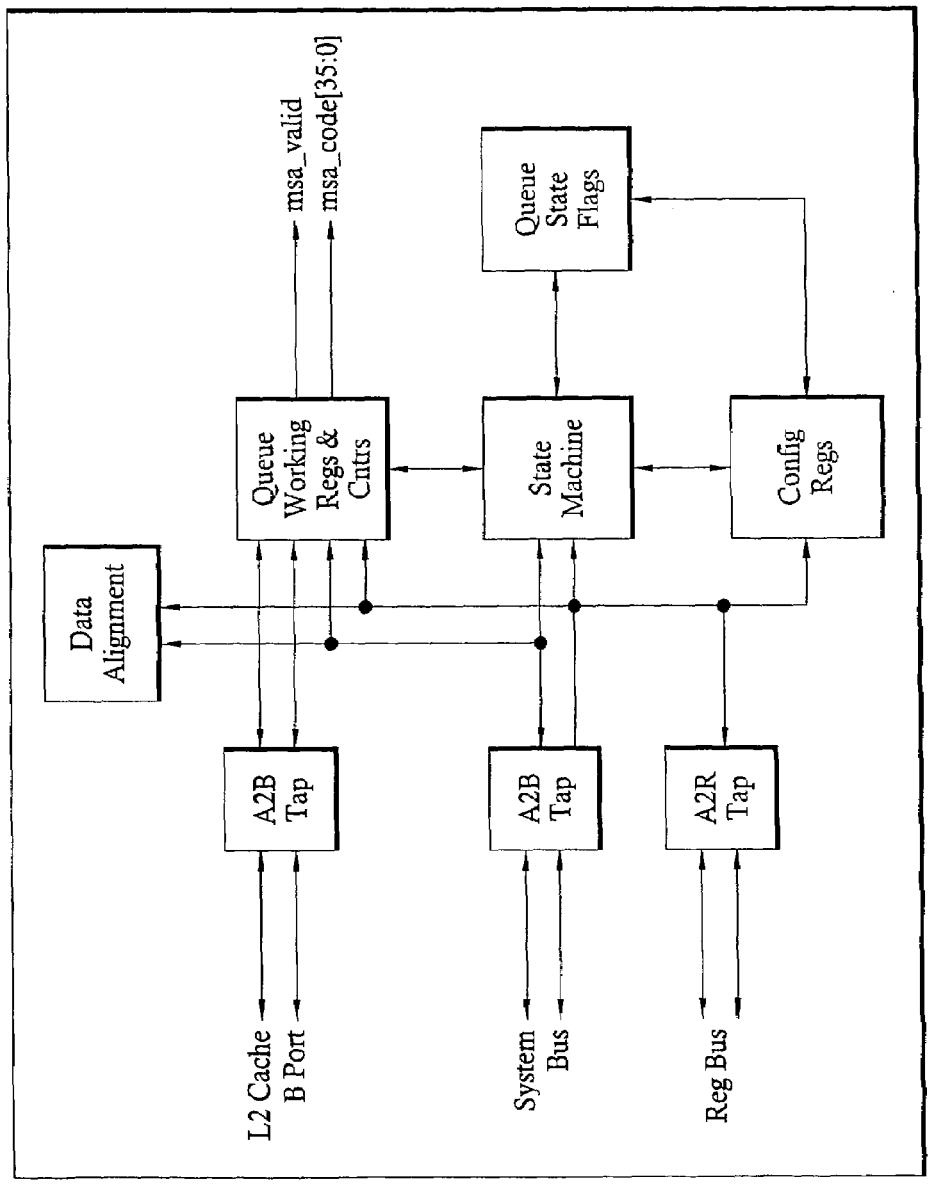
FIG. 27 illustrates a block diagram of a memory structure accelerator (MSA).

A block diagram of the Memory Structure Accelerator (MSA) is shown in FIG. 27. Each block is described in the sections below. In the current embodiment, the MSA is implemented using four principal blocks: Queue Working Registers and Counters that contain the context associated with each active queue, a state machine used to execute MSA commands and manipulate state as needed; the Configuration Registers, which are used to specify the location of the queue descriptors and queue descriptor extensions in system memory; the Queue State Flags.

In the current embodiment, the MSA provides a plurality of taps or interfaces to external components. A2B and A2R are interfaces to two busses in the SNP system. The A2B Tap (Interface) is the means used by any external block to access data in system memory via the Memory Structure Accelerator block. The A2B interface is standard for all blocks within the design that access system and buffer memory, as well as hardware blocks that access system and buffer memory such as the L2 Cache and this block. Two A2B taps are used in the Memory Structure Accelerator: an initiator tap for access to the L2 Cache and a target tap to receive queue and stack data read and write operations from other initiators. The standard cmd bus for the A2B system bus has been extended by two bits in order to support the queue/stack functions. The bit patterns for the cmd bus and their meaning are illustrated in FIG. 28.

The optional usr_r bus for the A2B tap is also employed to convey status information for all queue/stack operations that result in the reading of data (Pop, Pop/Dec, and Peek.) The status reflects the queue/stack status after the desired operation has been carried out (e.g. if the last entry in a queue is removed via a Pop operation, the data may be presented along with an empty status indication.)

The usr_r bus is configured to be two bits wide and is illustrated in FIG. 29. The usr_r bus is returned along with the data on the response cycle(s) of the A2B tap. In addition to the standard A2B tap logic, a number of FIFOs may be employed in the A2B Tap blocks.

Figure 30:
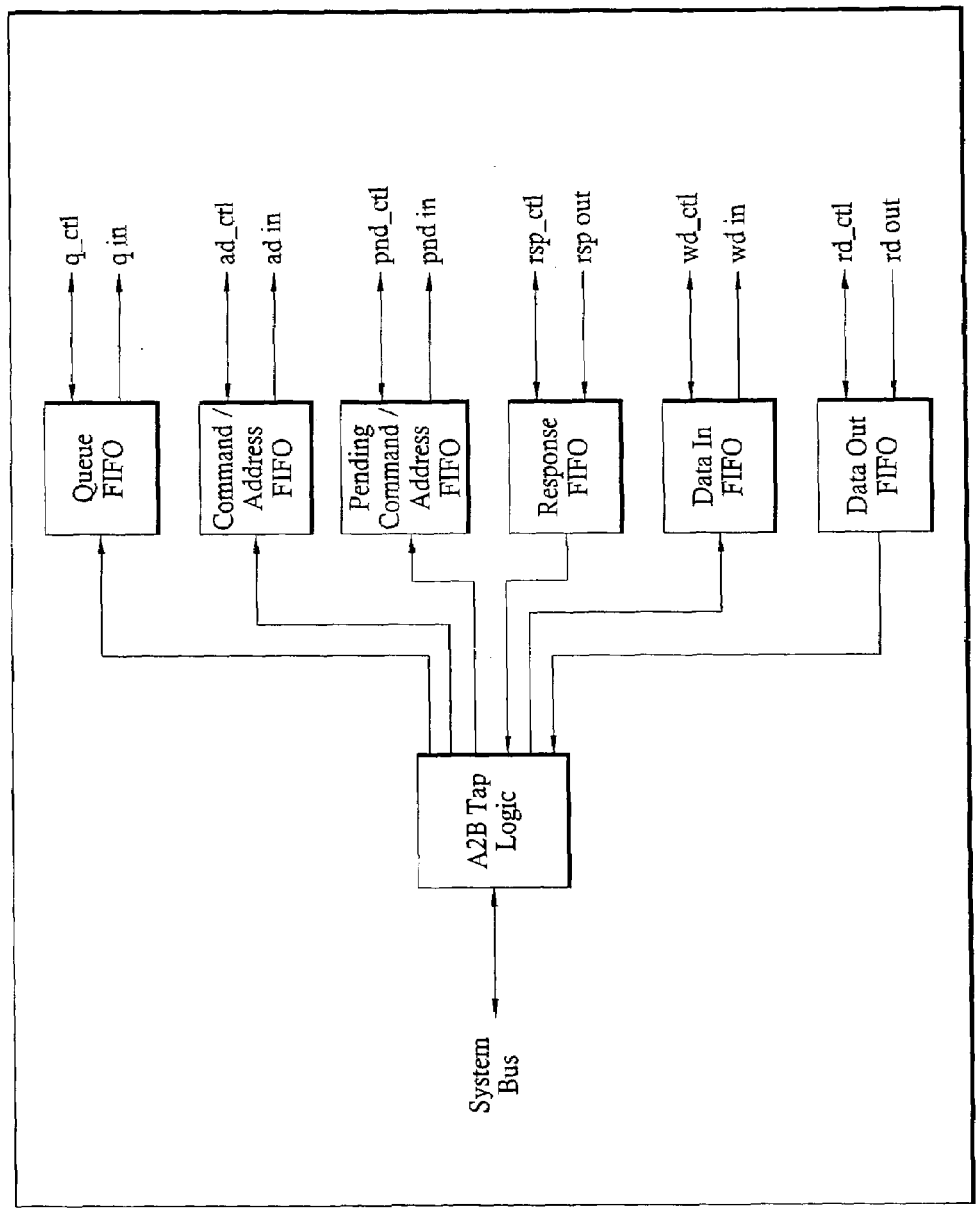
FIG. 30 illustrates a block diagram of an A2B Tap.

FIG. 30 illustrates an A2B Tap detailed block diagram. As each queue operation is received, it undergoes a categorization operation. If the target queue is already in the Command/Address FIFO, it is placed in the Pending Command/Address FIFO. If the target queue is not in the Command/Address FIFO, it is placed there and the queue number is placed in the Queue FIFO along with its index in the Command/Address FIFO. Entries in the Queue FIFO are processed as soon as they are received and a slot is available in the L2 Cache B Port FIFO. The Queue FIFO entries are converted into either descriptor fetches or descriptor extension fetches, depending on the queue command associated with the entry.

Figure 31:
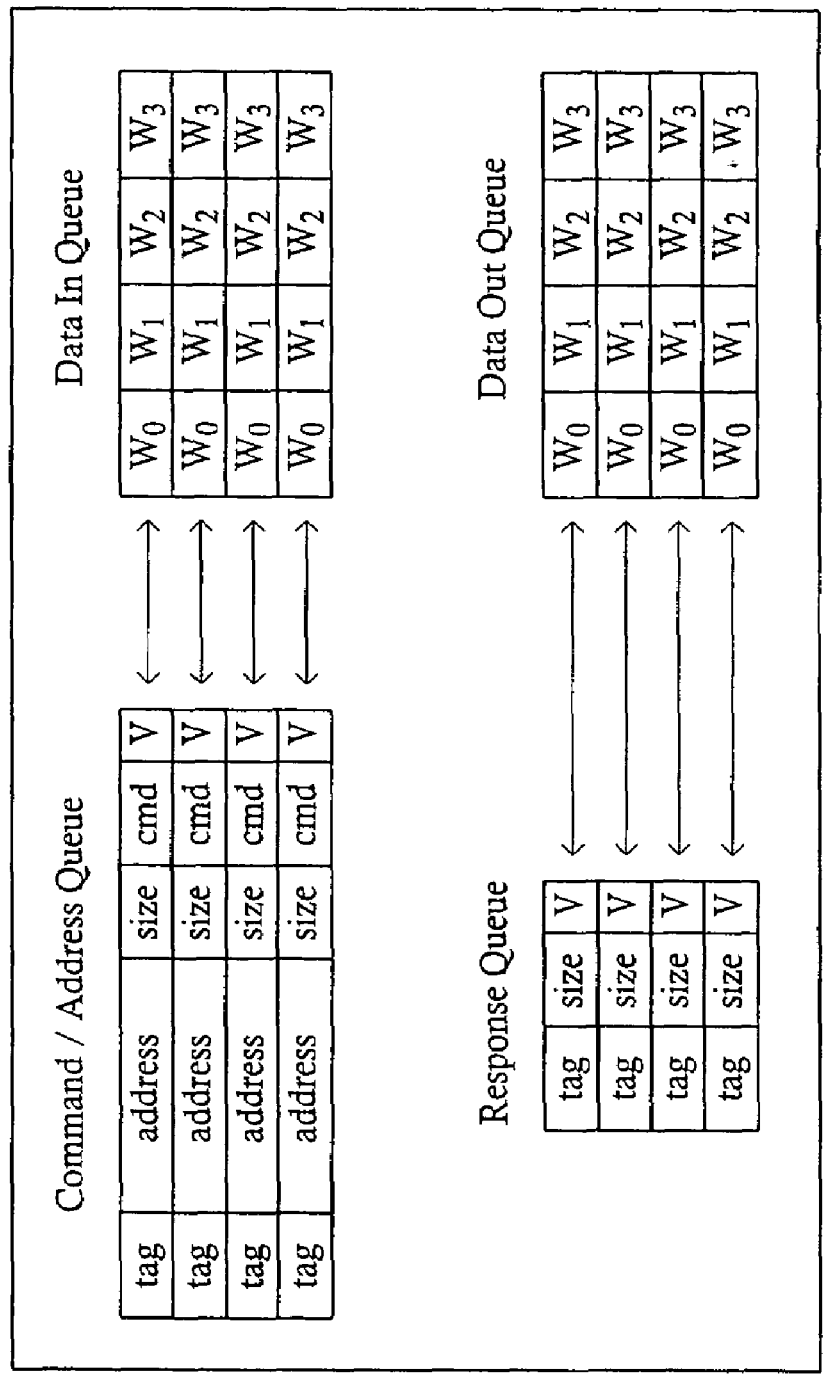
FIG. 31 illustrates exemplary Data In and Data Out FIFOs.

As the master state machine begins processing a descriptor, it broadcasts the queue number it is working on to the Pending Command/Address FIFO. The FIFO searches all its entries for a match and, if found, asserts a request for the first entry that matches. The Queue, Command/Address, and Pending Command/Address FIFOs hold a plurality of entries (eight in the current embodiment). The Data In and Data Out FIFOs hold up to eight times 64 bytes of data. The contents of the FIFOs are shown as a block diagram in FIG. 31.

Each line of the Command/Address and Response queues contain one or more data fields and a valid bit (V). Each of these lines is associated with a 64 byte line in their associated Data In and Data Out queues. As commands are received, they are placed into the Command/Address Queue. If the command involves memory write operations (poke, push, and push/inc), the data for the command is placed in the associated line in the Data In Queue.

Commands that involve memory read operations or returned information (peek, pop, pop/dec) are routed through the Response and Data Out queues. As data is received or generated, it is placed in the Data Out Queue. When all required data has been placed in the Data Out Queue, the associated line in the Response Queue is filled with data copied from the Command/Address Queue and the line is marked as valid.

When all lines of the Command/Address Queue are valid (e.g. full), the A2B aqfull and wdfull signals are asserted. These two signals are identical as there is guaranteed data input capacity for any command received. When all lines of the response Queue are not valid (e.g. empty), the A2B rqmt signal is asserted.

In various embodiments, the A2R tap (interface) provides the means for an external component to access the registers within the Memory Structure Accelerator (MSA) block. The A2R interface may be standardized for each block within the design that includes processor accessible registers.

The main MSA state machine is principally responsible for the functionality of the Memory Structure Accelerator. It controls accesses queue/stack descriptors from system memory and moves queue and stack data between the system bus and system memory. It updates the descriptors and descriptor extensions and writes them to system memory. It also generates signaling when various events occur, such as crossing low water mark, crossing high water mark, underflow, and overflow.

For an exemplary operation, the state machine's functions may be defined as follows: (a) Fetch the descriptor from system memory; (b) Fetch the descriptor extension from system memory; (c) Receive descriptor and descriptor extension; (c) Check for Error Conditions (Overflow/Underflow); (d) Process the operation (move data to/from the system bus from/to system memory as necessary); (e) Update the descriptor and descriptor extension; (f) Write the descriptor to system memory; (g) Write the descriptor extension to system memory; and (h) Signal, interrupt, and generate reports to the queue flag as necessary.

Typically, each command is popped off the request FIFO and processes as above. If the report to queue flag is generated, the state machine sequence is run through a second time for reporting.

In various embodiments, Queue State Flags hold temporary information about the status of the active queue/stack as data transfer progresses. Once data transfer has completed, the flags are examined and any required signaling is carried out. Exemplary Queue State Flags comprise: (a) Going not empty; (b) Going empty; (c) Underflow; (d) Overflow; (e) Crossing high threshold; and (f) Crossing low threshold In certain embodiments, working registers are configured to contain the active versions of the descriptor and extension in operation. The working counters may be updated descriptor write pointers, updated descriptor read pointers, and updated descriptor counts.

Typically, there are a series of ALU components within the Queue Working Registers and Counters block. The functions of the block include: (a) Calculate bytes in queue/stack; (b) Determine cache line crossings; (c) Detect state flag conditions; (d) Select signaling based on condition; (e) Generate system memory addresses.

The Data Alignment block contains data to be transferred between the initiator and the active queue/stack. Because the Memory Structure Accelerator supports non-word writes and reads, a barrel shifter may be present in the Queue Data Buffer to align data based on Queue Descriptor Read and Write Pointers. Data alignment may be carried out for both write and read operations. However, the operation is different for writes and reads.

For write operations, the A2B size may be used to determine which byte lanes of the data are valid, with the first valid byte beginning in the msbyte and proceeding to the right toward the lsbyte. This is then coupled with the Queue Descriptor Write Pointer to determine the shifting of the data. As a result of the shift operation, it is possible that the incoming data will cross a 64-byte boundary. When this occurs, the Data Alignment block breaks the transfer into two accesses.

For read operations, the Queue Descriptor Read Pointer (for queues) or Write Pointer (for stacks) may be used along with the A2B size to determine which byte lanes from the Level 2 Cache data bus should be used to make up the data on the A2B bus. For reads, data may be Left justified in the 128-bit A2B read data bus.

As mentioned noted, when an operation generates a significant event, such as crossing a water mark, a single signal per command may be generated. The signal can be either a hardware code or a status pushed into another queue. Each event is individually programmable in order to provide maximum flexibility. Hardware signaling is premised on the following: when an event occurs, a code is placed on the msa_code bus and the msa_valid signal is pulsed high for one clock. The handling of a hardware signal is generally implementation specific and a table of codes to be programmed for specific queues and stacks may be provided by the hardware designers.

Software signaling generally involves designating one or more queues/stacks to receive status information. Multiple queues can report status to the same status queue. This desirable for aggregating a number of queues into a single event queue, such as for iSCSI session data queues.

When using software signaling, there may be a limitation that software signaling is configured only one level deep. That is, one or more queues can signal into another queue, but that queue typically uses hardware signaling. If more than one level of software signaling is detected, an error response may be sent to the initiator of the queue operation. An example of software signaling is shown in FIG. 32.

The following section provides details describing various firmware considerations in iSNP design. Additional details regarding the various components and modules described herein may be found elsewhere in the specification.

As shown in FIG. 33, there may be an empty queue/stack descriptor initialization routine. Descriptors for empty queues/stacks may be initialized as follows: (a) The Read Pointer, Write Pointer, Count, and Hysteresis fields are generally set to zero. Other fields are set to the desired values. (b) If High and Low watermark signaling is not desired, the Full Hi Level is set to 0xffff and the Full Lo Level should be set to 0x0000. This prevents the MSA from fetching the descriptor extension for the queue as the High Water Mark will not be reached. It is typically specified that all unused queues have their 'Not Empty Signal' and 'Underflow Signal' fields set to interrupt one or more processors. By doing this, if an attempt is made to push or pop an unused queue, the event can be detected. Further, it is typically specified that all unused queues be set to a small queue size (5) and their base addresses set to a safe memory region (e.g. a memory region that is not used by the firmware.) By doing this, if an unused queue is pushed, no data will be corrupted. Once a descriptor and descriptor extension have been initialized and queue operations begun, the descriptor will generally not be written by firmware unless it can be guaranteed that no queue operations are occurring to the queue who's descriptor or descriptor extension is being written to.

Queues and stacks can be initialized so that they appear to contain data before their first use. This is accomplished by storing the desired queue data into system memory and then initializing the descriptor with the Base Address of Data equal to the starting address of the data in system memory, the Write Pointer equal to the number of bytes written to system memory, and the Count equal to the number of "units" of data written. A preloaded queue/stack descriptor initialization is shown in FIG. 34.

In various embodiments, information about the number of bytes and the count of "items" in a queue or stack can be determined by interrogating the queue descriptor. For stacks, the value of the Write Pointer may be the number of bytes in the stack. For queues, the number of bytes can be calculated by subtracting the Read Pointer from the Write Pointer and adjusting for negative. For example, according to the code sequence:

if (writepointer < readpointer)
  by tes= writePo int er − readPointer + $2^{size+5}$
  else
  bytes = writePointer − readPointer For either a queue or a stack, the count of "items" is the value of the Count field.

Referring again to FIG. 3B, a Reflective Memory Channel (RMC)

Interface may be associated with the memory system. The Storage Controller 108 (shown in FIG. 1) may be coupled to a second storage controller for fault-tolerance and failover. In this embodiment, the RMC provides a means for transferring data to the second storage controller. In effect, data intended to be written to storage devices associated with a first storage controller and meta-data created by the associated storage controller application software may be copied (reflected) onto a second storage controller.

The specific embodiments described herein are merely illustrative. Although described in terms of certain preferred embodiments, other embodiments that are apparent to those of ordinary skill in the art, including embodiments which do not provide all of the benefits and features set forth herein, are also within the scope of this invention.

Accordingly, it is to be understood that the patent rights arising hereunder are not to be limited to the specific embodiments or methods' described in this specification or illustrated in the drawings, but extend to other arrangements, technology, and methods, now existing or hereinafter arising, which are suitable or sufficient for achieving the purposes and advantages hereof.

What is claimed is:

1. A system for accelerated TCP and iSCSI protocol processing in hardware, the system comprising:
 a storage network processor (SNP) configured to offload at least some packet processing tasks from a general purpose processor associated with a host device, the storage network processor further comprising:
  a hardware-accelerated receive module configured to receive TCP network packets;
  a hardware-accelerated TCP and iSCSI protocol processing chip configured to process both TCP network packets and iSCSI instructions embedded in TCP network packets, wherein processing of iSCSI instructions embedded in TCP network packets includes offloading common case iSCSI instructions embedded in TCP network packets to process and resolve the embedded iSCSI instructions in hardware;
  a hardware-accelerated transmit module configured to transmit TCP network packets; and
 a remote memory channel used to transfer data and meta-data to a partner storage controller to provide at least a degree of fault tolerance.

2. The system of claim 1 wherein storage data may be re-created on the partner storage controller.

3. A system for accelerated TCP and iSCSI protocol processing in hardware, the system comprising:
 a storage network processor (SNP) configured to offload at least some packet processing tasks from a general purpose processor associated with a host device, the storage network processor further comprising:
  a hardware-accelerated receive module configured to receive TCP network packets;
  a hardware-accelerated TCP and iSCSI protocol processing chip configured to process both TCP network packets and iSCSI instructions embedded in TCP network packets, wherein processing of iSCSI instructions embedded in TCP network packets includes offloading common case iSCSI instructions embedded in TCP network packets to process and resolve the embedded iSCSI instructions in hardware;
  a hardware-accelerated transmit module configured to transmit TCP network packets; and
 a memory channel used to transfer data and meta-data to a partner storage controller to provide at least a degree of fault tolerance.

4. The system of claim 3 wherein storage data may be re-created on the partner storage controller.

* * * * *

UNITED STATES PATENT AND TRADEMARK OFFICE
CERTIFICATE OF CORRECTION

PATENT NO.       : 7,594,002 B1
APPLICATION NO.  : 10/781338
DATED            : September 22, 2009
INVENTOR(S)      : Thorpe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1315 days.

Signed and Sealed this

Twenty-eighth Day of September, 2010

David J. Kappos
*Director of the United States Patent and Trademark Office*